(12) United States Patent
Kuwahara

(10) Patent No.: US 7,848,189 B2
(45) Date of Patent: Dec. 7, 2010

(54) OPTICAL DISK APPARATUS CONTROLLING FOCUS AND TRACKING DRIVE IN GAP AND RECORDED AREA WHEN ADJUSTING WRITE POWER

(75) Inventor: Masaya Kuwahara, Hyogo (JP)

(73) Assignee: Panasonic Corporation, Osaka (JP)

( * ) Notice: Subject to any disclaimer, the term of this patent is extended or adjusted under 35 U.S.C. 154(b) by 1059 days.

(21) Appl. No.: 11/595,947

(22) Filed: Nov. 13, 2006

(65) Prior Publication Data

US 2007/0109928 A1     May 17, 2007

(30) Foreign Application Priority Data

Nov. 14, 2005   (JP) ............................. 2005-328650

(51) Int. Cl.
    *G11B 7/00*   (2006.01)
(52) U.S. Cl. .............. 369/44.31; 369/47.53; 369/44.26; 369/44.34
(58) Field of Classification Search .............. 369/44.31, 369/44.11, 44.34, 53.28, 47.53, 44.26
    See application file for complete search history.

(56) References Cited

U.S. PATENT DOCUMENTS 5,495,463 A * 2/1996 Akagi et al. ................. 369/116
7,177,241 B2 * 2/2007 Nishiuchi ................. 369/44.29
2003/0179670 A1 * 9/2003 Fukushima et al. ...... 369/47.53
2005/0041549 A1 * 2/2005 Lee ........................... 369/47.53
2006/0092782 A1 * 5/2006 Takaba ..................... 369/44.28

FOREIGN PATENT DOCUMENTS

| JP | 6-236576   | 8/1994  |
| JP | 08-315390  | 11/1996 |
| JP | 2001-014691 | 1/2001  |
| JP | 2002-074695 | 3/2002  |

* cited by examiner

*Primary Examiner*—Wayne R Young
*Assistant Examiner*—Linh T Nguyen
(74) *Attorney, Agent, or Firm*—McDermott Will & Emery LLP

(57) ABSTRACT

It is an optical disk apparatus that comprises: a laser drive device for outputting a test power larger than a prescribed value in a gap section; an optical pickup for forming a beam spot on a disk and detecting reflected light; a focus error detector for detecting position shift between a recording face of the information recording medium and the beam spot; a focus control device for controlling the position shift; and a focus drive device for driving an objective lens in directions far from and close to the disk, wherein, in the gap section, the focus drive device keeps a focus drive output level of right before the laser drive device outputs the test power, and sets a recording power such that the emitted light power becomes the prescribed value.

12 Claims, 35 Drawing Sheets

F I G. 1
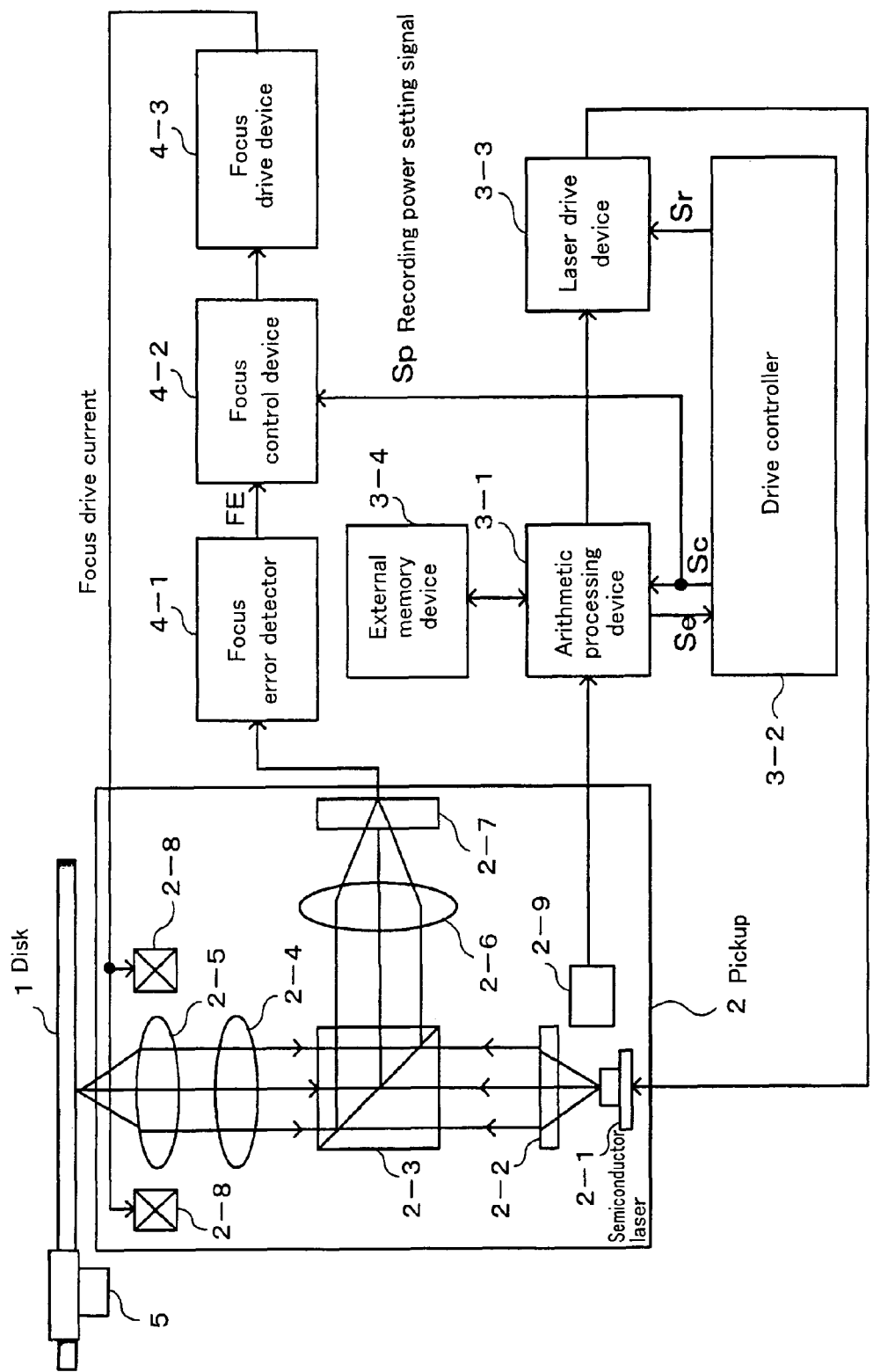

[Action of drive controller]

F I G. 1 0
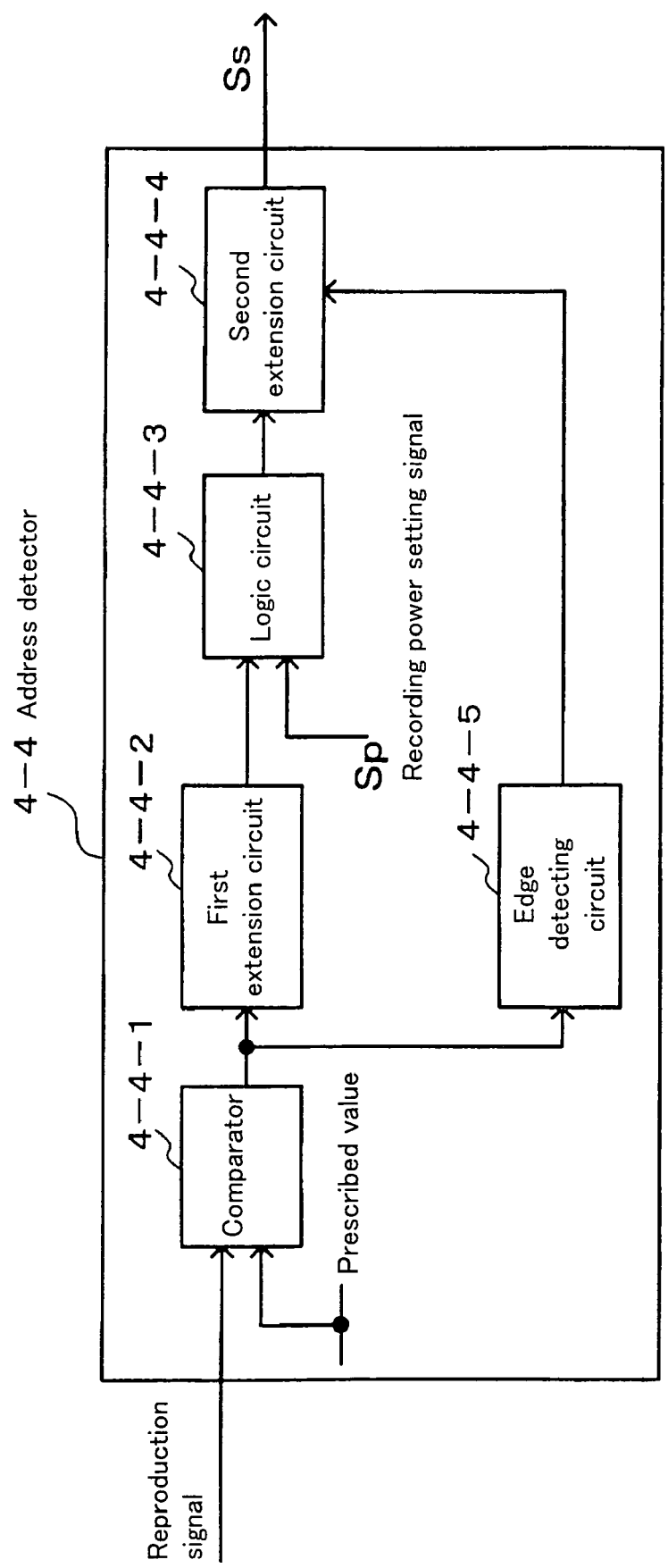

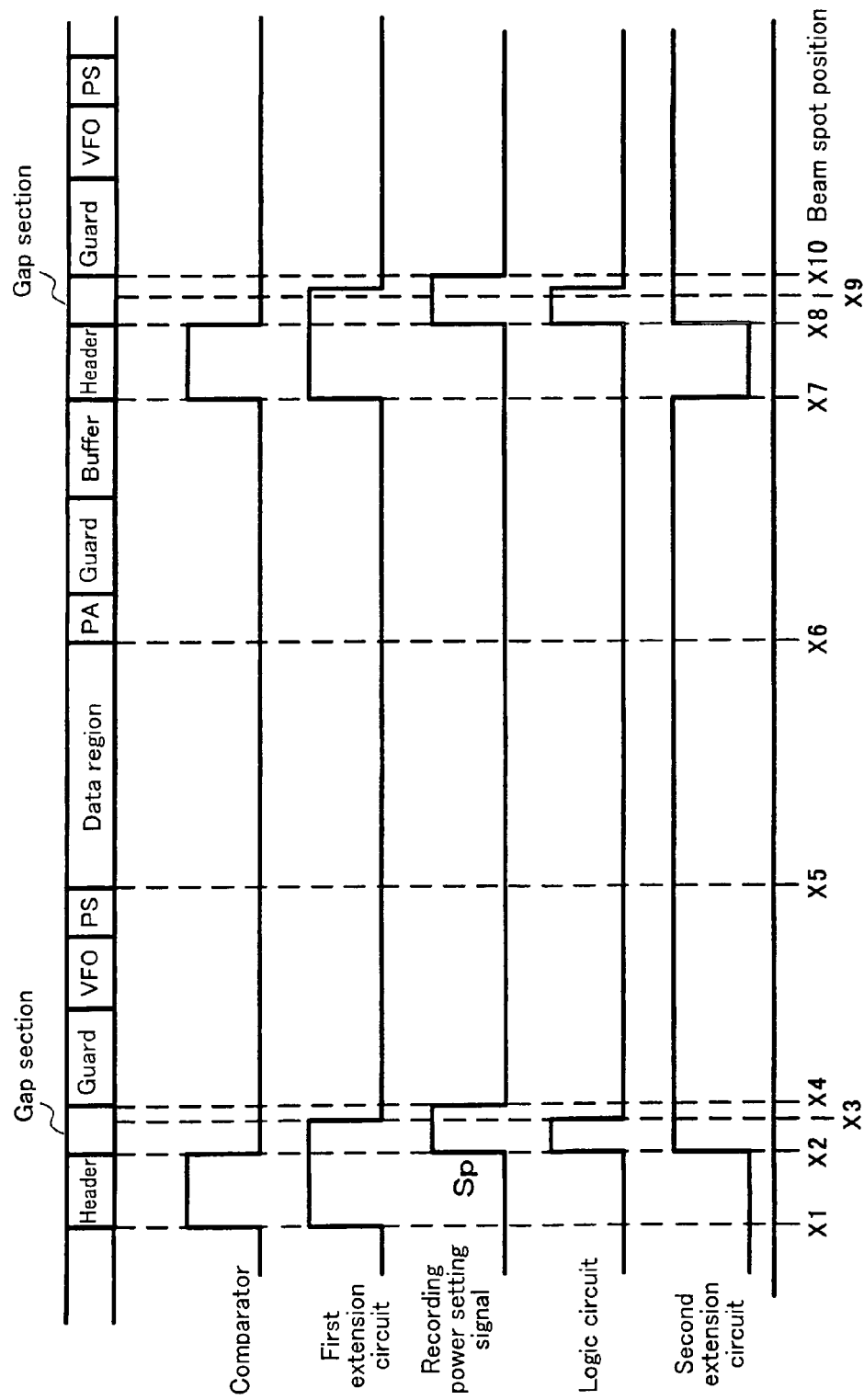

F I G. 2 4
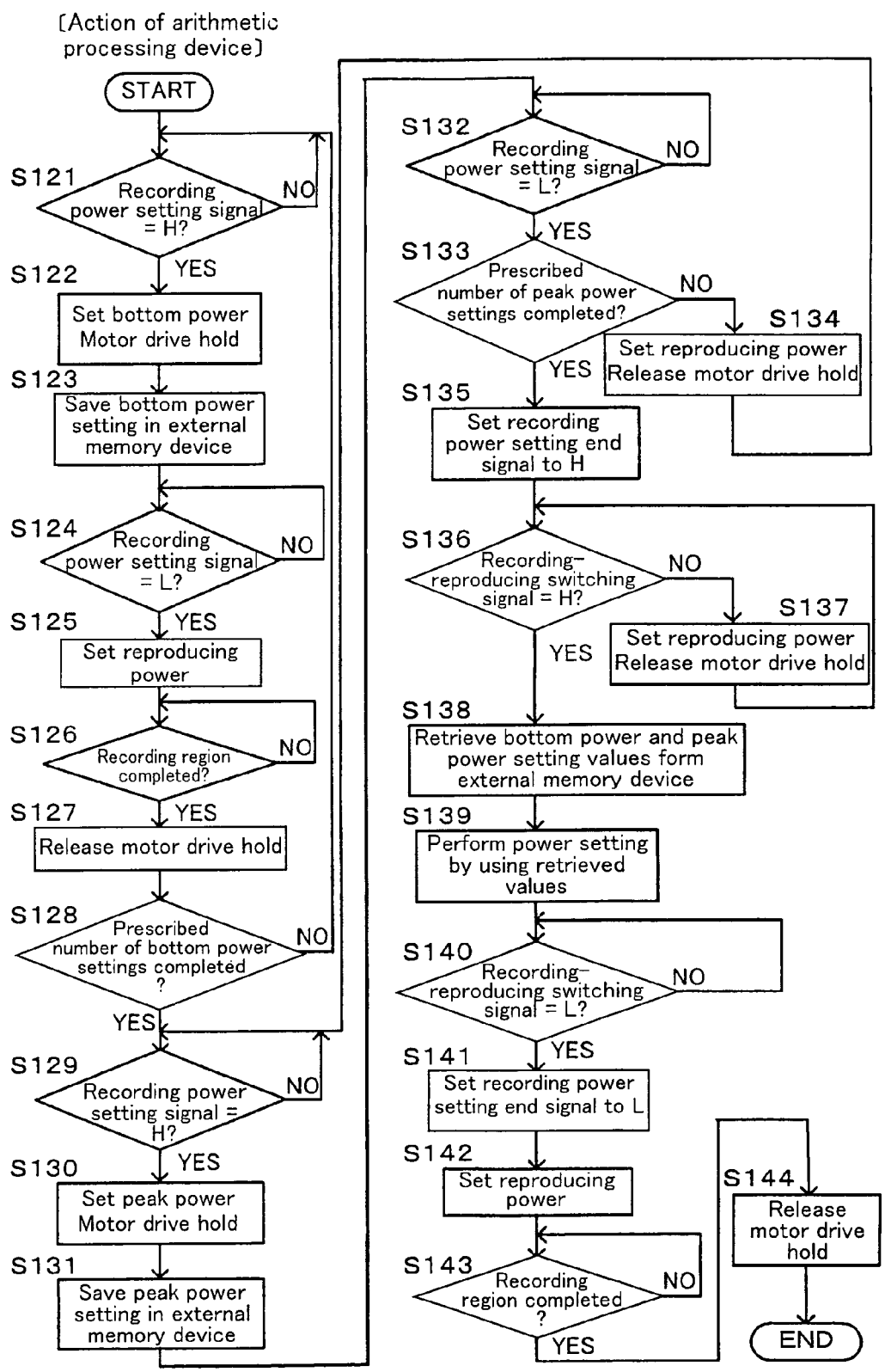

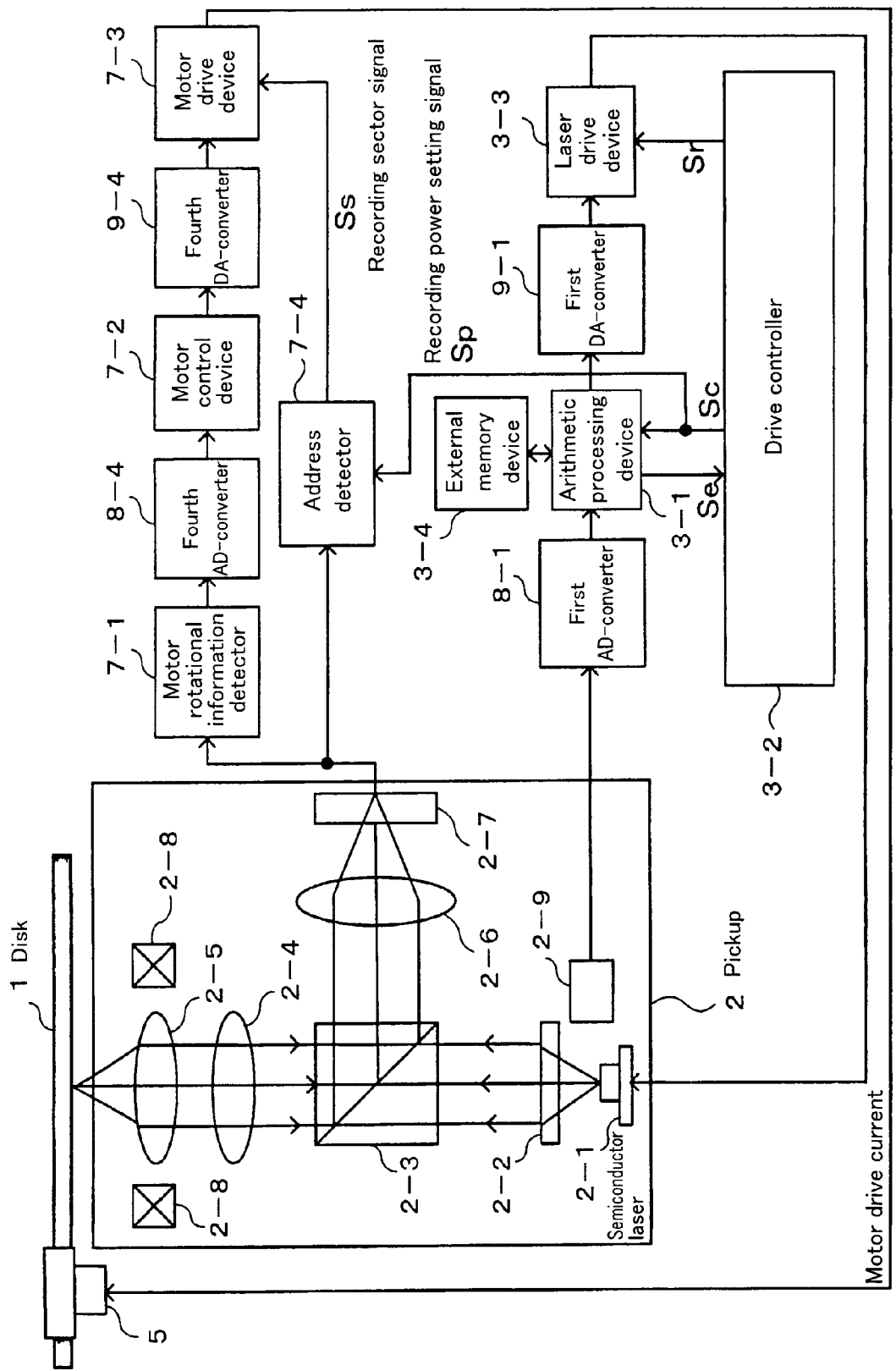

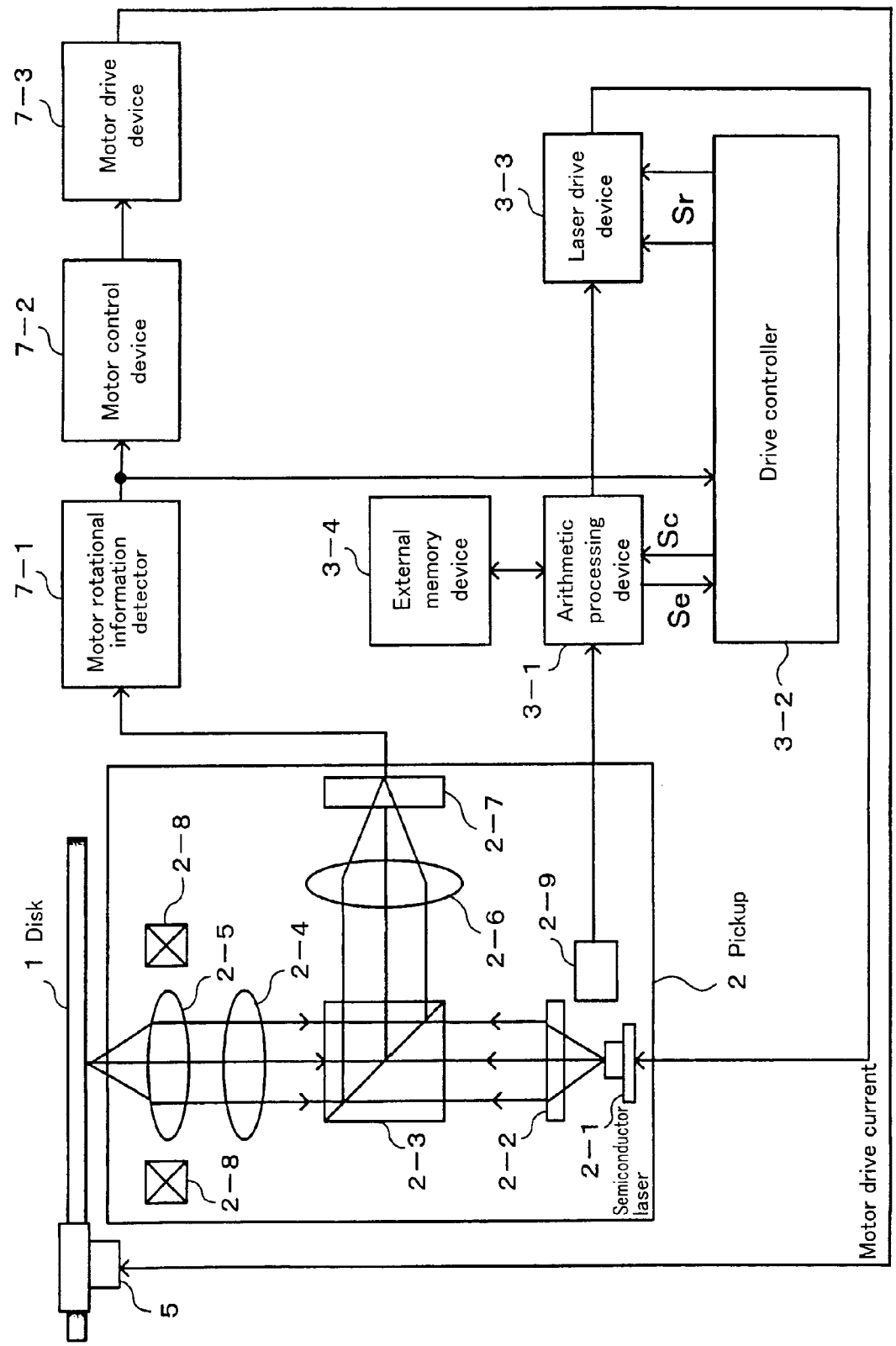

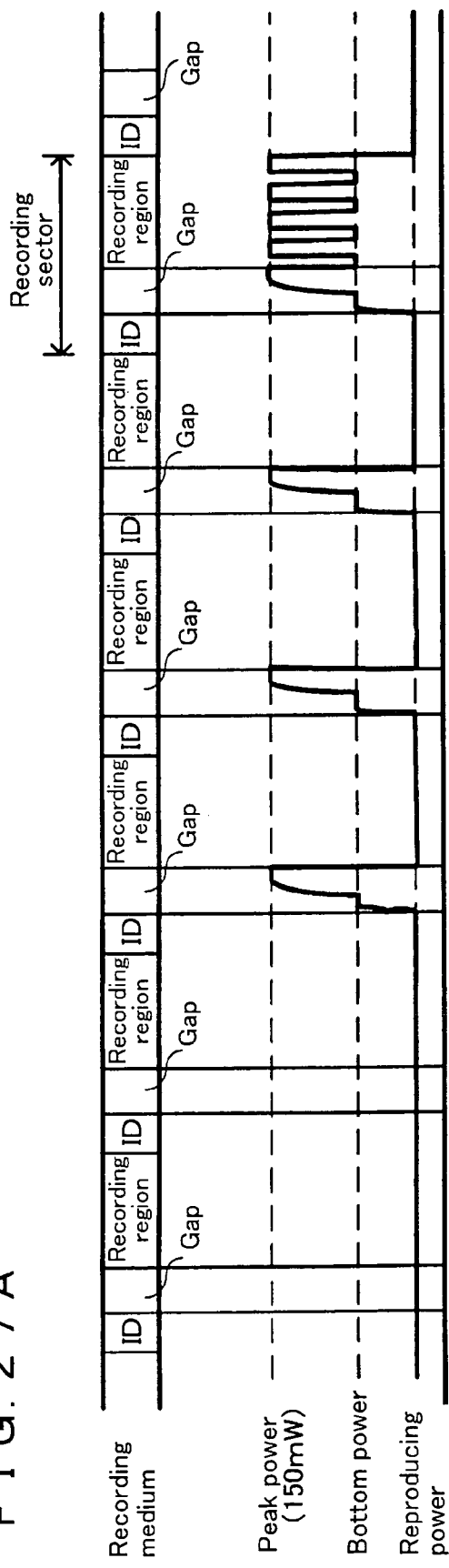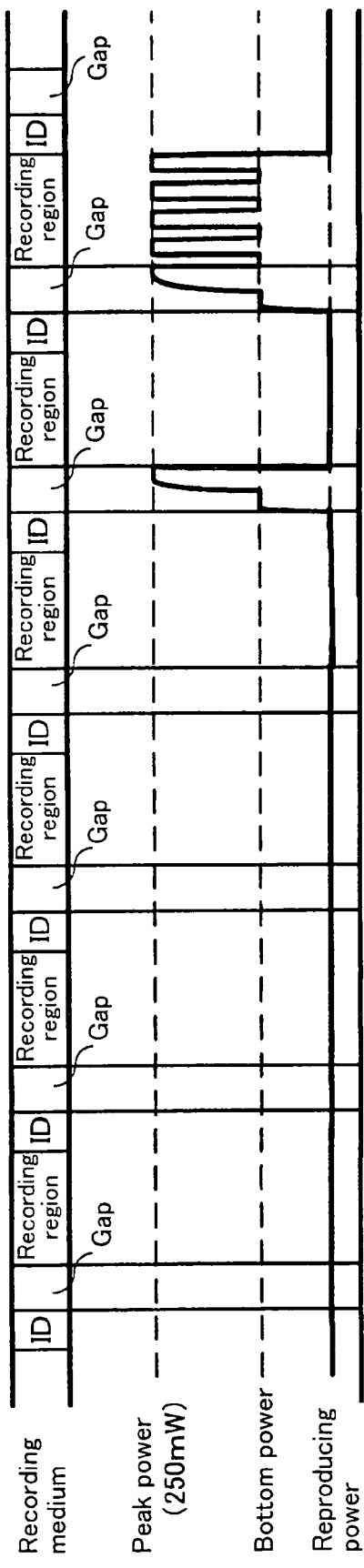
F I G. 27A
F I G. 27B

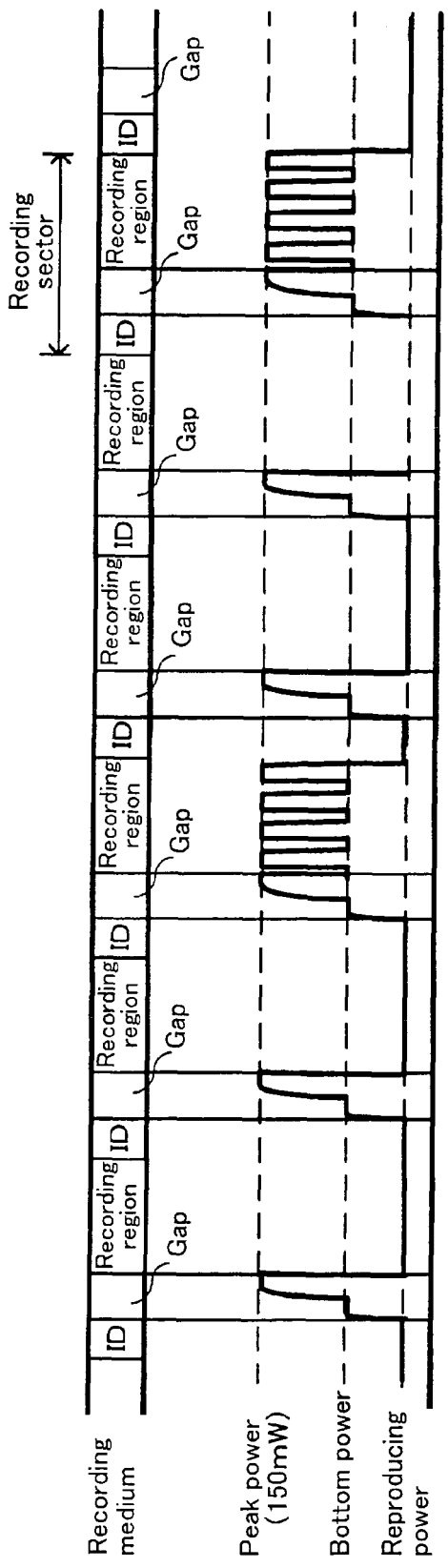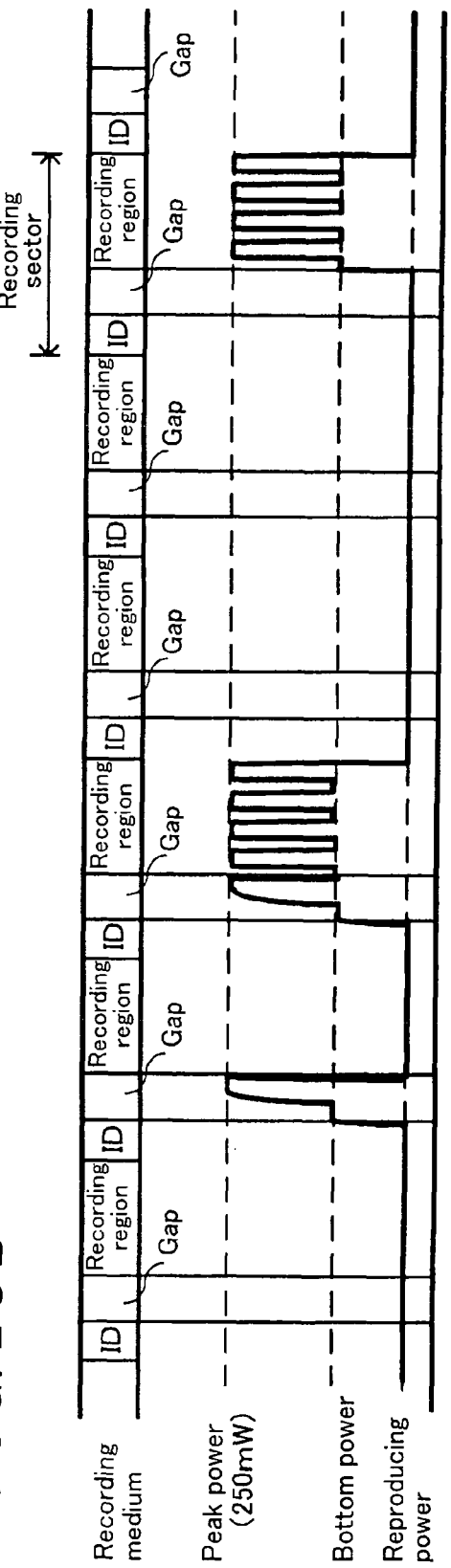

F I G. 3 5 Prior Art
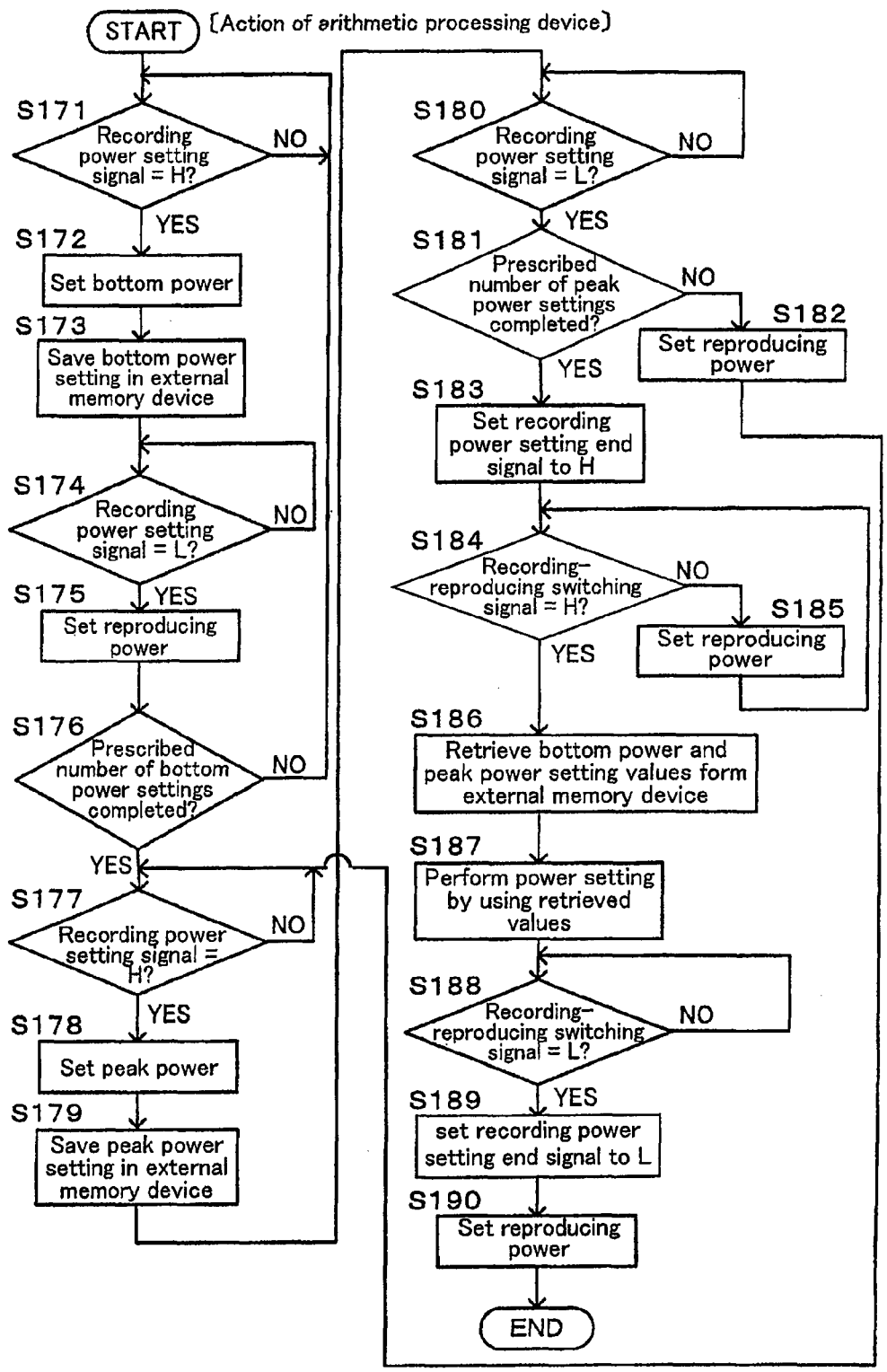

US 7,848,189 B2

OPTICAL DISK APPARATUS CONTROLLING FOCUS AND TRACKING DRIVE IN GAP AND RECORDED AREA WHEN ADJUSTING WRITE POWER

FIELD OF THE INVENTION

The present invention relates to an optical disk apparatus that reproduces or records information in information recording medium such as a DVD (Digital Versatile Disc), and to a control program for the optical disk apparatus.

BACKGROUND OF THE INVENTION

In an optical disk apparatus that records data to a disk by laser beams of a semiconductor laser or the like or reproduces it, it is necessary to set the power of the laser to the optimum values for recording and reproducing. However, in the semiconductor laser in general, the property of the power of the emitted light for the drive current largely changes due to changes in the temperatures. Thus, a laser power control circuit is mounted to the optical disk apparatus in order to keep the laser power on the information recording medium to a prescribed value through controlling the drive current for the semiconductor laser.

FIG. 33 is a block diagram of a laser power control circuit disclosed in Japanese Unexamined Patent Publication 6-236576. In FIG. 33, a photodetector 12 detects a part of the laser beams emitted from a semiconductor laser 11, and converts it to an electric signal. The output signal of the photodetector 12 is inputted to an arithmetic processing device 13. The arithmetic processing device 13, while referring to the output signal of the photodetector 12, performs arithmetic processing so that the power of the light emitted from the semiconductor laser 11 becomes a prescribed value, and outputs the result of the arithmetic processing to a laser drive circuit 15. The laser drive circuit 15 drives the semiconductor laser 11 in accordance with the output signal of the arithmetic processing device 13 to control the laser power. A recording power setting signal Sp, a recording power setting end signal Se, and a recording-reproducing switching signal Sc are exchanged between a drive controller 16 and the arithmetic processing device 13 to be used as the timings for storing switchover of the respective laser powers in reproducing or recording state, and the result of the arithmetic processing to an external memory device 14. After completing the setting of the recording power, the laser drive circuit 15 performs modulation action in accordance with the recording signal Sr outputted from the drive controller 16, and recording of information is carried out.

The procedure of setting the recording power disclosed in Japanese Unexamined Patent Publication 6-236576 will be described referring to FIG. 34. FIG. 34 is a flowchart showing the action of the drive controller 16. When the recording action is started, the start of a gap section of a given sector is detected firstly (step S151), and the recording power setting signal Sp is set to "H" (step S152). Then, the end of the gap section is detected (step S153), and the recording power setting signal Sp is set to "L" (step S154). The arithmetic processing device 13 performs the recording power setting in the section where the recording power setting signal is "H". When the recording power setting is completed, the recording power setting end signal Se to be transmitted to the drive controller 16 is set to "H". The section where the recording power setting end signal Se is not set to "H" indicates that the recording power setting is not completed in a single gap section. Thus, detection of the gap section and action of setting the recording power setting signal Sp to "H" and "L" are repeated until the recording power setting end signal Se turns to "H" (step S155). Upon detecting that the recording power setting end signal Se is "H", it is checked whether or not it is a recording sector. If it is not a recording sector, it needs to keep waiting until becoming a relevant recording sector (step S156). If it is a recording sector, the start of the recording region is detected (step S157). When the recording sector is started, the recording-reproducing switching signal is set to "H" (step S158), and the recording signal Sr is outputted to the laser drive circuit 15 (step S159). When the end of the recording region is detected (step S160), the recording-reproducing switching signal is set to "L" (step S161). Thereby, the recording power setting action of the drive controller 16 is completed.

The action of the arithmetic processing device 13 at the time of setting the recording power will be described referring to FIG. 35. FIG. 35 is a flowchart showing the action of the arithmetic processing device 13.

Generally, in a technique for recording data to a disk with laser beams, the semiconductor laser 11 is structured so as to output a bottom power and a peak power alternately as the output powers. The arithmetic processing device 13 detects that the recording power setting signal Sp outputted from the drive controller 16 turns to "H" (step S171). When it is detected that the recording power setting signal Sp is "H", the arithmetic processing device 13 performs bottom power setting (step S172). The bottom power setting is carried out as below. That is, the arithmetic processing device 13: detects the error between the signal of the photodetector 12 obtained in accordance with the output power of the semiconductor laser 11 and the signal set in accordance with the bottom power; amplifies the magnification that is determined in regard to a loop gain of the set bottom power by considering the semiconductor laser 11, the photodetector 12, and the laser drive device 15; and outputs a control amount voltage for equalizing the target values of the output power and the bottom power of the semiconductor laser 11 to the laser drive device 15 in order to control the power of the semiconductor laser 11. Then, the operation result of the bottom power setting is saved in the external memory device 14 (step S173). When the gap section is ended and it is detected that the recording power setting signal Sp has turned to "L" (step S174), the arithmetic processing device 13 switches to the control for the reproducing power (step S175). This bottom power setting can be executed repeatedly. In such a case, it is returned again to the step S171, and started from the step of detecting that the recording power setting signal Sp turns to "H" (step S176). When the bottom power setting is completed, the arithmetic processing device 13 then performs the peak power setting. That is, the arithmetic processing device 13 detects that the recording power setting signal Sp turns to "H" (S177). When detected that the recording power setting signal Sp is "H", the arithmetic processing device 13 performs the peak power setting (step S178). The peak power setting is carried out as follows. That is, the arithmetic processing device 13: detects the error between the signal of the photodetector 12 obtained in accordance with the output power of the semiconductor laser 11 and the signal set in accordance with the peak power; amplifies the magnification that is determined for a loop gain of the set peak power by considering the semiconductor laser 11, the photodetector 12 and the laser drive device 15; and outputs a control amount voltage for equalizing the target values of the output power and the peak power of the semiconductor laser 11 to the laser drive device 15 in order to control the power of the semiconductor laser 11 (step S179). Then, the operation result of the peak power setting is saved in the external memory device 14. When the gap section is ended and it is detected that the recording power setting signal Sp has turned to "L" (step S180), the recording power setting end signal Se is set to "H", and it is informed to the drive controller 16 that the recording power setting is completed and it is ready for recording (step S183). This peak power setting can also be executed repeatedly. In such a case, the reproducing power setting is performed once (step S182), and it is then returned to the step S172 to restart from the step of detecting that the recording power setting signal Sp turns to "H". After detecting that the arithmetic processing device 13 has turned the recording power setting end signal Se to "H", the drive controller 16 sets the recording-reproducing switching signal to "H" when the current sector is the recording sector (step S158). If it is not a recording sector, the recording-reproducing switching signal is not "H" (step S184). Thus, after performing the reproducing power setting once (step S185), the step S184 is executed again.

When it is detected that the recording-reproducing switching signal is "H" (step S184), the arithmetic processing device 13 retrieves the operation results of the peak power and the bottom power from the external memory device 14 (step S186), and sets the retrieved values as the peak power and the bottom power (step S187). The peak power and the bottom power are maintained in the section where the recording-reproducing switching signal is "H". The laser powers are modulated between the peak power and the bottom power by the laser drive device 15 in accordance with the output of the recording signal Sr, and recording is executed. When the recording-reproducing switching signal turns to "L" (step S188), the arithmetic processing device 13 sets the recording power setting end signal Se to "L" (step S189), and sets the reproducing power (step S190). Thereby, the action of setting the recording power is completed.

In this manner, stable power setting can be achieved without giving any influence of the fluctuation of the laser powers to the ID section and the recording region. Further, in Japanese Unexamined Patent Publication 6-236576, it is noted that the bottom power setting may be performed in the gap section that is of right before the recording region that is one or more regions before the target recording region (to be recorded). Furthermore, it is also noted that the settings of the bottom power and the peak power may be performed more than once, and the optimum bottom power and peak power may be set based on the mean values thereof. Moreover, it is described that the power setting may not have to be performed by actually radiating the bottom power and the peak power in the gap section, but two or more different powers may be radiated in the two or more gap sections, and the bottom power and the peak power may be set from the result thereof.

For example, when the loaded disk is a DVD-RAM disk, the recording region per sector is 2416 bytes, and the gap section is about 10 sectors. When the semiconductor laser outputs a large emitted light power such as the peak power or the bottom power in a small gap section in relation to the recording region as in this case, following issues are generated. That is, due to fluctuations in the wavelength and the like, a focus error signal that indicates the position shift between the disk recording face and the beam spot detected by the reflected light from the disk, or a tracking error signal that indicates the position shift between the track of the disk and the beam spot, fluctuates to high frequency, thereby instability of the focus servo or the tracking servo is caused. In addition, since the focus servo and the tracking servo are unstable when recording to the recording region right after the gap section, the recording signal becomes deteriorated.

Further, since the focus servo or the tracking servo in the gap section becomes unstable, the detection accuracy of the motor control clock for rotating the disk, which is generated by the reflected light from the disk, is deteriorated. Therefore, the motor servo becomes unstable.

Furthermore, When the disk is rotated at a high speed and an emitted light with large power is outputted continuously in a plurality of gap sections, the focus servo, the tracking servo, and the motor servo become unstable not only in the gap sections but also in the recording region.

SUMMARY OF THE INVENTION

The main object of the present invention is to emit the laser beams to set the optimum recording power in a gap section where the laser emission light passes before a specific recording region for recording data, among the gap sections present between the recording regions on the information recording medium, in an apparatus for recording information to the information recording medium that comprises a plurality of recording regions and gap sections not used for recording information before the recording regions, along a recording track.

Another object of the present invention is to provide an optical disk apparatus and a control program which are capable of: achieving stable control in regard to the position shift between the beam spot and the recording face of the disk or the track, and stable rotation control of the disk; and setting the recording power so that the emitted light power becomes a prescribed value in a gap section.

An optical disk apparatus according to a first aspect of the present invention, in an apparatus for recording information to the information recording medium that comprises a plurality of recording regions and gap sections not used for recording information before the recording regions, along a recording track, comprises:

a laser;

a laser drive device for outputting a test power so that an emitted light power becomes larger than a prescribed value in the gap section where the laser emission light passes before a specific recording region for recording data, among the gap sections present between the recording regions on the information recording medium;

an optical pickup for detecting light reflected from the information recording medium, which includes an objective lens for condensing light beams emitted from the laser on the information recording medium as a beam spot;

a focus error detector for detecting position shift between a recording face of the information recording medium and the beam spot as a focus error signal from output of the pickup;

a focus control device for controlling the position shift between the beam spot and the recording face of the information recording medium based on output of the focus error detector; and a focus drive device for driving the objective lens in far and close directions to the information recording medium based on output of the focus control device, wherein in a gap section where the laser drive device outputs the test power, or in the gap section where the test power is outputted and a prescribed section right thereafter, the focus drive device keeps a focus drive output level of right before the laser drive device outputs the test power and set a recording power so that the emitted light power in the gap section becomes the prescribed value.

Alternatively, instead of the setup described above, it may be a procedure, wherein
in a gap section where the laser drive device outputs the test power, or in the gap section where the test power is outputted and a prescribed section right thereafter, gain of the focus control device is decreased and a recording power is set so that the emitted light power in the gap section becomes the prescribed value.

A control program for the optical disk apparatus according to the present invention is a control program that: outputs a test power so that an emitted light power becomes larger than a prescribed value in a gap section where laser emission light passes before a specific recording region for recording data among gap sections present between recording regions on an information recording medium that comprises a plurality of the recording regions and gap sections not used for recording information before the recording regions along a recording track; and keeps drive of focus control that controls position shift between a recording face of the information recording medium and a beam spot to an output level of right before outputting the test power, and perform setting of a laser power necessary for recording, in a gap section where the laser drive device outputs the test power, or in the gap section where the test power is outputted and a prescribed section right thereafter.

Alternatively, instead of the setup described above, a control program that: outputs a test power so that an emitted light power becomes larger than a prescribed value in a gap section where laser emission light passes before a specific recording region for recording data among gap sections present between recording regions on an information recording medium that comprises a plurality of the recording regions and gap sections not used for recording information before the recording regions along a recording track; and decreases gain of focus control that controls position shift between a recording face of the information recording medium and a beam spot and performs setting of a laser power necessary for recording, in a gap section where the laser drive device outputs the test power, or in the gap section where the test power is outputted and a prescribed section right thereafter.

According to the optical disk apparatus and the control program constituted as described above, the following effects can be achieved. That is, when the test power is outputted in such a manner that the emitted light power becomes larger than a prescribed value in the gap section where laser emission light passes before a specific recording region for recording data among the gap sections present between the recording regions, there may be cases where disturbance of the high frequency component is superimposed on the focus error signal that indicates the position shift between the recording face of the information recording medium and the beam spot, due to fluctuations in the wavelengths or the like. However, it is possible to keep the stable focus control by keeping the focus drive output level of right before the focus drive device outputs the test power or by decreasing the gain of the focus control in a gap section where the test power is outputted, or in the gap section where the test power is outputted and a prescribed section right thereafter. Furthermore, it is possible to set the recording power so that the emitted light power in the gap section becomes the prescribed value. Moreover, stable laser power setting can be performed without giving any influence of the laser power fluctuations to the ID section and recording regions.

An optical disk apparatus according to a second aspect of the present invention, in an apparatus for recording information to an information recording medium that comprises a plurality of recording regions and gap sections not used for recording information before the recording regions along a recording track. The optical disk apparatus comprises:
a laser;
a laser drive device for outputting a test power so that an emitted light power becomes larger than a prescribed value in a gap section where laser emission light passes before a specific recording region for recording data, among the gap sections existing between the recording regions on the information recording medium;
an optical pickup for detecting light reflected from the information recording medium, which includes an objective lens for condensing light beams emitted from the laser on the information recording medium as a beam spot;
a tracking error detector for detecting position shift between a track of the information recording medium and the beam spot as a tracking error signal from output of the pickup;
a tracking control device for controlling the position shift between the beam spot and the track of the information recording medium based on output of the tracking error detector; and
a tracking drive device for driving the objective lens in directions across the information recording medium based on output of the tracking control device, wherein
in a gap section where the laser drive device outputs the test power, or in the gap section where the test power is outputted and a prescribed section right thereafter, the tracking drive device keeps a tracking drive output level of right before the laser drive device outputs the test power and sets a recording power so that the emitted light power in the gap section becomes the prescribed value.

Or else, instead of the procedure described above, it may be an apparatus wherein gain of the tracking control device is decreased and a recording power is set so that the emitted light power in the gap section becomes the prescribed value in a gap section where the laser drive device outputs the test power, or in the gap section where the test power is outputted and a prescribed section right thereafter.

A control program for the optical disk according to the present invention is a program which: outputs a test power so that an emitted light power becomes larger than a prescribed value in a gap section where laser emission light passes before a specific recording region for recording data: among gap sections present between recording regions on an information recording medium having a plurality of the recording regions and gap sections not used for recording information before the recording regions along a recording track; and keeps drive of tracking control that controls position shift between a track of the information recording medium and a beam spot at an output level of right before outputting the test power, and performs setting of a laser power necessary for recording, in a gap section where the laser drive device outputs the test power, or in the gap section where the test power is outputted and a prescribed section right thereafter.

Alternatively, instead of the setup described above, it may be a procedure wherein: outputs a test power such that an emitted light power becomes larger than a prescribed value in a gap section where laser emission light passes before a specific recording region for recording data among gap sections present between recording regions of an information recording medium having a plurality of the recording regions and gap sections not used for recording information before the recording regions along a recording track; and decreases gain of tracking control that controls position shift between a track of the information recording medium and a beam spot and performs setting of a laser power necessary for recording, in a gap section where the laser drive device outputs the test power, or in the gap section where the test power is outputted and a prescribed section right thereafter.

According to the optical disk apparatus and the control program in the above-described structures, the following effects can be obtained. That is, when the test power is outputted in such a manner that the emitted light power becomes larger than a prescribed value in the gap section where laser emission light passes before a specific recording region for recording data among the gap sections present between the recording regions, there may be cases where disturbance of the high frequency component is superimposed on the tracking error signal that indicates the position shift between the track of the information recording medium and the beam spot, due to fluctuations in the wavelengths, etc. However, it is possible to keep the stable tracking control by holding the tracking drive output level of right before the tracking drive device outputs the test power or by decreasing the gain of the tracking control in a gap section where the test power is outputted, or in the gap section where the test power is outputted and a prescribed section right thereafter. Furthermore, it is possible to set the recording power so that the emitted light power in the gap section becomes the prescribed value. Moreover, stable laser power setting can be performed without giving any influence of the laser power fluctuations to the ID section and recording regions.

An optical disk according to a third aspect of the present invention is an apparatus for recording information to an information recording medium having a plurality of recording regions and gap sections not used for recording information before the recording regions along a recording track. The optical disk apparatus comprises:
- a laser;
- a laser drive device for outputting a test power so that an emitted light power becomes larger than a prescribed value in a gap section where laser emission light passes before a specific recording region for recording data, among the gap sections between the recording regions on the information recording medium;
- an optical pickup for detecting light reflected from the information recording medium, which includes an objective lens for condensing light beams emitted from the laser on the information recording medium as a beam spot;
- a motor for rotating the information recording medium;
- a motor rotational information detector for detecting rotational information of the motor from output of the pickup;
- a motor control device for controlling a rotation speed of the information recording medium based on output of the motor rotational information detector; and
- a motor drive device for driving the motor based on output of the motor control device, wherein
- in a gap section where the laser drive device outputs the test power, or in the gap section where the test power is outputted and a prescribed section right thereafter, the motor drive device keeps a motor drive output level of right before the laser drive device outputs the test power in order to set a recording power so that the emitted light power in the gap section becomes the prescribed value.

A control program for the optical disk apparatus according to the present invention is a program which: outputs a test power such that an emitted light power becomes larger than a prescribed value in a gap section where laser emission light passes before passing a specific recording region for recording data among gap sections present between recording regions on an information recording medium having a plurality of the recording regions and gap sections not used for recording information before the recording regions along a recording track; and keeps drive of motor control that controls rotary actions of the information recording medium at an output level of right before outputting the test power in order to perform setting of a laser power necessary for recording, in a gap section where the laser drive device outputs the test power, or in the gap section where the test power is outputted and a prescribed section right thereafter.

According to the optical disk apparatus and the control program in the above-described structures, the following effects can be obtained. When the test power is outputted in such a manner that the emitted light power becomes larger than a prescribed value in the gap section where laser emission light passes before a specific recording region for recording data among the gap sections present between the recording regions, there may be cases where the detection accuracy is deteriorated because the output of the motor rotational information detector for detecting the rotation speed of the information recording medium is deteriorated due to the influence of the disturbance of the high frequency component that is caused by fluctuations in the wavelengths and the like. However, it is possible to keep the stable motor control by holding the motor drive output level of right before the motor drive device outputs the test power in a gap section where the test power is outputted, or in the gap section where the test power is outputted and a prescribed section right thereafter. Furthermore, it is possible to set the recording power so that the emitted light power in the gap section becomes the prescribed value. Moreover, stable laser power setting can be performed without giving influence of the laser power fluctuation to the ID section and recording regions.

An optical disk according to a fourth aspect of the present invention is an apparatus for recording information to an information recording medium having a plurality of recording regions and gap sections not used for recording information before the recording regions along a recording track. The optical disk apparatus comprises:
- a laser; and
- a laser drive device for outputting a test power so that an emitted light power becomes larger than a prescribed value in a gap section where laser emission light passes before a specific recording region for recording data, among the gap sections between the recording regions on the information recording medium, wherein
- when the test power becomes larger than the prescribed value, the laser drive device does not output the test power continuously for more than a prescribed number of gap sections.

According to the optical disk apparatus and the control program in the above-described structures, the following effects can be achieved. When the test power is outputted in such a manner that the emitted light power becomes larger than a prescribed value in the gap section where laser emission light passes before a specific recording region for recording data among the gap sections present between the recording regions, there may be cases where disturbance of the high frequency component is superimposed on the focus error signal that indicates the position shift between the recording face of the information recoding medium and the beam spot or the tracking error signal that indicates the position shift between the track of the information recording medium and the beam spot, or the detection accuracy on the output of the motor rotational information detector for detecting the rotation speed of the information recording medium is deteriorated due to the influence of the disturbance of the high frequency component that is caused by fluctuations in the wavelengths and the like. However, when the test power becomes larger than the prescribed value, it is possible to reduce the influence due to the larger test power than the prescribed value, by not outputting the test power for more than a prescribed number of gap sections. By doing so, the focus control, the tracking control and the motor control can be maintained stable. Moreover, stable laser power setting can be performed without giving influence of the laser power fluctuation to the ID section and recording regions.

An optical disk according to a fifth aspect of the present invention is an apparatus for recording information to an information recording medium having a plurality of recording regions and gap sections not used for recording information before the recording regions along a recording track. The optical disk apparatus comprises:

a laser; and a laser drive device for outputting a test power so that an emitted light power becomes larger than a prescribed value in a gap section where laser emission light passes before a specific recording region for recording data, among the gap sections between the recording regions on the information recording medium, wherein when the test power becomes larger than the prescribed value, the laser drive device does not output the test power in a prescribed number of gap sections existing just after a gap section where the test power is outputted.

According to the optical disk apparatus and the control program in the above-described structures, the following effects can be achieved. When the test power is outputted in such a manner that the emitted light power becomes larger than a prescribed value in the gap section where laser emission light passes before a specific recording region for recording data among the gap sections present between the recording regions, there may be cases where disturbance of the high frequency component is superimposed on the focus error signal that indicates the position shift between the recording face of the information recoding medium and the beam spot or the tracking error signal that indicates the position shift between the track of the information recording medium and the beam spot, or the detection accuracy on the output of the motor rotational information detector for detecting the rotation speed of the information recording medium is deteriorated due to the influence of the disturbance of the high frequency component that is caused by fluctuation in the wavelength and the like. However, when the test power becomes larger than the prescribed value, it is possible to reduce the influence caused when the test power is larger than the prescribed value by bringing the output of the test power by the laser drive device to a stop in a prescribed number of gap sections existing just after the gap section where the test power is outputted. With this, the focus control, the tracking control, and the motor control can be maintained stable. Moreover, stable laser power setting can be performed without giving influence of the laser power fluctuation to the ID section and recording regions.

It is preferable for the optical disk apparatus and the control program according to the first to third embodiments to be a value larger than the power used for reading out data from the information recording medium, as the test power which is larger than the prescribed value outputted from the laser drive device.

The optical disk and the control program according to the fourth embodiment of the present invention may be constituted in such a manner that the test power is not outputted continuously for more than a prescribed number of gap sections, and the prescribed number is almost reciprocal to the rotation speed of the information recording medium.

The optical disk and the control program according to the fifth embodiment of the present invention may be constituted in such a manner that the test power is not outputted in a prescribed number of gap sections existing just after the gap section where the test power is outputted, and the prescribed number is almost proportional to the rotation speed of the information recording medium.

The optical disk and the control program according to the fourth embodiment of the present invention may be constituted in such a manner that the test power is not outputted continuously for more than a prescribed number of gap sections, and the prescribed number is almost reciprocal to the output of the test power.

The optical disk and the control program according to the fifth embodiment of the present invention may be constituted in such a manner that the test power is not outputted in a prescribed number of gap sections existing just after the gap section where the test power is outputted, and the prescribed number is almost proportional to the output of the test power.

BRIEF DESCRIPTION OF THE DRAWINGS

The present invention is described with respect to some examples but it is not limited to them in the accompanying drawings where same references indicate same elements therein;

FIG. 1 is a first block diagram showing the structure of an optical disk apparatus according to a first embodiment of the present invention;

FIG. 10 is a block diagram showing the structure of an address detector according to the first embodiment of the present invention;

FIG. 11 is an illustration for describing the action of the address detector according to the first embodiment of the present invention;

FIG. 24 is a flowchart showing the recording action procedure of an arithmetic processing device according to the third embodiment of the present invention;

FIG. 25 is a second block diagram showing the structure of the optical disk apparatus according to the third embodiment of the present invention;

FIG. 26 is a first block diagram showing the structure of the optical disk apparatus according to a fourth embodiment of the present invention;

FIG. 27 is a first illustration for describing the action of a laser drive device in regard to the beam spot scanning position according to the fourth embodiment of the present invention;

FIG. 28 is a second illustration for describing the action of a laser drive device in regard to the beam spot scanning position according to the fourth embodiment of the present invention;

FIG. 35 is a flowchart showing the recording action procedure of an arithmetic processing device of the semiconductor laser power control circuit according to the relate art.

DETAILED DESCRIPTION OF THE INVENTION

Figure 2:
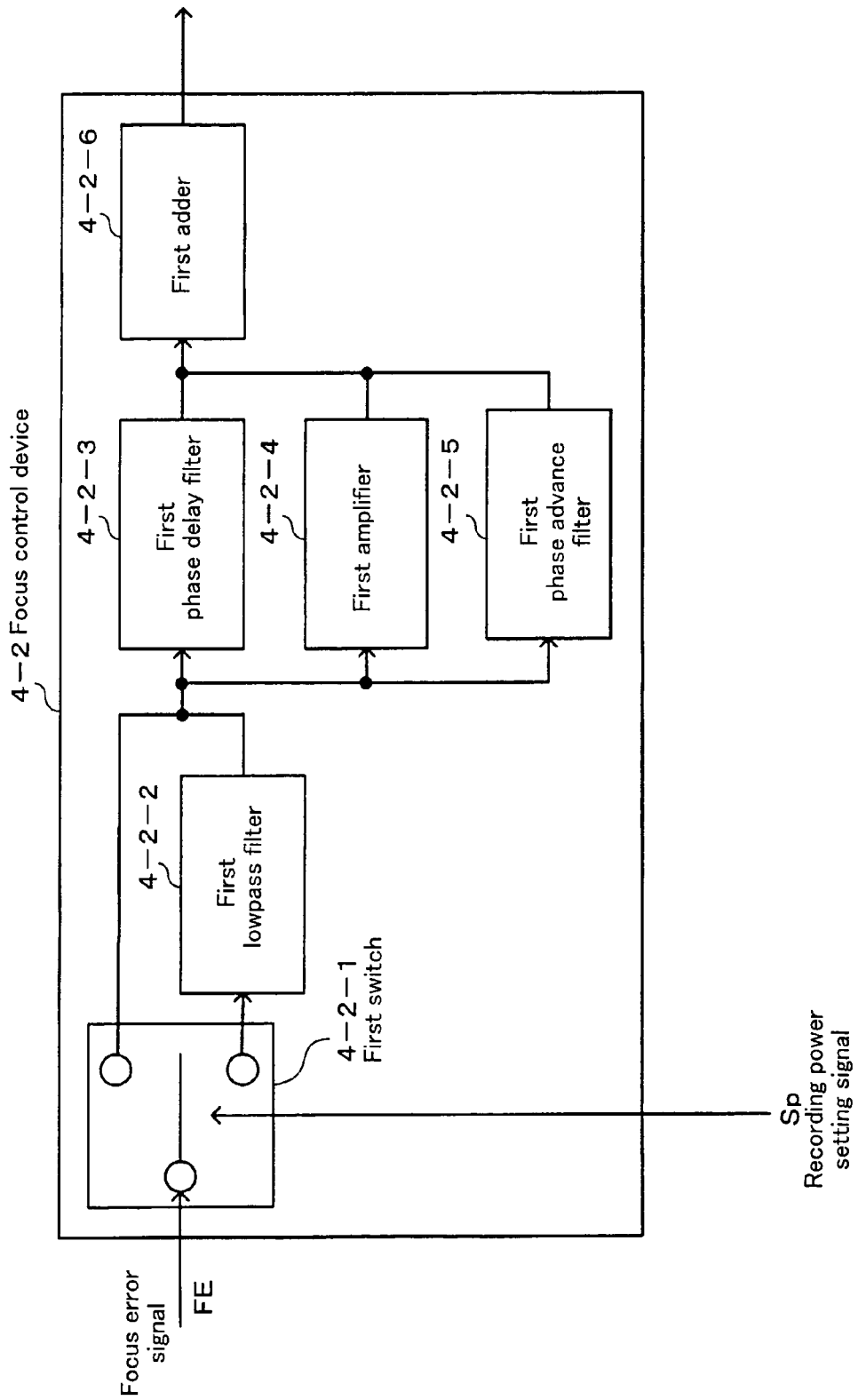
FIG. 2 is a first block diagram showing the structure of a focus control device according to the first embodiment of the present invention.

Hereinafter, preferred embodiments of the present invention will be described referring to the accompanying drawings.

First Embodiment

FIG. 1 is a block diagram showing an example of the structure of the optical disk apparatus according to a first embodiment of the present invention. In FIG. 1, it is assumed that a DVD-RAM disk is loaded as an example of a disk 1. The disk 1 is rotated with a motor 5 at a prescribed rotation number. The motor 5 is rotationally driven with a motor control device and a motor drive device, although not shown in FIG. 1. A pickup 2 comprises a semiconductor laser 2-1, a collimator lens 2-2, a polarization beam splitter 2-3, a wavelength plate 2-4, an objective lens 2-5, a condenser lens 2-6, a reproducing light detector 2-7, a focus actuator 2-8, and a photodetector 2-9. A part of laser beams emitted from the semiconductor lens 2-1 is detected by the photodetector 2-9, and converted to an electric signal. The output signal of the photodetector 2-9 is inputted to an arithmetic processing device 3-1. The arithmetic processing device 3-1, while referring to the output signal of the photodetector 2-9, performs arithmetic processing so that the power of the light emitted from the semiconductor laser 2-1 becomes a prescribed value, and outputs the result of the arithmetic processing to a laser drive device 3-3. The laser drive device 3-3 drives the semiconductor laser 2-1 in accordance with the output signal of the arithmetic processing device 3-1 to control the laser power. A recording power setting signal Sp, a recording power setting end signal Se, and a recording-reproducing switching signal Sc are exchanged between a drive controller 3-2 and the arithmetic processing device 3-1 to be used as the timings for switching the respective laser powers in either reproducing or recording state, and as the timing for saving the result of the arithmetic processing to an external memory device 3-4. After completing the setting of the recording power, the laser drive device 3-3 performs modulation action in accordance with the recording signal Sr outputted from the drive controller 3-2, and recording of information is carried out.

The laser beams emitted from the semiconductor laser 2-1 are shaped into parallel beams by the collimator lens 2-2, and the parallel beams enter the objective lens 2-5 after passing through the polarization beam splitter 2-3 and the wavelength plate 2-4. The laser beams entered to the objective lens 2-5 are condensed, thereby forming a beam spot on the disk 1. The reflected light of the beam spot condensed on the disk 1 again passes through the objective lens 2-5 and the wavelength plate 2-4. It is then separated from the optical path of the emitted light by the polarization beam splitter 2-3, and condensed on a prescribed light receiving face of the reproducing light detector 2-7 through the condenser lens 2-6.

The reflected light condensed to the reproducing light detector 2-7 is converted to an electric signal and inputted to a focus error detector 4-1. The focus error detector 4-1 detects focus error signal FE as the amount of position shift between the recording face of the disk 1 and the beam spot from the output of the reproducing light detector 2-7, and outputs it to a focus control device 4-2. According to the focus error signal FE, the focus control device 4-2 outputs a drive signal for controlling the position shift between the recording face of the disk 1 and the beam spot so as to be zero to a focus drive device 4-3. In accordance with the output of the focus control device 4-2, the focus drive device 4-3 outputs the focus drive current to the focus actuator 2-8. The focus actuator 2-8 drives the objective lens 2-5 by the focus drive current in the direction approaching towards the recording face of the disk 1 or in the direction away from the recording face of the disk 1.

The recording power setting signal Sp outputted from the drive controller 3-2 is inputted to the focus control device 4-2 as well.

The structure of the focus control device 4-2 will be described referring to FIG. 2. FIG. 2 is a block diagram of the focus control device 4-2. The focus error signal FE detected by the focus error detector 4-1 is inputted to a first switch 4-2-1. The control signal of the first switch 4-2-1 is the recording power-setting signal Sp. When the recording power-setting signal Sp is "H", the focus error signal FE is outputted to a first lowpass filter 4-2-2 and, further, to a first phase delay filter 4-2-3, a first amplifier 4-2-4, and a first phase advance 4-2-5. Meanwhile, when the recording power-setting signal Sp is not "H", the output of the first switch 4-2-1 is directly inputted to the first phase delay filter 4-2-3, the first amplifier 4-2-4, and the first phase advance filter 4-2-5. In other words, the first switch 4-2-1 functions to judge whether or not to cut off the high frequency component of the focus error signal FE.

The output terminals of the first delay filter 4-2-3, the first amplifier 4-2-4 and the first phase advance filter 4-2-5 are connected to a first adder 4-2-6. The first adder 4-2-6 adds the outputs of the first delay filter 4-2-3, the first amplifier 4-2-4 and the first phase advance filter 4-2-5, and outputs the added result to the focus drive device 4-3.

Figure 3:
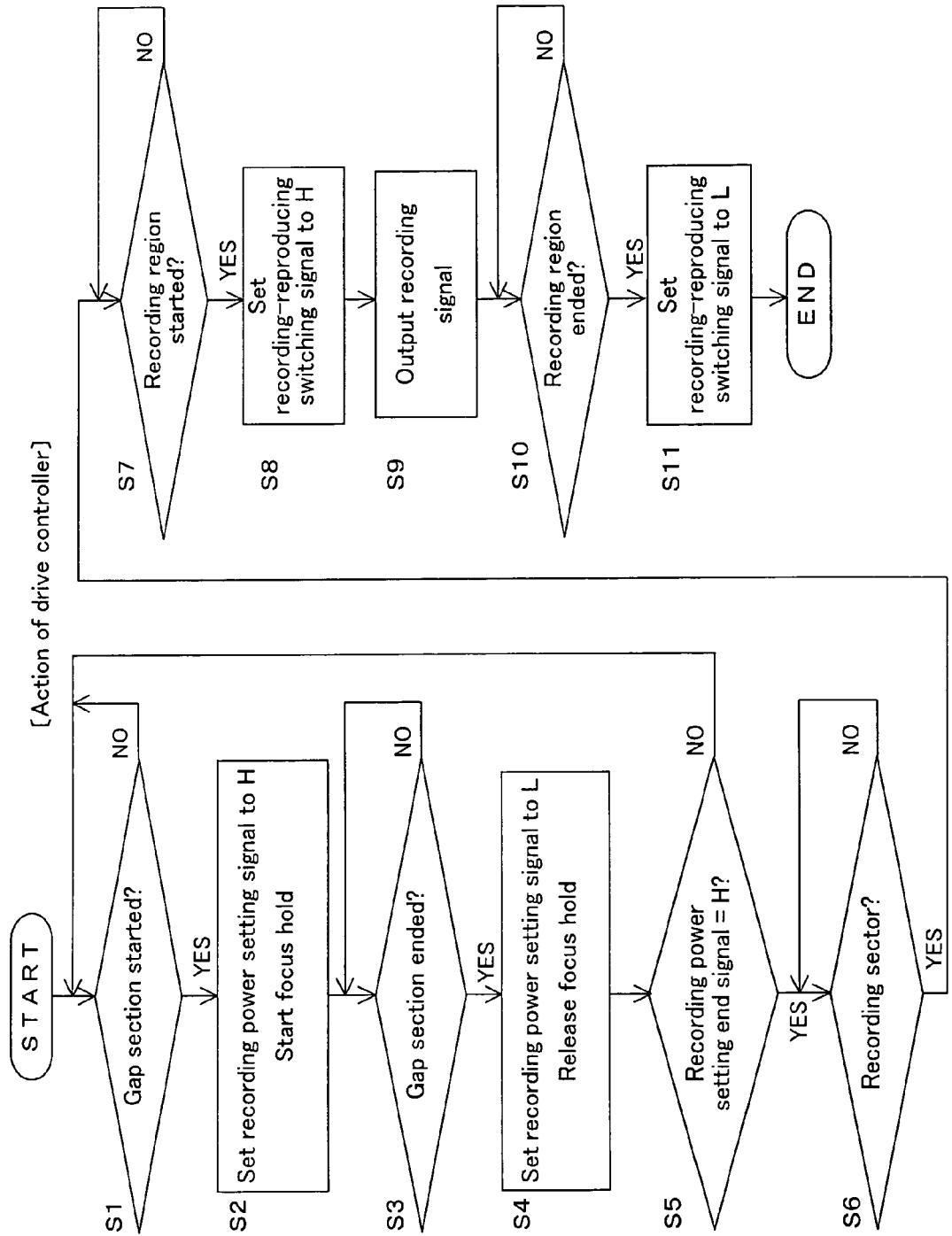
FIG. 3 is a flowchart showing the recording action procedure of the focus control device according to the first embodiment of the present invention.

The procedure of the recording power-setting and the focus control state will be described referring to FIG. 3. FIG. 3 is a flowchart showing the action of the drive controller 3-2.

When the recording action is started, detection is started firstly in a gap section of a given sector (step S1). Upon detecting that a beam spot has started to scan the gap section, the recording power setting signal Sp is set to "H". The recording power setting signal Sp is inputted also to the focus control device 4-2, and the focus control device 4-2 executes hold processing in the section where the recording power setting signal SP is "H" (step S2). The hold processing is so defined that the first switch 4-2-1 inputs the focus error signal FE to the first lowpass filter 4-2-2 to eliminate the high frequency component of the focus error signal FE. When the beam spot scanning position detects the end of the gap section (step S3), the recording power-setting signal Sp is set to "L". When the recording power setting signal Sp turns to "L", the focus control device 4-2 releases the hold processing (step S4). Release of the hold processing is so defined that the first switch 4-2-1 outputs the focus error signal FE directly to the first phase delay filter 4-2-3, the first amplifier 4-2-4 and the first phase advance filter 4-2-5.

The arithmetic processing device 3-1 performs the recording power setting in the section where the recording power setting signal Sp is "H" and, when the recording power setting is completed, changes the recording power setting end signal Se to "H" for the drive controller 3-2. The section where the recording power setting end signal Se is not turned to "H" indicates that the recording power setting has not completed yet in one gap section. Thus, actions of detecting the gap section and setting the recording power setting signal Sp to "H" and "L" are repeated until the recording power setting end signal Se turns to "H" (step S5). Upon detecting that the recording power setting end signal Se is "H", it is checked whether or not it is the recording sector. If it is not the recording sector, it is continued to wait until becoming the recording sector (step S6). If it is the recording sector, the start of the recording region is detected (step S7). When the recording sector is started, the recording-reproducing switching signal Sc is turned to "H" (step S8), and the recording signal Sr is outputted to the laser drive device 3-3 (step S9). Upon detecting the end of the recording region (step S10), the recording-reproducing switching signal Sc is turned to "L" (step S11). Thereby, the recording power setting action of the drive controller 3-2 is completed.

As described above, the focus control device 4-2 executes the hold processing in the section where the recording power setting signal Sp is "H". Thus, as shown in FIG. 2, the high frequency component of the focus error signal FE is cut off. Therefore, even when the disturbance is superimposed on the focus error signal FE, the output of the focus drive device 4-3 does not follow the disturbance component so as to thereby enable a stable focus control.

Figure 4:
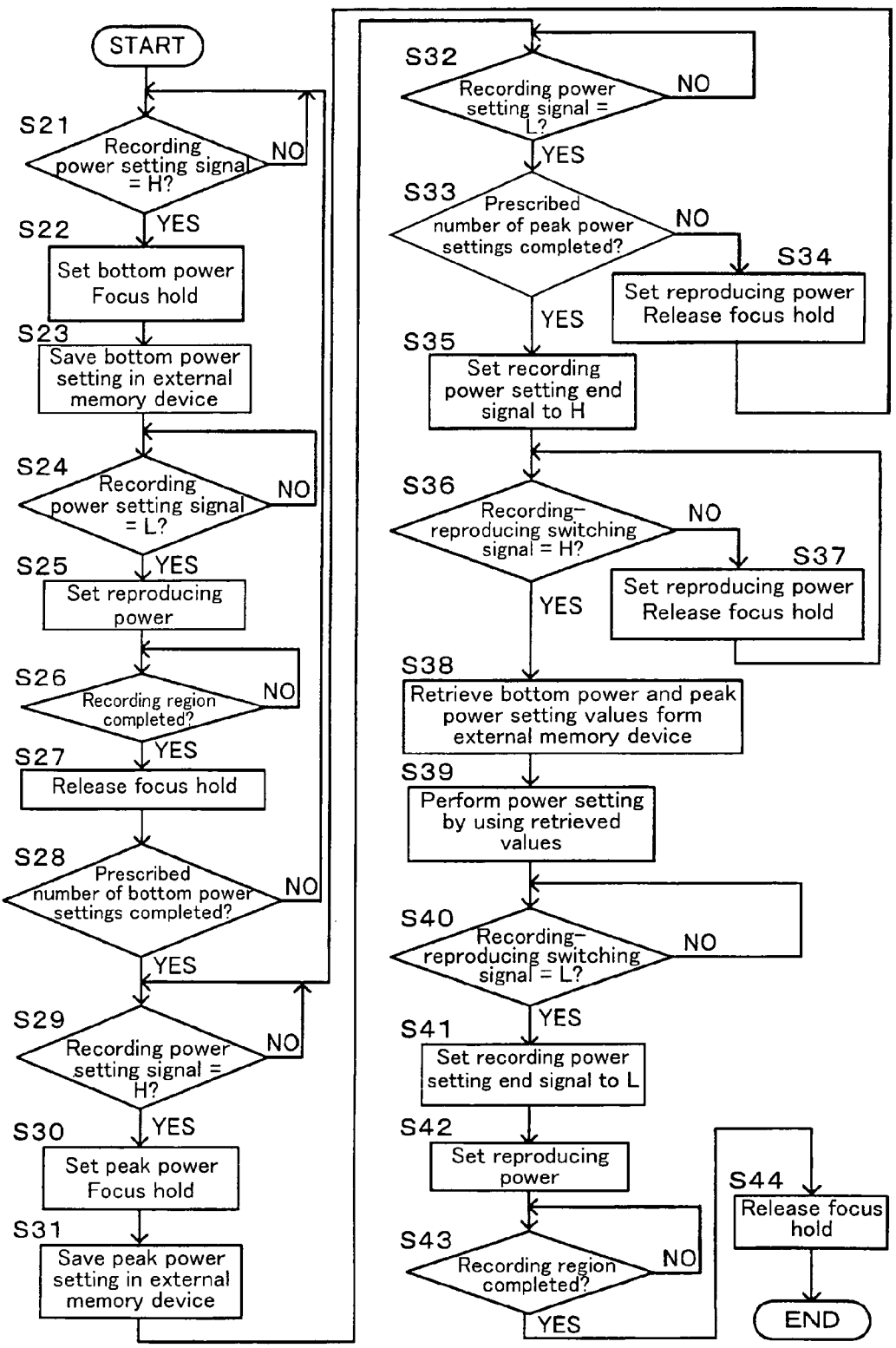
FIG. 4 is a flowchart showing the recording action procedure of an arithmetic processing device according to the first embodiment of the present invention.

The action of the arithmetic processing device 3-1 in the recording power setting will be described referring to FIG. 4. FIG. 4 is a flowchart for showing the action of the arithmetic processing device 3-1.

In the technique for recording data to a DVD-RAM disk, it is constituted so as to output the bottom power and the peak power alternately as the output power of the semiconductor laser 2-1. First, the arithmetic processing device 3-1 performs peak power setting. That is, the arithmetic processing device 3-1 detects a state where the recording power setting signal Sp outputted from the drive controller 3-2 turns to "H" (step S21). When it is detected that the recording power setting signal Sp is "H", the arithmetic processing device 3-1 performs bottom power setting, and the focus control device 4-2 executes the hold processing (step S22). The bottom power setting is carried out as follows. That is, the arithmetic processing device 3-1: detects the error between the signal of the photodetector 2-9 obtained in accordance with the output power of the semiconductor laser 2-1 and the signal set in accordance with the bottom power; amplifies the magnification that is determined in regard to a loop gain of the set bottom power by considering the semiconductor laser 2-1, the photodetector 2-9, and the laser drive device 3-3; and outputs a control amount voltage for equalizing the target values of the output power and bottom power of the semiconductor laser 2-1 to the laser drive device 3-3 in order to control the power of the semiconductor laser 2-1. Then, the operation result of the bottom power setting is saved in the external memory device 3-4 (step S23). When the gap section is ended and it is detected that the recording power setting signal Sp has turned to "L" (step S24), the arithmetic processing device 3-1 is switched to the control for the reproducing power (step S25). Then, it is judged whether or not the beam spot has passed the recording region and, if judged that it has completely passed the recording region (step S26), the focus control device 4-2 releases the hold processing (step S27). This bottom power setting can be executed repeatedly. In such a case, it is returned again to the step S21, and started from the step of detecting a state where the recording power-setting signal Sp turns to "H" (step S28).

When the bottom power setting is completed, the arithmetic processing device 3-1 then performs the peak power setting. That is, the arithmetic processing device 3-1 detects a state where the recording power-setting signal Sp turns to "H" (step S29). When detected that the recording power setting signal Sp is "H", the arithmetic processing device 3-1 performs the peak power setting, and the focus control device 4-2 executes the hold processing (step S30). The peak power setting is carried out as follows. That is, the arithmetic processing device 3-1: detects the error between the signal of the photodetector 2-9 obtained in accordance with the output power of the semiconductor laser 2-1 and the signal set in accordance with the peak power; amplifies the magnification that is determined in regard to a loop gain of the set peak power by considering the semiconductor laser 2-1, the photodetector 2-9, and the laser drive device 3-3; and outputs a control amount voltage for equalizing the target values of the output power and peak power of the semiconductor laser 2-1 to the laser drive device 3-3 in order to control the power of the semiconductor laser 2-1 (step S31). Then, the operation result of the bottom power setting is saved in the external memory device 3-4. When the gap section is ended and it is detected that the recording power setting signal Sp has turned to "L" (step S32), the recording power setting end signal Se is set to "H" to inform the drive controller 3-2 that the recording power setting is completed and it is ready for recording (step S35). This peak power setting can also be executed repeatedly. In such a case, the reproducing power setting is performed once, and the focus control device 4-2 releases the hold processing simultaneously (step S34), and it is then returned to the step S29 to restart from the step of detecting that the recording power setting signal Sp turns to "H". When the current sector is the recording sector after detecting that the arithmetic processing device 3-1 has set the recording power setting end signal Se to "H", the drive controller 3-2 sets the recording-reproducing switching signal Sc to "H" (step S8). If it is not a recording sector, the recording-reproducing switching signal is not "H" (step S36). Thus, the reproducing power setting is performed once, and at the same moment the focus control device 4-2 releases the hold processing (step S37). Then, the step S36 is executed again.

When it is detected that the recording-reproducing switching signal Sc is "H" (step S36), the arithmetic processing device 3-1 retrieves the operation results of the peak power and the bottom power from the external memory device 3-4 (step S38), and sets the retrieved values as the peak power and the bottom power (step S39). The peak power and the bottom power are maintained in the section where the recording-reproducing switching signal is "H". The laser power is modulated between the peak power and the bottom power by the laser drive device 3-3 in accordance with the output of the recording signal Sr to execute recording action. When the recording-reproducing switching signal turns to "L" (step S40), the arithmetic processing device 3-1 sets the recording power setting end signal Se to "L" (step S41), and sets the reproducing power (step S42). Further, when it is detected that the beam spot scanning position has completely passed the recording region (step S43), the focus control device 4-2 releases the hold processing (step S44). Thereby, the action of the recording power setting is completed.

In the action shown in FIG. 4, the focus control device 4-2 executes the hold processing in the section where the recording power setting signal Sp is "H". Thus, stable focus control can be achieved in setting both the bottom power and the peak power.

Figure 5:
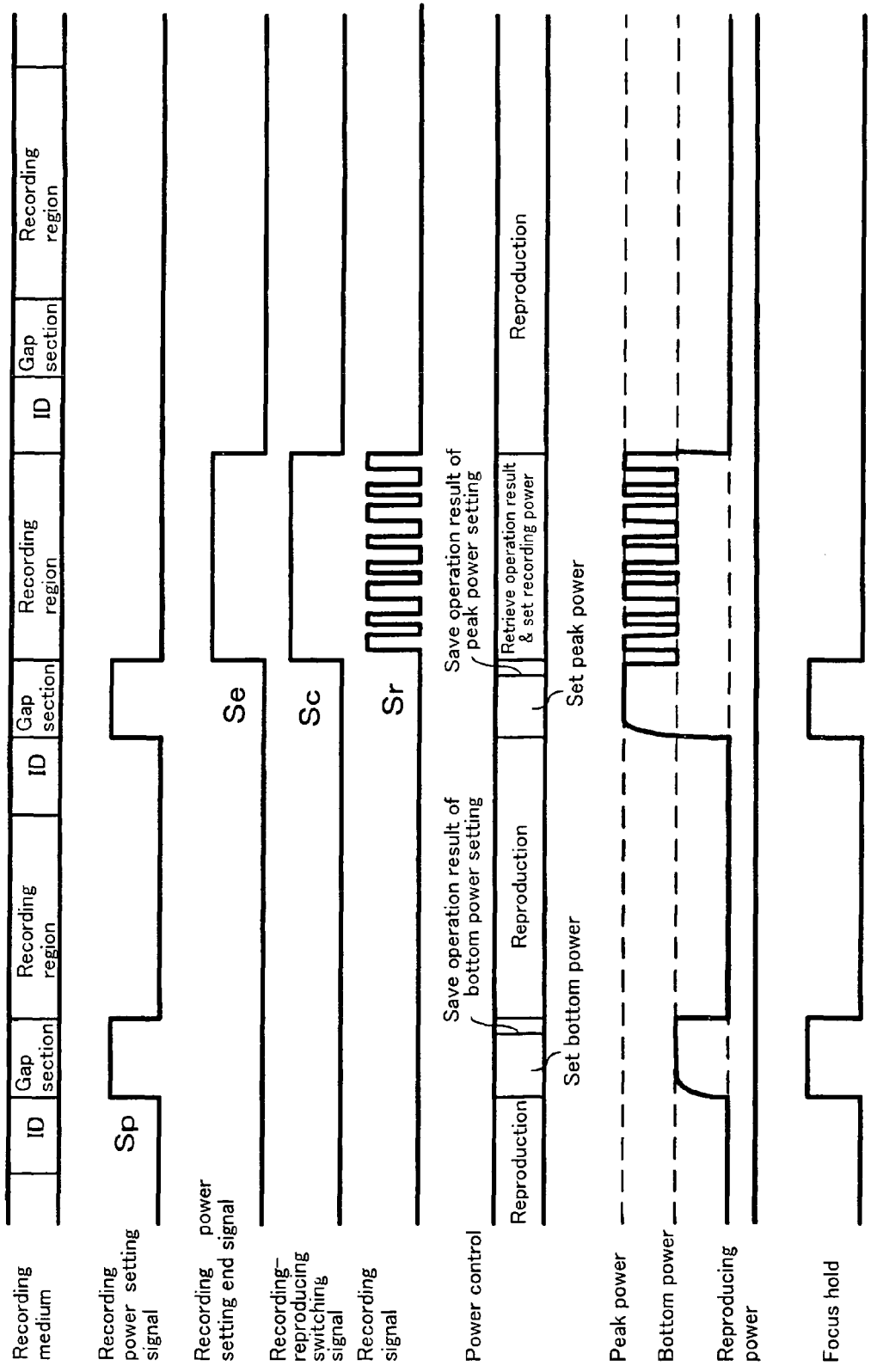
FIG. 5 is an illustration for describing the action waveform at the time of setting the recording power in the optical disk apparatus according to the first embodiment of the present invention.

The mutual relations and the actions of the arithmetic processing device 3-1, the drive controller 3-2, and the laser drive device 3-3 will be described referring to FIG. 5. FIG. 5 is an illustration of action waveforms at the time of setting the recording power, which shows the relations regarding the sectors on an information recording medium, the recording power setting end signal Se, the recording-reproducing switching signal Sc, the recording signal Sr, the power control modes of the arithmetic processing device 3-1 and the laser output powers. It indicates that the bottom power setting is carried out in the gap section of the recording sector, and setting of the power is completed in one time. By separately carrying out the settings of the bottom power and the peak power in two gap sections in this way, stable power setting can be achieved without giving influence of the fluctuation of the laser powers to the ID section and the recording region. Further, as the first switch 4-2-1 outputs the focus error signal FE to the first lowpass filter 4-2-2 in the region where the recording power setting signal Sp is "H", the high frequency component to be superimposed on the focus error signal FE can be eliminated.

Figure 6:
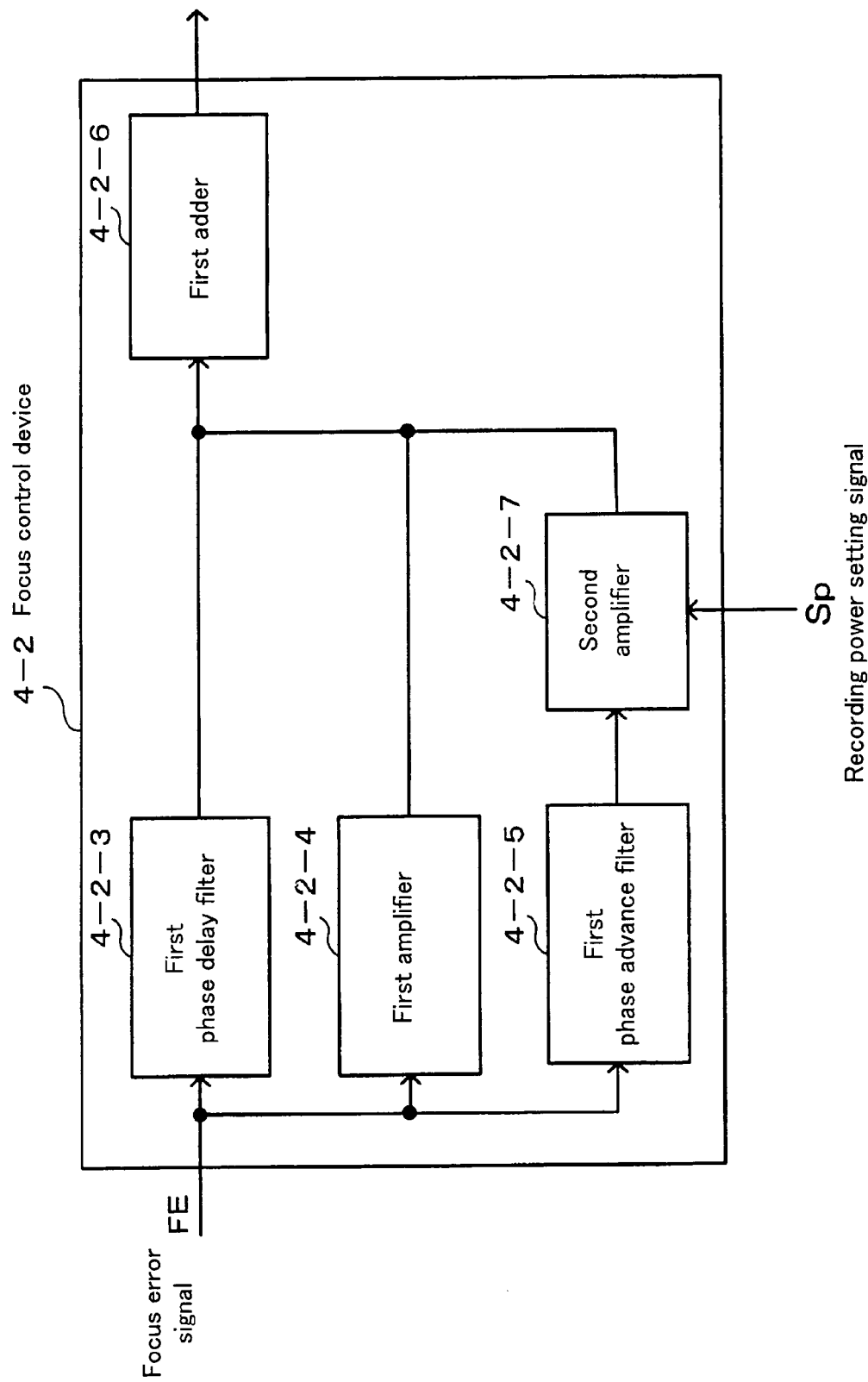
FIG. 6 is a second block diagram showing the structure of the focus control device according to the first embodiment of the present invention.

Further, the same effect can also be obtained when the structure of the focus control device 4-2 shown in FIG. 2 is modified to the structure shown in FIG. 6. FIG. 6 is a block diagram showing a second structural example of the focus control device 4-2. The focus error signal FE detected by the focus error detector 4-1 is inputted to the first phase delay filter 4-2-3, the first amplifier 4-2-4, and the first phase advance filter 4-2-5. The output of the first phase advance filter 4-2-5 is inputted to a second amplifier 4-2-7. The second amplifier 4-2-7 is structured to have variable gains, to which the recording power setting signal Sp is inputted as the control signal. When the recording power setting signal Sp is "H", a first gain is selected and, when the recording power setting signal Sp is not "H", a second gain is selected. The first gain is set to be smaller than the second gain.

According to taking above structure, the high frequency gain of the focus control device 4-2 can be made small in the section where the recording power-setting signal Sp is "H". Therefore, stable focus control can be achieved without following the disturbance even when the peak power or the bias power is set in the gap section and the high frequency disturbance is superimposed on the focus error signal FE due to fluctuation of the wavelength, etc.

Figure 7:
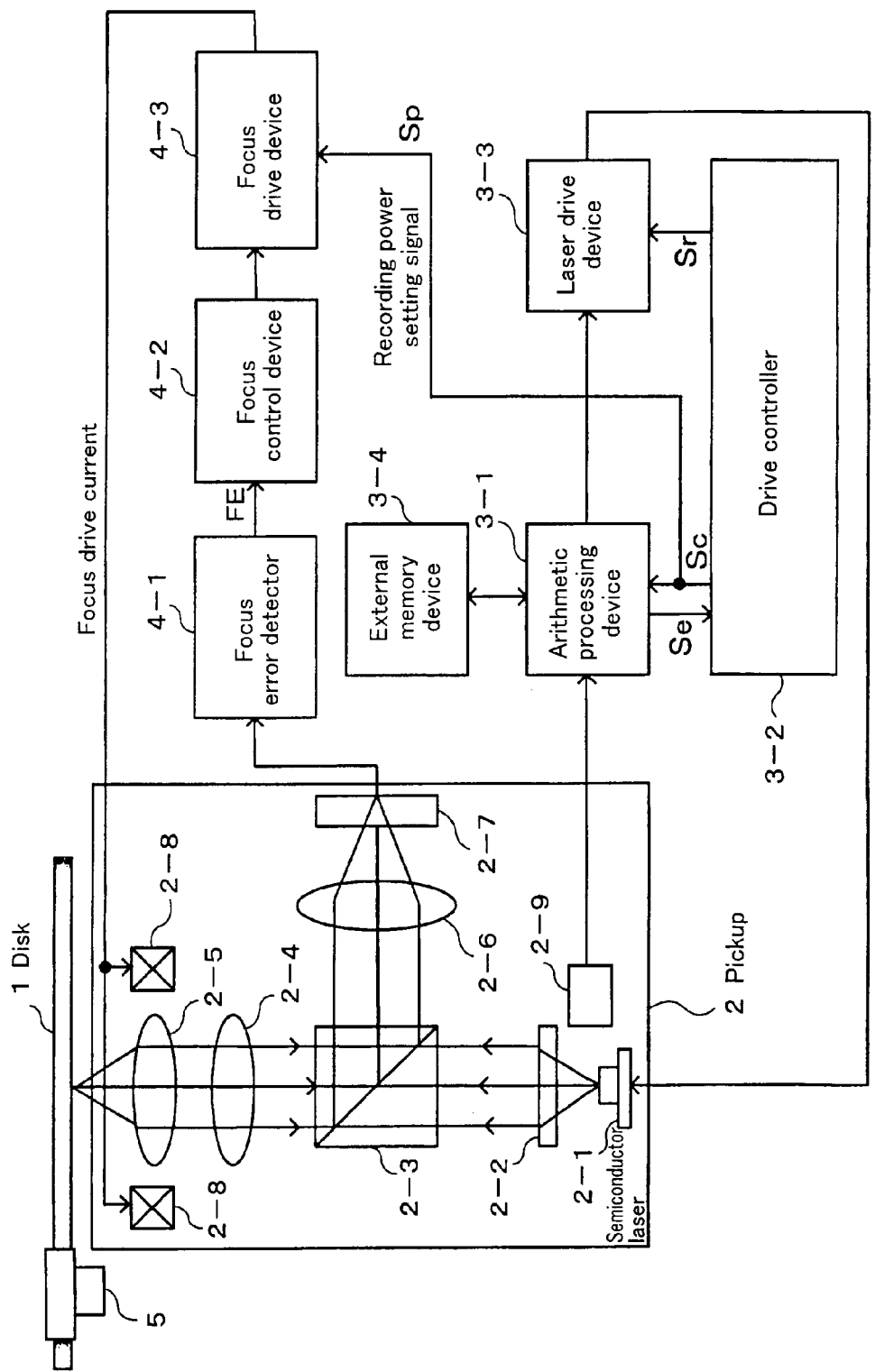
FIG. 7 is a second block diagram showing the structure of the optical disk apparatus according to the first embodiment of the present invention.
Figure 8:
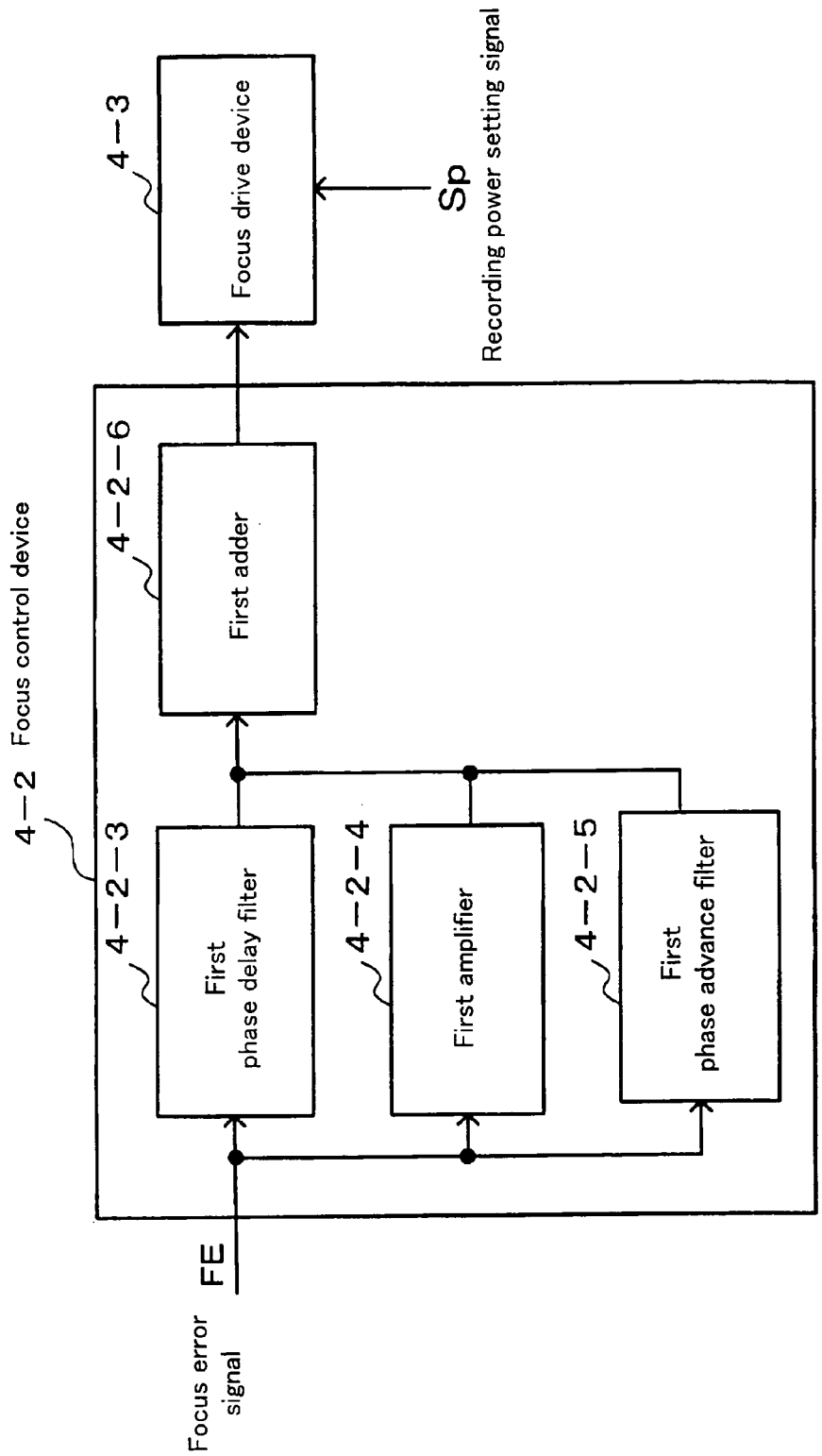
FIG. 8 is a block diagram showing the structure of the focus control device according to the first embodiment of the present invention, and the connecting relation between a focus drive device.

As shown in FIG. 7, the structure of the optical disk apparatus shown in FIG. 1 may be modified in such a manner that the recording power setting signal Sp outputted from the drive controller 3-2 is inputted to the focus drive device 4-3, and an operation may be performed by the focus control device 4-2 and the focus drive device 4-3 shown in FIG. 8. FIG. 8 is a block diagram of the focus control device 4-2 and the focus drive device 4-3. The focus error signal FE detected by the focus error detector 4-1 is inputted as the input signal of the first phase delay filter 4-2-3, the first amplifier 4-2-4 and the first phase advance filter 4-2-5. Each signal that is phase-compensated in the first phase delay filter 4-2-3, the first amplifier 4-2-4 and the first phase advance filter 4-2-5 is inputted to the first adder 4-2-6 to receive adding processing therein. The output of the first adder 4-2-6 is outputted to the focus drive device 4-3 as the output of the focus control device 4-2. The focus drive device 4-3 uses the recording power setting signal Sp as the control signal, and keeps the output value of just before the recording power setting signal Sp switches from "L" to "H", when the recording power setting signal Sp is "H". Further, when the recording power setting signal Sp switches from "H" to "L", the focus drive device 4-3 outputs the focus drive signal to the actuator 2-8 to control the objective lens 2-5 in accordance with the output of the focus control device 4-2. By taking such structure, stable focus control can be achieved even when the peak power or the bias power is set in the gap section and the high frequency disturbance is superimposed on the focus error signal FE due to fluctuation of the wavelength or the like.

Figure 9:
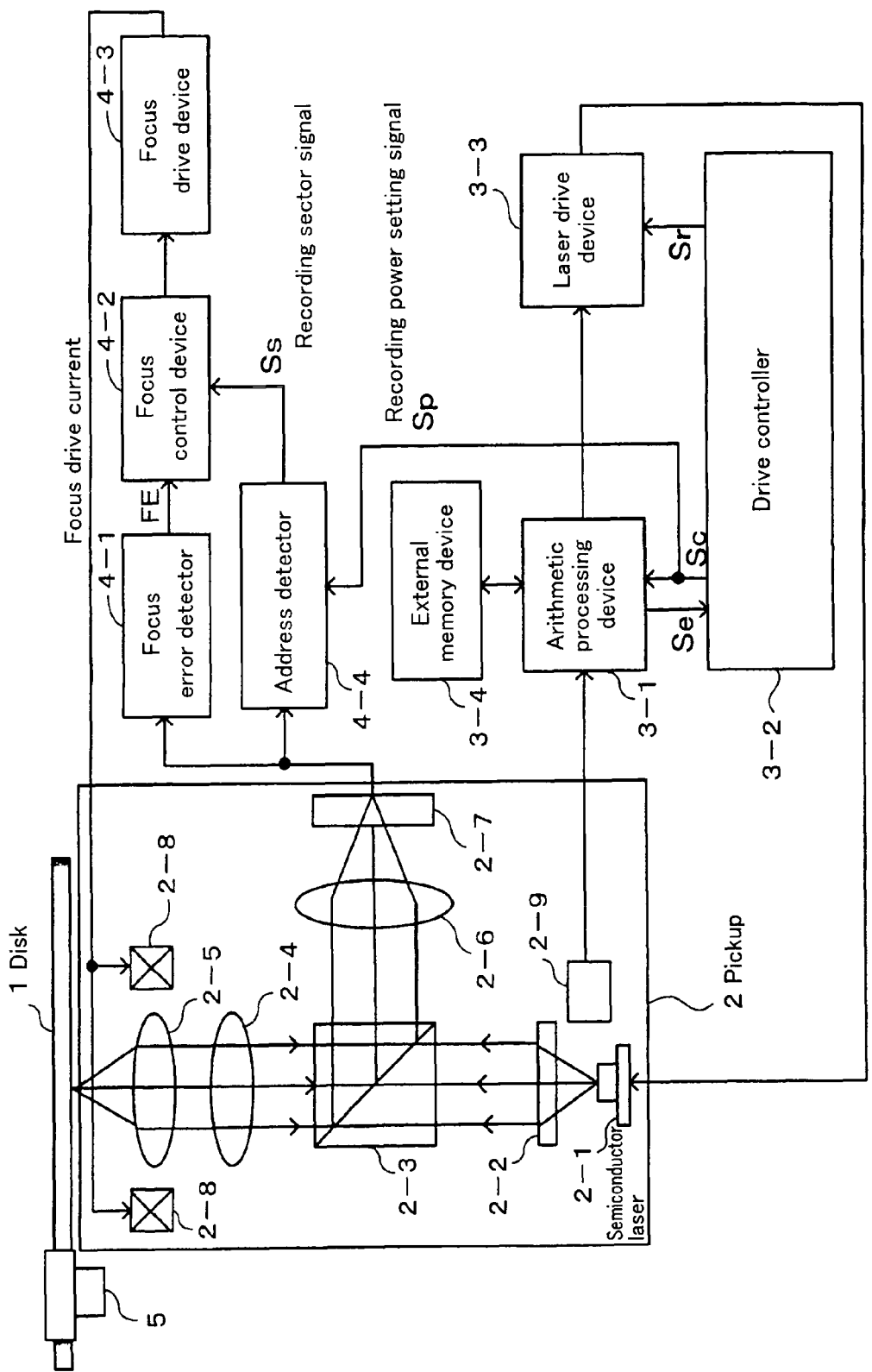
FIG. 9 is a third block diagram showing the structure of the optical disk apparatus according to the first embodiment of the present invention.

The structure of the optical disk apparatus shown in FIG. 1 may be modified to the structure shown in FIG. 9. In FIG. 9, the output signal of the reproducing light detector 2-7 is inputted to an address detector 4-4. The address detector 4-4 also has the recording power-setting signal Sp as the input signal and detects one sector that includes the section where the recording power setting signal Sp is "H" and the recording region just thereafter, as a recording sector signal Ss. Then, the address detector 4-4 outputs it to the focus control device 4-2. In the explanation provided above referring to FIG. 1, the first switch 4-2-1 switches the output of the focus error signal FE with the recording power-setting signal Sp as the control signal. However, the same switching action is performed herein by using the recording sector signal Ss as the control signal.

The action of the address detector 4-4 will be described referring to FIG. 10 and FIG. 11. FIG. 10 is a block diagram of the address detector 4-4. The reproduction signal outputted from the reproducing: light detector 2-7 is inputted to a comparator 4-4-1. The comparator 4-4-41 compares a value set in advance and the reproduction signal, and outputs a binary signal. The output of the comparator 4-4-1 is inputted to a first extension circuit 4-4-2 and an edge detecting circuit 4-4-5. When the output of the comparator changes from "H" to "L", the first extension circuit 4-4-2 outputs "H" by extending the time for a prescribed length, and outputs "L" after the prescribed time has passed. Further, the edge detecting circuit 4-4-5 detects the edge at which the output of the comparator 4-4-1 switches from "L" to "H", and outputs "H" for a prescribed time. The output of the first extension circuit 4-4-2 is inputted to a logic circuit 4-4-3. The recording power setting signal Sp is also inputted to the logic circuit 4-4-3, and "H" is outputted only in the section where the output signal of the first extension circuit 4-4-2 and the recording power setting signal Sp are both turned to "H". The output of the logic circuit 4-4-3 is inputted to a second extension circuit 4-4-4. The second extension circuit 4-4-4 uses the output of the edge detecting circuit 4-4-5 as control signal. When the output of the logic circuit 4-4-3 turns to "H", the second extension circuit 4-4-4 outputs the output signal of the second extension circuit 4-4-4, "H", and keeps the output until the output of the edge detecting circuit 4-4-5 turns to "H".

FIG. 11 shows the diagram that the above description is indicated as the waveforms of the actions. At position X1, the beam spot scans the header region (indicated as header in the drawing) of the DVD-RAM. The header region is formed with pit arrays, which is a region with higher reflectance compared to the recording region and the like. The comparator 4-4-4 compares a prescribed value set in advance and the reproduction signal. The prescribed value set in advance is set to the reproduction signal level in the recording region, so that "H" is outputted in the section where the beam spot scans the header region. Further, the output of the first extension circuit 4-4-2 becomes also "H". The beam spot scans the dead end (X2 in the drawing) of the header region. The beam spot moves form the header region to the recording region. Thus, the reproduction signal becomes smaller compared to that in the header region, and the output of the comparator 4-4-1 changes to "L". However, the first extension circuit 4-4-2 maintains the output to "H". The drive controller 3-2 outputs the recording power setting signal Sp. Since the output of the first extension circuit 4-4-2 and the recording power setting signal Sp both have turned to "H", the logic circuit 4-4-3 sets the output of itself to "H". Further, the second extension circuit 4-4-4 outputs "H" as well. When the beam spot scans position X3, the first extension circuit 4-4-2 detects that a prescribed time has passed since the output of the comparator 4-4-1 is switched from "H" to "L", and outputs "L". Because the output of the first extension circuit 4-4-2 is switched to "L", the output of the logic circuit 4-4-3 also changes to "L". However, the output of the second extension circuit 4-4-4 is maintained to "H". When the beam spot scans the dead end (position X4 in the drawing) of the gap section, the recording power setting signal Sp from the drive controller 3-2 turns to "L". However, the second extension circuit 4-4-4 maintains and outputs "H" until the output of the edge detecting circuit 4-4-5 turns to "H". The output of the second extension circuit 4-4-4 also becomes "H" in the data recording region (indicated as data region in the drawing). When the beam spot scans position X7, it means that the beam spot has scanned one sector. Thus, scanning of the next sector is started. That is, the header region is scanned again. The comparator 4-4-1 sets the output to "H" again. The edge detecting circuit 4-4-1 detects that the output of the comparator 4-4-1 switches from "L" to "H". As a result, the output of the edge detecting circuit 4-4-5 turns to "H". Because the output of the edge detecting circuit 4-4-5 changes to "H", the output of the second extension circuit switches from "H" to "L".

By the manner as described above, the whole one sector can be scanned in the case where the recording power setting signal Sp turns to "H".

The action of the beam spot when scanning the position X8 and thereafter is the same as the action of scanning the above-described position X2, so that the explanation thereof will be omitted.

When the recording power setting signal Sp does not turn to "H", the output of the logic circuit 4-4-3 becomes "L". Thus, the output of the second extension circuit 4-4-4 remains to be "L" as well (not shown in the drawing).

In this embodiment, the powers outputted from the laser drive device 3-3 in the gap section are set as the bottom power and the peak power. However, the effect of the embodiment is not limited only to the bottom power and the peak power. The same effect can be obtained in any powers, when outputting powers larger than the reproduction power in the gap section.

The embodiment illustrates the state where the bottom power setting is carried out in the gap section of the recording sector, and the power setting is completed in one time. However, setting of the peak power may be performed a plurality of times.

Figure 12:
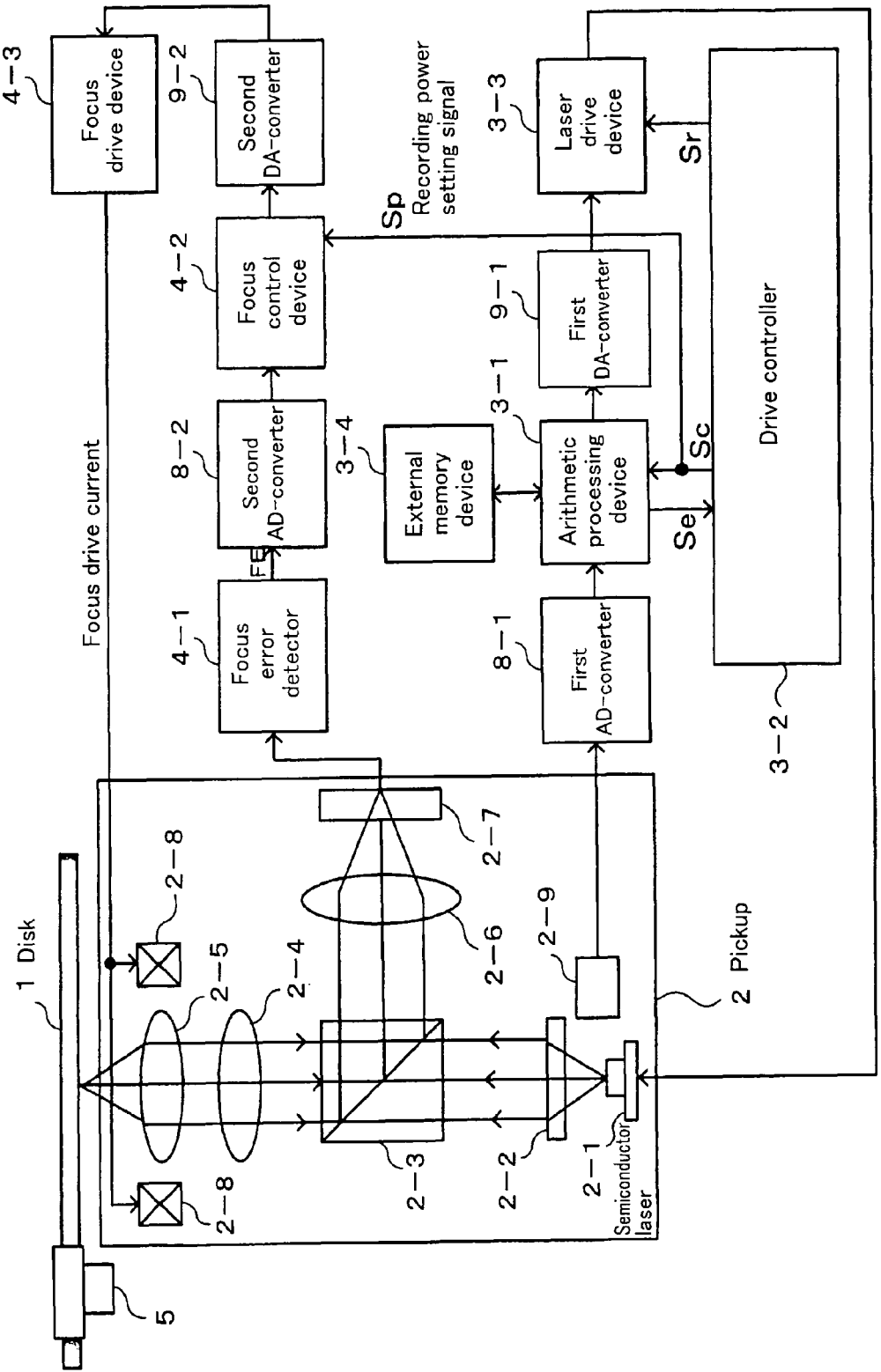
FIG. 12 is a fourth block diagram showing the structure of the optical disk apparatus according to the first embodiment of the present invention.

As shown in FIG. 12, it may be structured so as to AD-convert the outputs of the photodetector 2-9 and the focus error detector 4-1, achieve the arithmetic processing device 3-1 and the focus control device 4-2 with a control program, and DA-convert the outputs thereof. A first AD-converter 8-1 is provided in the previous stage of the arithmetic processing device 3-1, and a first DA-converter 9-1 is provided in the latter stage. Further, a second AD-converter 8-2 is provided in the previous stage of the focus control device 4-2, and a second DA-converter 9-2 is provided in the latter stage. The same effect can also be achieved in this case.

In the embodiment, the DVD-RAM disk is loaded as the disk 1. However, the present invention can be applied to disks other than the DVD-RAM disk, as log as they are the disks that have a plurality of recording regions and gap sections not used for recording before the recording regions along the recording track.

Second Embodiment

A second embodiment of the present invention mainly regards to tracking control.

Figure 13:
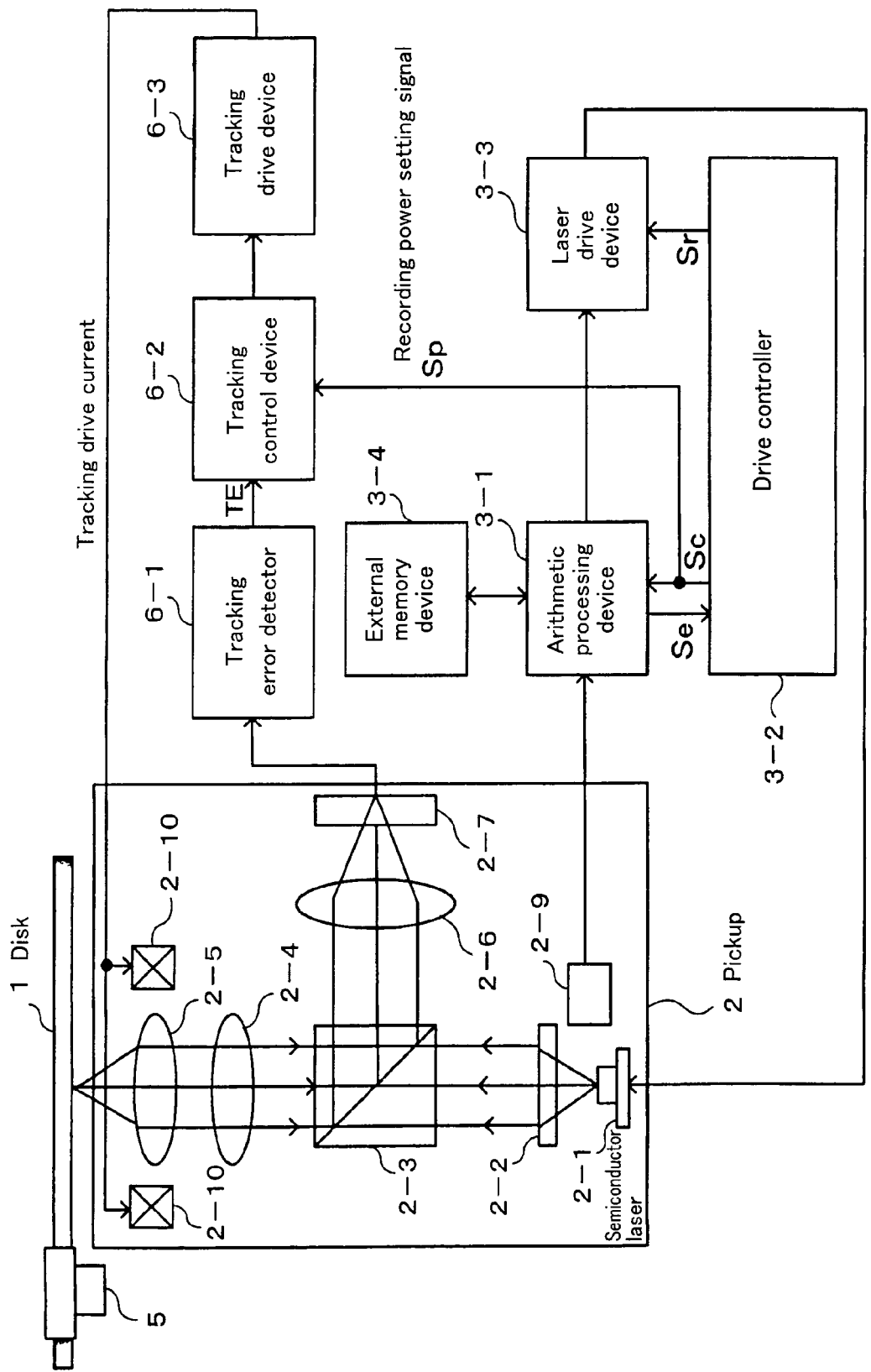
FIG. 13 is a first block diagram showing the structure of an optical disk apparatus according to a second embodiment of the present invention.

FIG. 13 is a block diagram showing a structural example of the optical disk apparatus according to the second embodiment of the present invention. In FIG. 13, it is assumed that a DVD-RAM disk is loaded as an example of the disk 1. A part of laser beams emitted from the semiconductor lens 2-1 is detected by a photodetector 2-9, and converted to an electric signal. The output signal of the photodetector 2-9 is inputted to an arithmetic processing device 3-1. The arithmetic processing device 3-1, while referring to the output signal of the photodetector 2-9, performs arithmetic processing so that the power of the light emitted from the semiconductor laser 2-1 becomes a prescribed value, and outputs the result of the arithmetic processing to a laser drive device 3-3. The laser drive device 3-3 drives the semiconductor laser 2-1 in accordance with the output signal of the arithmetic processing device 3-1 to control the laser power. A recording power setting signal Sp, a recording power setting end signal Se and a recording-reproducing switching signal Sc are exchanged between a drive controller 3-2 and the arithmetic processing device 3-1 to be used for switching the laser powers to either reproducing or recording state and as the timing for storing the result of the arithmetic processing to an external memory device 3-4. After completing the setting of the recording power, the laser drive device 3-3 performs modulation action in accordance with the recording signal Sr outputted from the drive controller 3-2, and recording of information is carried out.

The laser beams emitted from the semiconductor laser 2-1 are shaped into parallel beams by the collimator lens 2-2, and the parallel beams enter the objective lens 2-5 after passing through the polarization beam splitter 2-3 and the wavelength plate 2-4. The laser beams entered to the objective lens 2-5 are condensed so as to form a beam spot on the disk 1. The reflected light of the beam spot condensed on the disk 1 again passes through the objective lens 2-5 and the wavelength plate 2-4. It is then separated from the optical path of the emitted light by the polarization beam splitter 2-3, and condensed on a prescribed light receiving face of the reproduction light generator 2-7 through the condenser lens 2-6.

The reflected light condensed to the reproducing light detector 2-7 is converted to an electric signal and inputted to a tracking error detector 6-1. The tracking error detector 6-1 detects tracking error signal TE as the amount of position shift between the track of the disk 1 and the beam spot from the output of the reproducing light detector 2-7, and outputs it to a tracking control device 6-2. Based on the tracking error signal TE, the tracking control device 6-2 outputs a drive signal for controlling the position shift between the track of the disk 1 and the beam spot to be zero to a tracking drive device 6-3. In accordance with the output of the tracking control device 6-2, the tracking drive device 6-3 outputs the tracking drive current to a tracking actuator 2-10. The tracking actuator 2-10 drives the objective lens 2-5 by the tracking drive current in the directions across the disk 1.

The recording power setting signal Sp outputted from the drive controller 3-2 is inputted to the tracking control device 6-2 as well.

Figure 14:
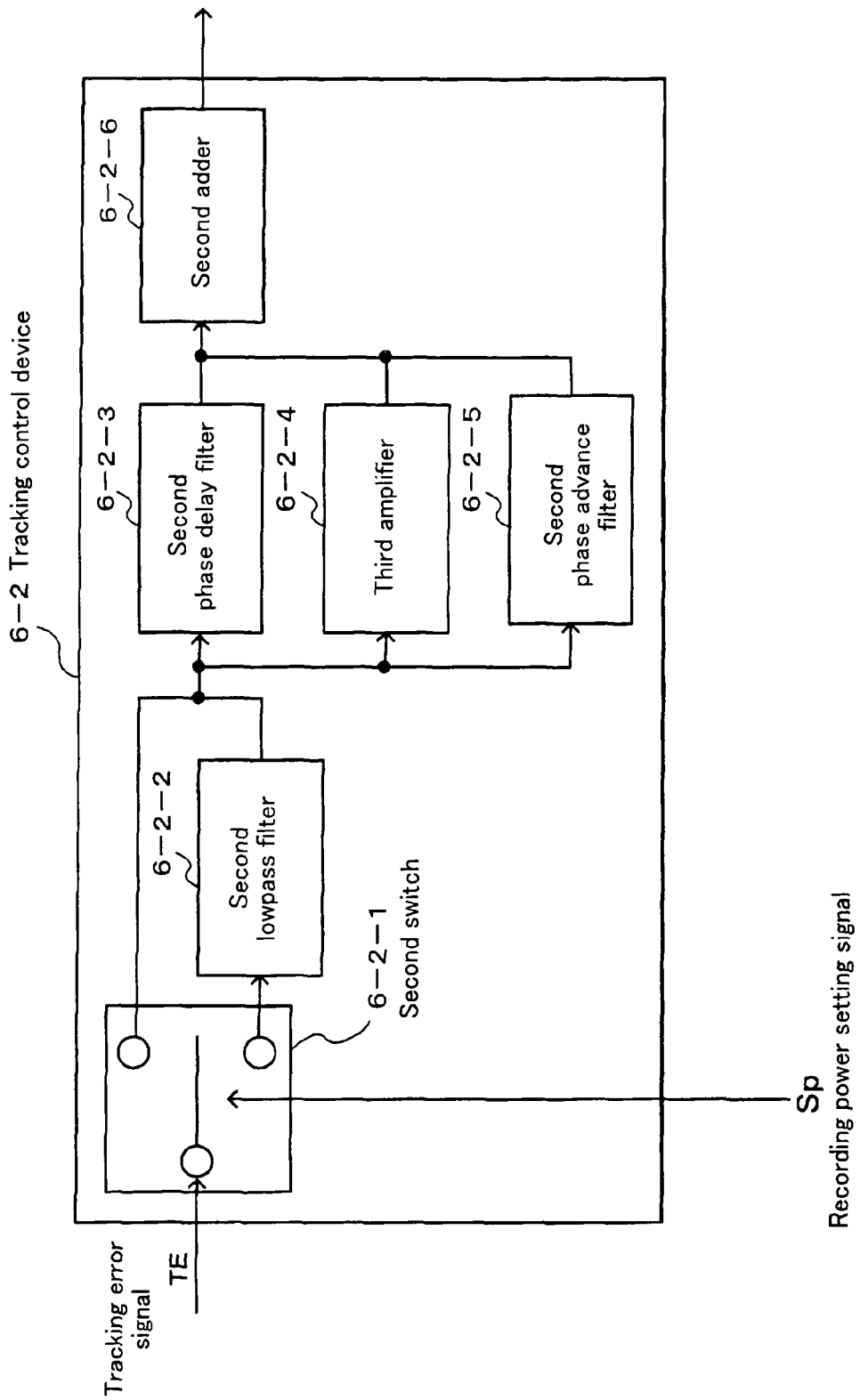
FIG. 14 is a first block diagram showing the structure of a tracking control device according to the second embodiment of the present invention.

The structure of the tracking control device 6-2 will be described referring to FIG. 14. FIG. 14 is a block diagram showing the tracking control device 6-2. The tracking error signal TE detected by the tracking error detector 6-1 is inputted to a second switch 6-2-1. The control signal of the second switch 6-2-1 is the recording power setting signal Sp. When the recording power setting signal Sp is "H", the tracking error signal TE is outputted to a second lowpass filter 6-2-2. When the recording power setting signal Sp is not "H", it is directly outputted to the second phase delay filter 6-2-3, the third amplifier 6-2-4, and the second phase advance filter 6-2-5.

The outputs of the second delay filter 6-2-3, the third amplifier 6-2-4, and the second phase advance filter 6-2-5 are inputted to a second adder 6-2-6. The second adder 6-2-6 adds the outputs of the second delay filter 6-2-3, the third amplifier 6-2-4 and the second phase advance filter 6-2-5, and outputs the added result to the tracking drive device 6-3.

The output of the second switch 6-2-1 is inputted to the second phase delay filter 6-2-3, the third amplifier 6-2-4 and the second phase advance filter 6-2-5. In other words, the second switch 6-2-1 functions to judge whether or not the high frequency component of the tracking error signal TE is cut off.

Figure 15:
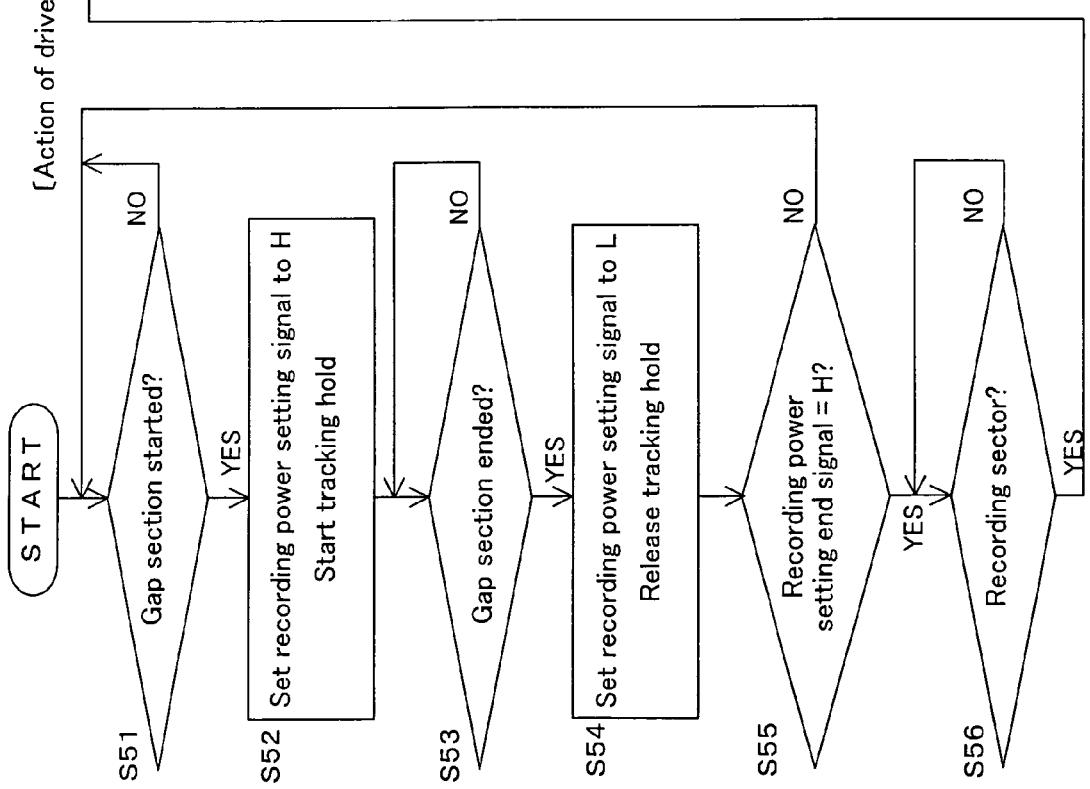
FIG. 15 is a flowchart showing the recording action procedure of a drive controller according to the second embodiment of the present invention.

The procedure of the recording power setting and the tracking control state will be described referring to FIG. 15. FIG. 15 is a flowchart showing the action of the drive controller 3-2. When the recording action is started, initiation of a gap section of a given sector is detected firstly (step S51). Upon detecting that a beam spot has started to scan the gap section, the recording power setting signal Sp is set to "H". The recording power setting signal Sp is inputted also to the tracking control device 6-2, and the tracking control device 6-2 executes hold processing in the section where the recording power setting signal Sp is "H" (step S52). The hold processing is so defined that the second switch 6-2-1 inputs the tracking error signal TE to the second lowpass filter 6-2-2 to eliminate the high frequency component of the tracking error signal TE.

When the end of the gap section is detected (step S53), the recording power setting signal Sp is set to "L". When the recording power setting signal Sp turns to "L", the tracking control device 6-2 releases the hold processing (step S54). Release of the hold processing is so defined that the second switch 6-2-1 outputs the tracking error signal TE directly to the second phase delay filter 6-2-3, the third amplifier 6-2-4, and the second phase advance filter 4-2-5.

The arithmetic processing device 3-1 performs the recording power setting in the section where the recording power setting signal Sp is "H" and, when the recording power setting is completed, sets the recording power setting end signal Se to "H" in relation to the drive controller 3-2. The section where the recording power setting end signal Se is not turned to "H" indicates that the recording power setting has not completed yet in one gap section. Thus, actions of detecting the gap section and setting the recording power setting signal Sp to "H" and "L" are repeated until the recording power setting end signal Se turns to "H" (step S55). Upon detecting that the recording power setting end signal Se is "H", it is checked whether or not it is the recording sector. If it is not the recording sector, it is continued to wait until becoming the recording sector (step S56). If it is the recording sector, the start of the recording region is detected (step S57). When the recording sector is started, the recording-reproducing switching signal Sc is turned to "H" (step S58), and the recording signal Sr is outputted to the laser drive device 3-3 (step S59). Upon detecting the end of the recording region (step S60), the recording-reproducing switching signal Sc is turned to "L" (step S61). Thereby, the recording power setting action of the drive controller 3-2 is completed.

Figure 16:
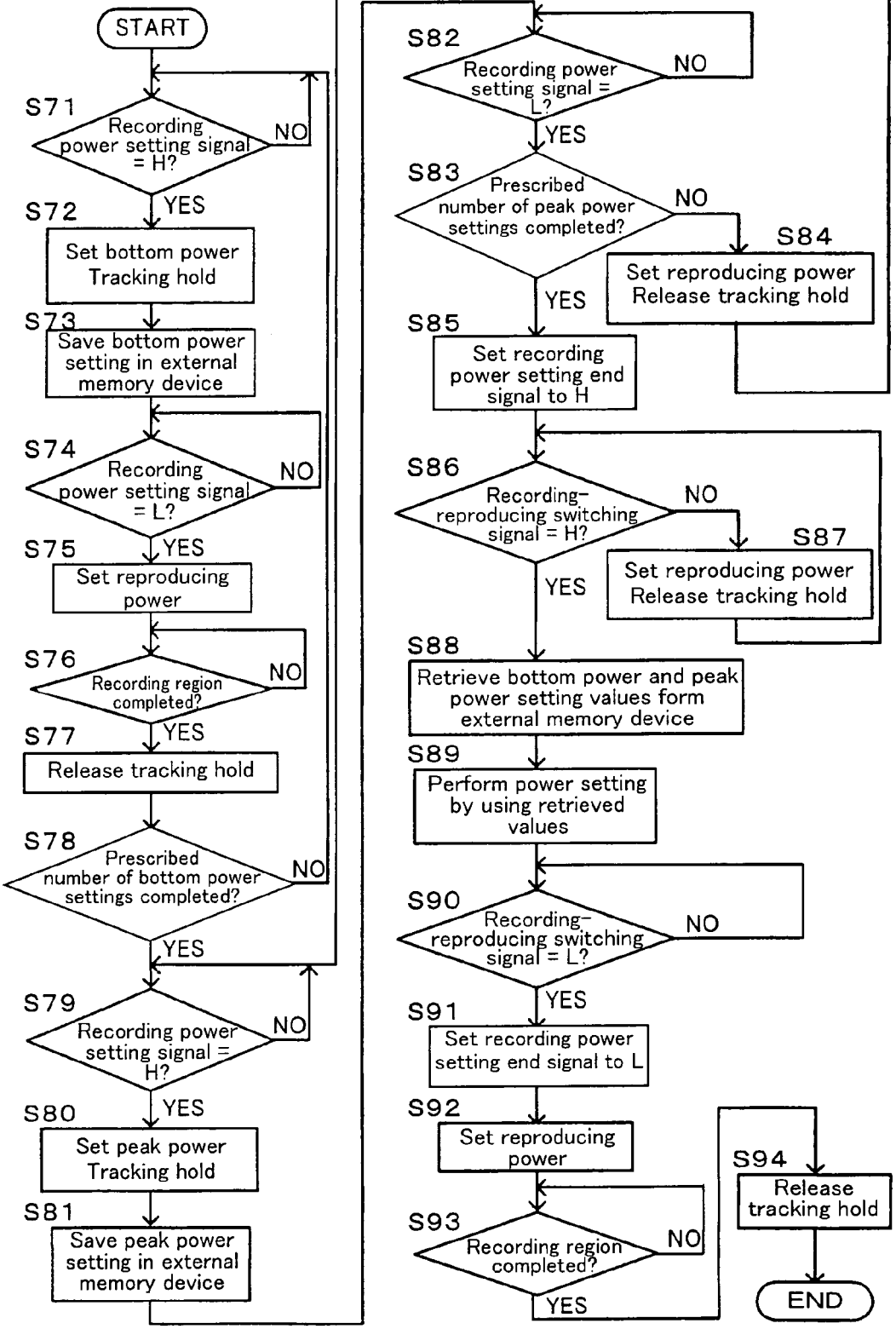
FIG. 16 is a flowchart showing the recording action procedure of an arithmetic processing device according to the second embodiment of the present invention.

FIG. 16 is a flowchart showing the action of the arithmetic processing device 3-1 in setting the recording power. This flowchart corresponds to the flowchart shown FIG. 4 of the first embodiment where "focus" is replaced with "tracking". Steps S72, S77 S80, S84, S87, and S94 are corresponded to it. It should be understood that the explanation of the actions in FIG. 16, can be described by replacing "focus" to "tracking" in the explanation of the actions in FIG. 4. That is, in the step where the focus control device 4-2 executes the hold processing in the first embodiment, the tracking control device 6-2 executes the hold processing in this embodiment instead. Further, in the step where the focus control device 4-2 releases the hold processing in the first embodiment, the tracking control device 6-2 releases the hold processing in this embodiment instead.

Furthermore, the mutual relationship of the arithmetic processing device 3-1, the drive controller 3-2 and the laser drive device 3-2 has been described in the first embodiment referring to FIG. 5, so that the description thereof is omitted here.

As described above, the tracking control device 6-2 executes the hold processing in the section where the recording power setting signal Sp is "H". Thus, the high frequency component of the tracking error signal TE shown in FIG. 14 is cut off. Therefore, even when the disturbance is superimposed on the tracking error signal TE, the output of the tracking drive device 6-3 does not follow the disturbance component, thereby stable tracking control is achieved.

Figure 17:
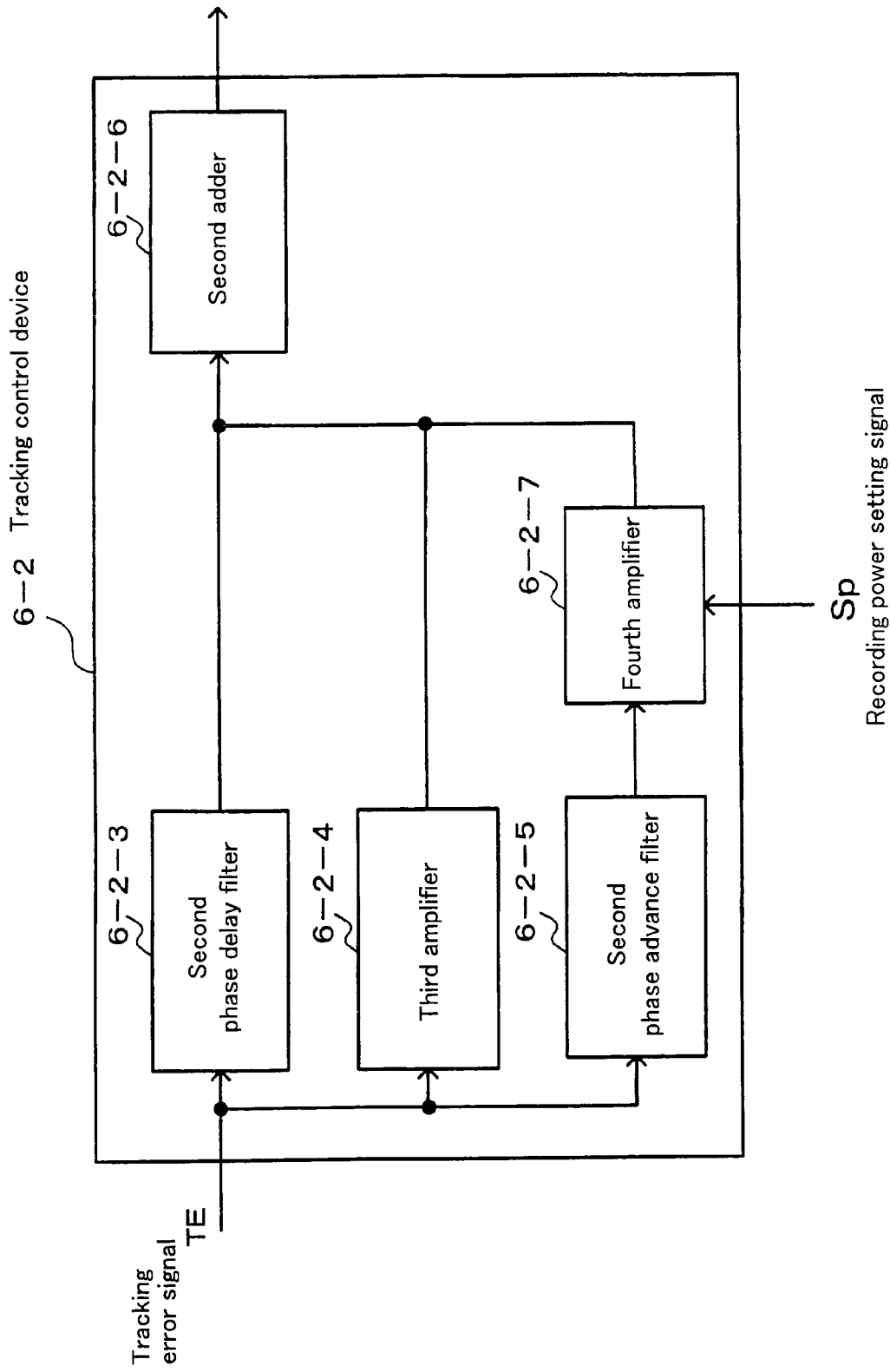
FIG. 17 is a second block diagram showing the structure of the tracking control device according to the second embodiment of the present invention.

The same effect can also be obtained when the structure of the tracking control device 6-2 shown in FIG. 14 is modified to the structure shown in FIG. 17. FIG. 17 is a block diagram showing a second structural example of the tracking control device 6-2. The tracking error signal TE detected by the tracking error detector 6-1 is inputted to the second phase delay filter 6-2-3, the third amplifier 6-2-4 and the second phase advance filter 6-2-5. The output of the second phase advance filter 4-2-5 is inputted to a fourth amplifier 6-2-7. The fourth amplifier 6-2-7 is structured to have variable gains, to which the recording power setting signal Sp is inputted as the control signal. When the recording power setting signal Sp is "H", a third gain is selected and, when the recording power setting signal Sp is not "H", a fourth gain is selected. The third gain is set to be smaller than the fourth gain.

By taking the structure described above, the high frequency gain of the tracking control device 6-2 can be made small in the section where the recording power setting signal Sp is "H". Therefore, stable tracking control can be achieved without following the disturbance even when the peak power or the bias power is set in the gap section and the high frequency disturbance is superimposed on the tracking error signal TE due to fluctuation of the wavelength and the like.

Figure 18:
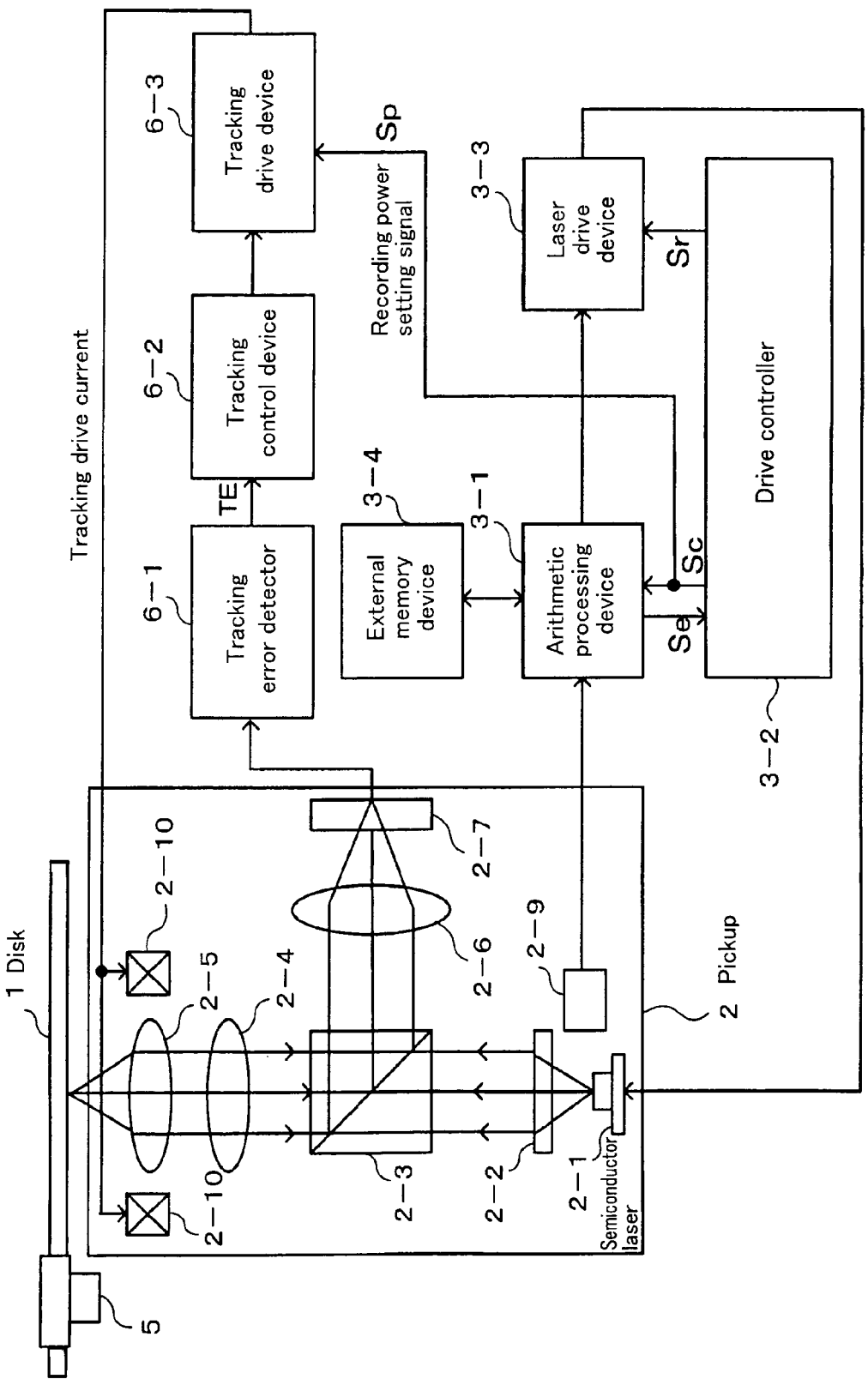
FIG. 18 is a second block diagram showing the structure of the optical disk apparatus according to the second embodiment of the present invention.
Figure 19:
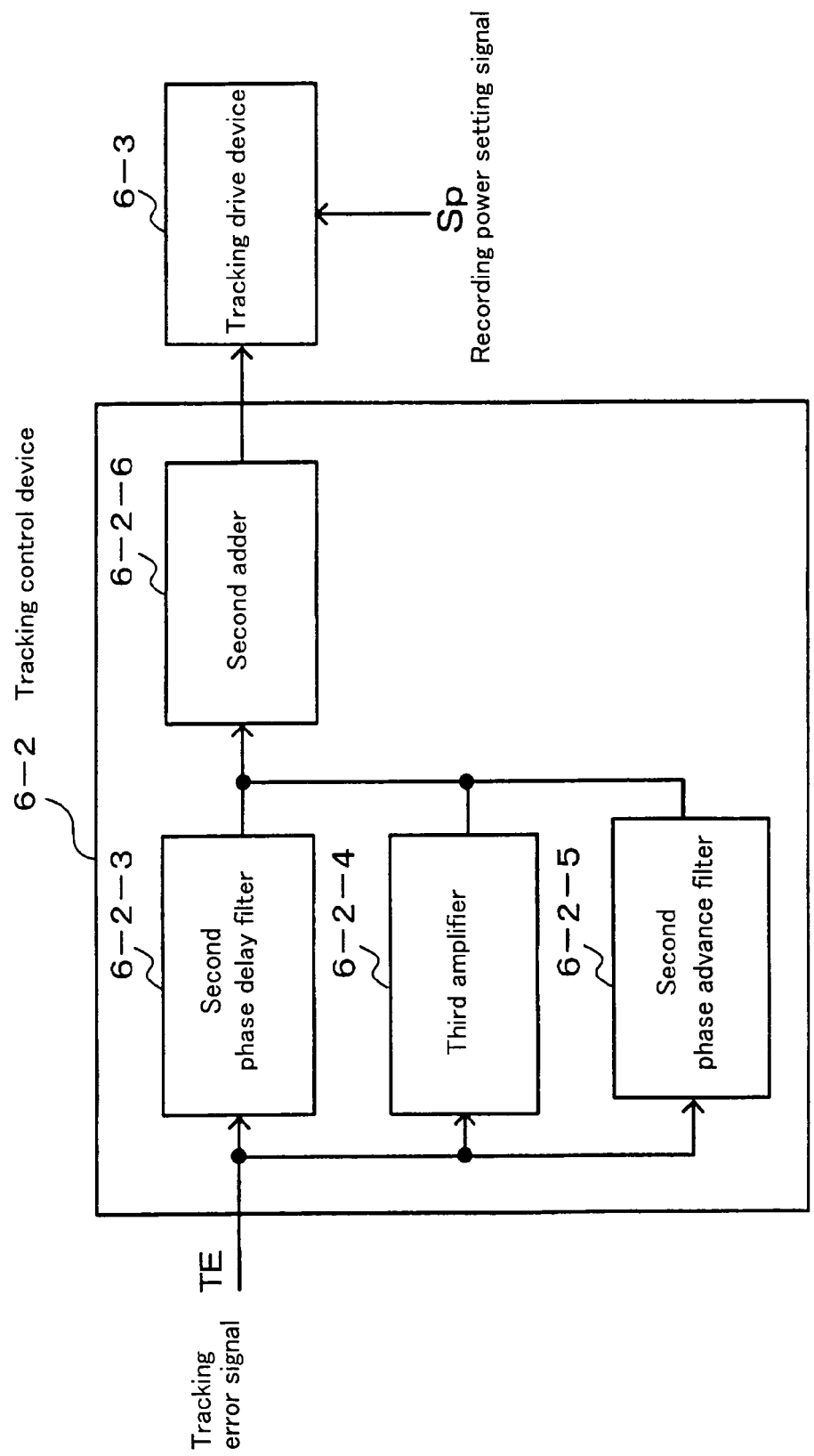
FIG. 19 is a block diagram showing the structure of the tracking control device according to the second embodiment of the present invention, and the connecting relation between a tracking drive device.

As shown in FIG. 18, the structure of the optical disk apparatus shown in FIG. 13 may be modified in such a manner that the recording power setting signal Sp outputted from the drive controller 3-2 is inputted to the tracking drive device 6-3, and an operation may be performed according to the tracking control device 6-2 and the tracking drive device 6-3 shown in FIG. 19. FIG. 19 is a block diagram of the tracking control device 6-2 and the tracking drive device 6-3. The tracking error signal TE detected by the tracking error detector 6-1 is inputted as the input signal of the second phase delay filter 6-2-3, the third amplifier 6-2-4 and the second phase advance filter 6-2-5. Each signal that is phase-compensated in the second phase delay filter 6-2-3, the third amplifier 6-2-4 and the second phase advance filter 6-2-5 is inputted to the second adder 6-2-6 to receive adding processing therein. The output of the second adder 6-2-6 is outputted to the tracking drive device 6-3 as the output of the tracking control device 6-2. The tracking drive device 6-3 uses the recording power setting signal Sp as the control signal, and keeps the output value of right before the recording power setting signal Sp switches from "L" to "H", when the recording power setting signal is "H". Further, when the recording power setting signal Sp switches from "H" to "L", the tracking control device 6-3 outputs the tracking drive signal to the actuator 2-10 to control the objective lens 2-5 in accordance with the output of the tracking control device 6-2.

With such structure, stable tracking control can be achieved even when the peak power or the bottom power is set in the gap section and the high frequency disturbance is superimposed on the tracking error signal TE due to fluctuation of the wavelength or the like.

Figure 20:
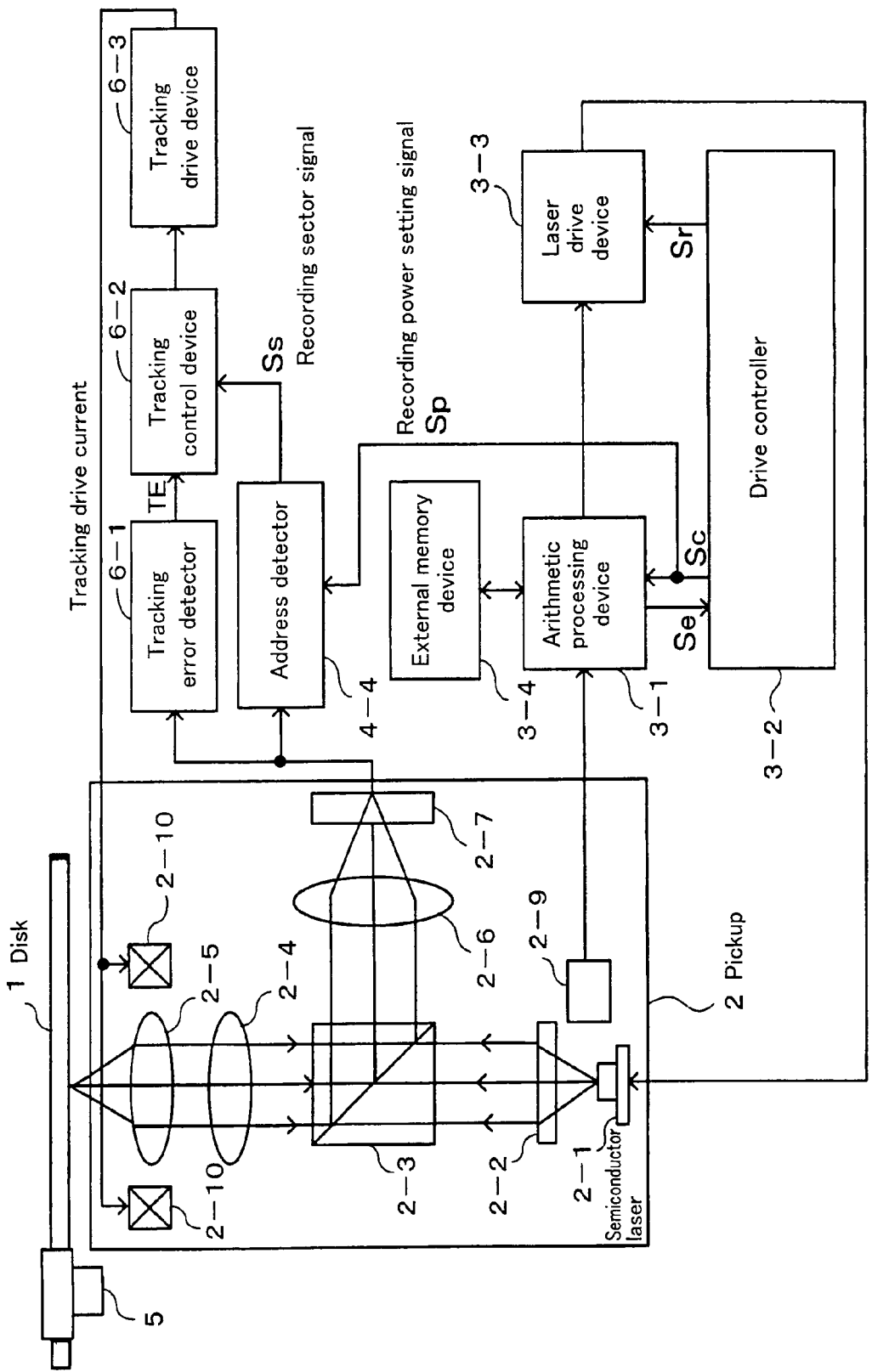
FIG. 20 is a third block diagram showing the structure of the optical disk apparatus according to the second embodiment of the present invention.

The structure of the optical disk apparatus shown in FIG. 13 may be modified to the structure shown in FIG. 20. In FIG. 20, the output signal of the reproducing light detector 2-7 is inputted to an address detector 4-4. The address detector 4-4 also has the recording power setting signal Sp as the input signal and detects one sector that includes the section where the recording power setting signal is "H" and the recording region right thereafter, as a recording sector signal Ss. Then, the address detector 4-4 outputs it to the tracking control device 6-2. In the explanation of FIG. 14, the second switch 6-2-1 switches the output of the tracking error signal TE by detecting the recording power setting signal Sp as the control signal. However, it is structured here to carry out the same switching action by using the recording sector signal Ss as the control signal.

The address detector 4-4 has already been described referring to FIG. 10, so that explanation thereof is omitted here.

Figure 21:
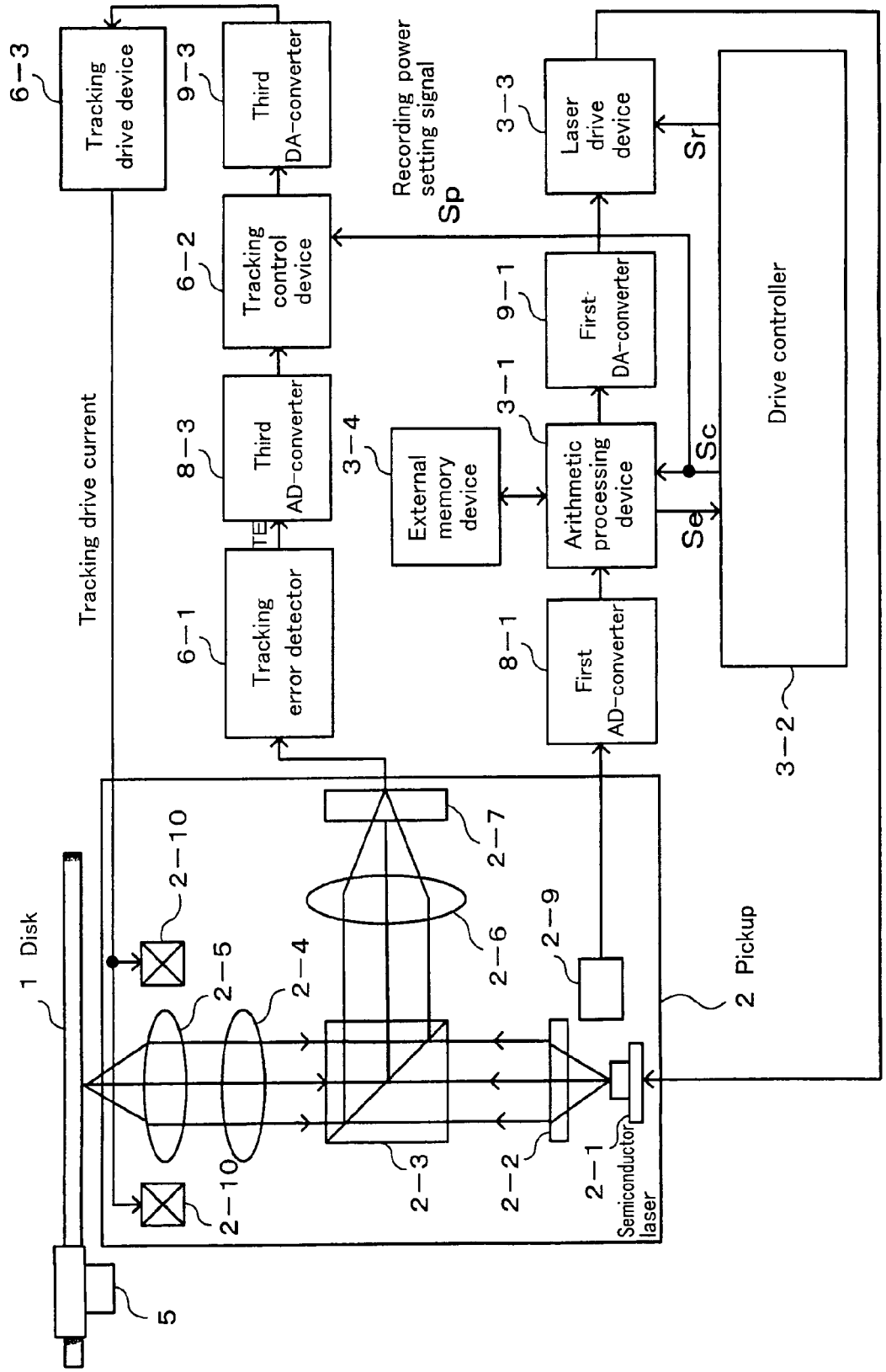
FIG. 21 is a fourth block diagram showing the structure of the optical disk apparatus according to the second embodiment of the present invention.

As shown in FIG. 21, it may be structured to AD-convert the outputs of the photodetector 2-9 and the tracking error detector 6-1, achieve the arithmetic processing device 3-1 and the tracking control device 6-2 with a control program, and DA-convert the outputs thereof. A first AD-converter 8-1 is provided in the previous stage of the arithmetic processing device 3-1, and a first DA-converter 9-1 is provided in the latter stage. Further, a third AD-converter 8-3 is provided in the previous stage of the tracking control device 6-2, and a third DA-converter 9-3 is provided in the latter stage. The same effect can also be achieved in this case.

In this embodiment, the powers outputted from the laser drive device 3-3 in the gap section are set as the bottom power and the peak power. However, the effect of the embodiment is not limited only to the bottom power and the peak power. The same effect can be obtained in any powers, when the larger powers than the reproduction power is outputted in the gap section.

The embodiment illustrates the state where the bottom power setting is carried out in the gap section of the recording sector, and the setting of power is completed in one time. However, setting of the peak power may be performed a plurality of times.

Third Embodiment

A third embodiment of the present invention mainly regards to motor control.

Figure 22:
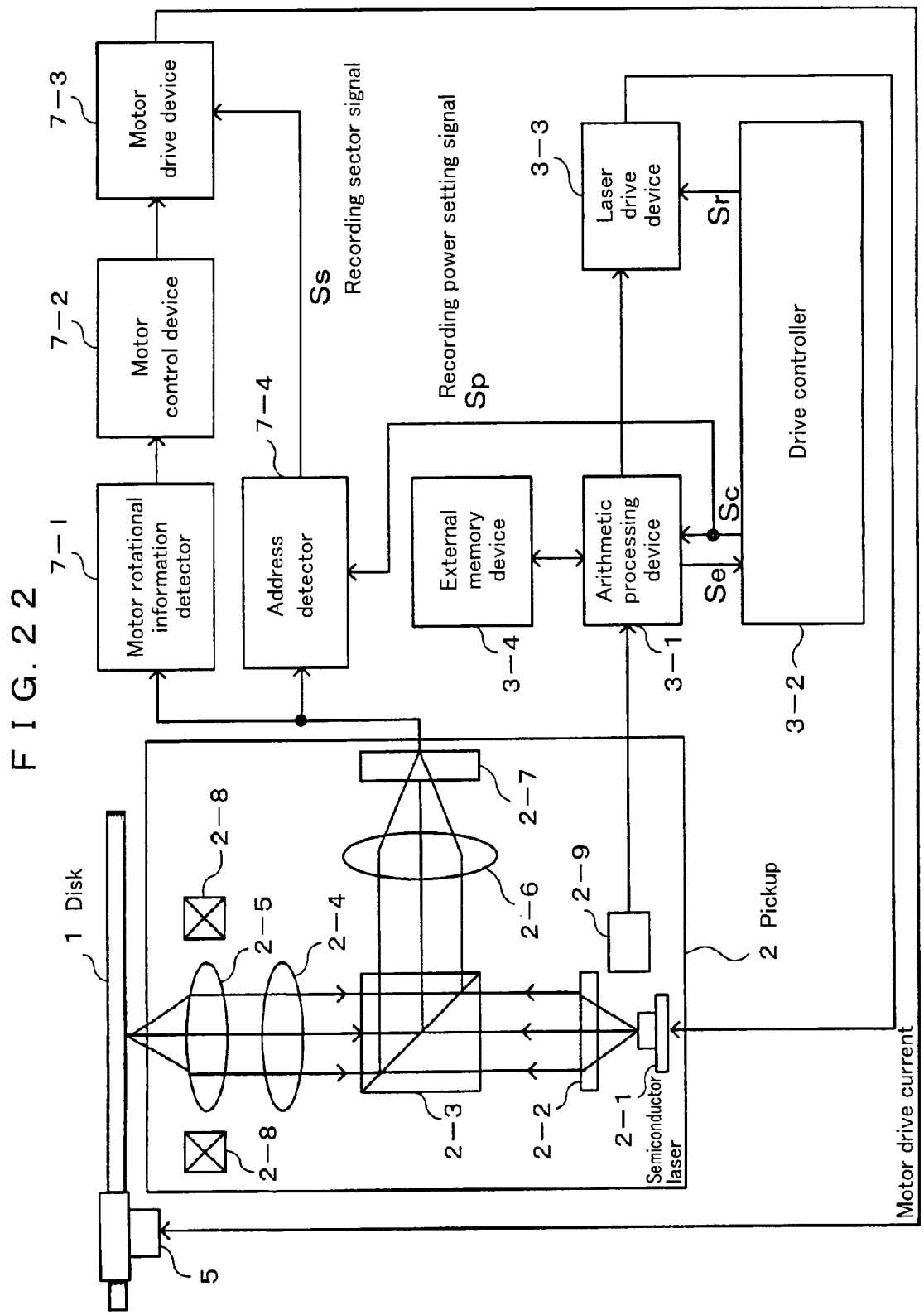
FIG. 22 is a first block diagram showing the structure of an optical disk apparatus according to a third embodiment of the present invention.

FIG. 22 is a block diagram showing a structural example of the optical disk apparatus according to the third embodiment of the present invention. In FIG. 22, it is assumed that a DVD-RAM disk is loaded as an example of the disk 1. A part of laser beams emitted from the semiconductor lens 2-1 is detected by the photodetector 2-9, and converted to an electric signal. The output signal of the photodetector 2-9 is inputted to an arithmetic processing device 3-1. The arithmetic processing device 3-1, while referring to the output signal of the photodetector 2-9, performs arithmetic processing so that the power of the light emitted from the semiconductor laser 2-1 becomes a prescribed value, and outputs the result of the arithmetic processing to a laser drive device 3-3. The laser drive device 3-3 drives the semiconductor laser 2-1 in accordance with the output signal of the arithmetic processing device 3-1 to control the laser power. A recording power setting signal Sp, a recording power setting end signal Se, and a recording-reproducing switching signal Sc are exchanged between a drive controller 3-2 and the arithmetic processing device 3-1 to be used for switching the laser powers to either reproducing or recording state, and as the timing for storing the result of the arithmetic processing to an external memory device 3-4. After completing the setting of the recording power, the laser drive device 3-3 performs modulation action in accordance with the recording signal Sr outputted from the drive controller 3-2, and recording of information is carried out.

The laser beams emitted from the semiconductor laser 2-1 are shaped into parallel beams with the collimator lens 2-2, and the parallel beams enter the objective lens 2-5 after passing through the polarization beam splitter 2-3 and the wavelength plate 2-4. The laser beams entered to the objective lens 2-5 are condensed so as to form a beam spot on the disk 1. The reflected light of the beam spot condensed on the disk 1 passes again through the objective lens 2-5 and the wavelength plate 2-4. It is then separated from the optical path of the emitted light by the polarization beam splitter 2-3, and condensed on a prescribed light receiving face of the reproducing light detector 2-7 through the condenser lens 2-6.

The reflected light condensed to the reproducing light detector 2-7 is converted to an electric signal and inputted to a motor rotational information detector 7-1. The motor rotational information detector 7-1 detects the rotation speed of the motor 5 from the output of the reproducing light detector 2-7, and outputs it to a motor control device 7-2. The motor control device 7-2 outputs a drive signal for controlling the error between the output of the motor rotational information detector 7-1 and the motor speed reference signal set in advance to be zero, to a motor drive device 7-3. In accordance with the output of the motor control device 7-2, the motor drive device 7-3 outputs the motor drive current to the motor 5. The motor 5 is driven by the motor drive current and thereby the disk 1 is rotated.

The output signal of the reproducing light detector 2-7 is inputted to an address detector 7-4. Further, the recording power setting signal Sp outputted from the drive controller 3-2 is also inputted to the address detector 7-4. The address detector 7-4 detects one sector that includes the recording region in the section where the recording power setting signal Sp is "H" and the recording region right thereafter, and outputs the recording sector signal Ss to the motor drive device 7-3.

The action of the address detector 7-4 is the same as the address detector 4-4 described in the first embodiment referring to FIG. 10, so that explanation thereof is omitted here.

Figure 23:
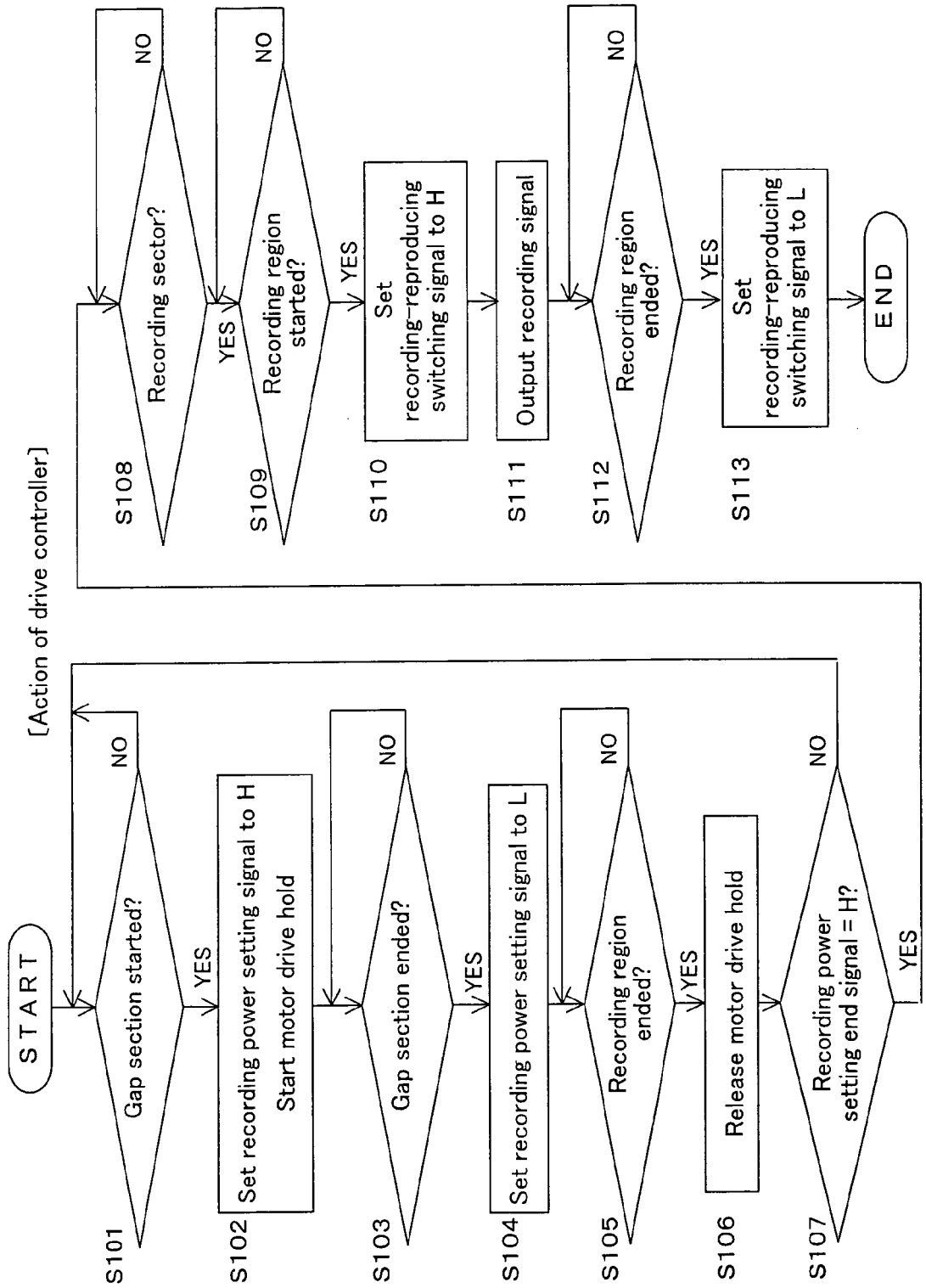
FIG. 23 is a flowchart showing the recording action procedure of the drive controller according to the third embodiment of the present invention.

The procedure of the recording power setting and the motor control state will be described referring to FIG. 23. FIG. 23 is a flowchart showing the action of the drive controller 3-2. When the recording action is started, detection of a gap section of a given sector is started at the beginning (step S101). Upon detecting that a beam spot has started to scan the gap section, the recording power setting signal Sp is set to "H". The recording power setting signal Sp is inputted also to the address detector 7-4 and, as described in FIG. 11, the address detector 7-4 outputs "H" in one sector that includes the gap section where the recording power setting signal Sp is set to "H" and the recording region right thereafter. The motor drive device 7-3 executes hold processing in the section where the output of the address detector 7-4 is "H" (step S102). The hold processing means to keep and output the drive current of right before the recording power setting signal Sp switches from "L" to "H".

Then, the end of the gap section is detected (step S103), and the recording power setting signal Sp is set to "L". However, the address detector 7-4 maintains the output of "HI". Thus, the motor drive device 7-3 continues the hold processing (step S104).

Upon detecting that the beam spot has completely scanned the dead end of the recording region right after the gap section (step S105), the motor drive device 7-3 releases the hold processing (step S106).

The arithmetic processing device 3-1 performs the recording power setting in the section where the recording power setting signal Sp is "H" and, when the recording power setting is completed, sets the recording power setting end signal Se to "H" for the drive controller 3-2. The section where the recording power setting end signal Se is not turned to "H" indicates that the recording power setting has not completed yet in one gap section. Thus, actions of detecting the gap section and setting the recording power setting signal Sp to "H" and "L" are repeated until the recording power setting end signal Se turns to "H" (step S107). Upon detecting that the recording power setting end signal Se is "H", it is checked whether or not it is the recording sector. If it is not the recording sector, it is continued to wait until becoming the recording sector (step S108). If it is the recording sector, the start of the recording region is detected (step S109). When the recording sector is started, the recording-reproducing switching signal Sc is turned to "H" (step S110), and the recording signal Sr is outputted to the laser drive device 3-3 (step 111). Upon detecting the end of the recording region (step S112), the recording-reproducing switching signal Sc is turned to "L" (step S113). Thereby, the recording power setting action of the drive controller 3-2 is completed.

As described above, the motor drive device 7-2 executes the hold processing in the section where the recording power setting signal Sp is "H" and one sector right thereafter. Thus, even when the focus control or the tracking control becomes unstable due to fluctuations of the wavelength or the like, the motor drive device 7-3 keeps and outputs the motor drive current right before the gap section. Therefore, stable motor control can be achieved.

The actions of the arithmetic processing device 3-1 at the time of setting the recording power and at the time of performing recording to the recording region, and the state of motor control will be described referring to FIG. 24. FIG. 24 is a flowchart showing the actions of the arithmetic processing device 3-1.

The arithmetic processing device 3-1 performs a setup of the peak power. In other words, the arithmetic processing device 3-1 detects when the recording power setting signal Sp outputted from the drive controller 3-2 turns to "H" (step S121). When it is detected that the recording power setting signal Sp is "H", the arithmetic processing device 3-1 performs bottom power setting. Further, when the recording power setting signal Sp turns to "H", the output of the address detector 7-4 also turns to "H", so that the motor drive device 7-3 holds the drive current (step S122).

The bottom power setting is carried out as follows. That is, the arithmetic processing device 3-1: detects the error between the signal of the photodetector 2-9 obtained in accordance with the output power of the semiconductor laser 2-1 and the signal set in accordance with the bottom power; amplifies the magnification that is determined in regard to a loop gain of the set bottom power by considering the semiconductor laser 2-1, the photodetector 2-9 and the laser drive device 3-3; and outputs a control amount voltage for equalizing the target values of the output power and bottom power of the semiconductor laser 2-1 to the laser drive device 3-3 in order to control the power of the semiconductor laser 2-1. Then, the operation result of the bottom power setting is saved in the external memory device 3-4 (step S123). When the gap section is ended and detected that the recording power setting signal Sp has turned to "L" (step S124), the arithmetic processing device 3-1 is switched to the control for the reproducing power (step S125). Then, it is detected whether or not the beam spot has passed the recording region (step S126). When judged that the beam spot has completely scanned the recording region, the output of the address detector 7-4 is switched form "H" to "L", and the motor drive device 7-3 releases the hold processing (step S127). This bottom power setting can be executed repeatedly. In such a case, it is returned again to the step S121, and started from the step of detecting that the recording power setting signal Sp turns to "H" (step S128).

When the bottom power setting is completed, the arithmetic processing device 3-1 then performs the peak power setting. That is, the arithmetic processing device 3-1 detects that the recording power setting signal Sp turns to "H" (S129). When detected that the recording power setting signal Sp is "H", the arithmetic processing device 3-1 performs the peak power setting. When the recording power setting signal Sp turns to "H", the output of the address detector 7-4 also turns to "H", so that the motor drive device 7-3 holds the drive current (step S130). The peak power setting is carried out as follows. That is, the arithmetic processing device 3-1: detects the error between the signal of the photodetector 2-9 obtained in accordance with the output power of the semiconductor laser 2-1 and the signal set in accordance with the peak power; amplifies the magnification that is determined in relation to a loop gain of the set peak power by considering the semiconductor laser 2-1, the photodetector 2-9 and the laser drive device 3-3; and outputs a control amount voltage for equalizing the target values of the output power and peak power of the semiconductor laser 2-1, to the laser drive device 3-3 in order to control the power of the semiconductor laser 2-1 (step S131). Then, the operation result of the bottom power setting is saved in the external memory device 3-4. When the gap section is ended and detected that the recording power setting signal Sp has turned to "L" (step S132), the recording power setting end signal Se is set to "H" and informs the drive controller 3-2 that the recording power setting is completed and it is ready for recording (step S135). This peak power setting can also be executed repeatedly. In such a case, the reproducing power setting: is performed once, and simultaneously the motor drive device 7-3 releases the hold processing after the beam spot has completely passed the recording region right after the gap section where the hold processing of the motor drive is started (step S134). Then, it is returned to the step S129 to restart from the step of detecting that the recording power setting signal Sp turns to "H". When the arithmetic processing device 3-1 sets the recording power set end signal Se to "H" (step S135) and the current sector is the recording sector, the drive controller 3-2 sets the recording-reproducing switching signal Sc to "H". If it is not a recording sector, the recording-reproducing switching signal is not "H" (step S136) Thus, after performing the reproducing power setting again (step S137), the step S136 is executed again. The motor drive device 7-3 also releases the hold processing after the beam spot has completely passed the recording region right after the gap section where the hold processing of the motor drive is started.

When it is detected that the recording-reproducing switching signal is "H", the arithmetic processing device 3-1 retrieves the operation results of the peak power and the bottom power from the external memory device 3-4 (step S138), and sets the retrieved values as the peak power and the bottom power (step S139). The peak power and the bottom power are maintained in the section where the recording-reproducing switching signal Sc is "H". The laser power is modulated between the peak power and the bottom power by the laser drive device 3-3 in accordance with the output of the recording signal Sr to execute recording action. When the recording-reproducing switching signal Sc turns to "L" (step S140), the arithmetic processing device 3-1 sets the recording power setting end signal Se to "L" (step S141), and sets the reproducing power (step S142). The motor drive device 7-3 judges whether or not the beam spot has completely passed the recording region right after the gap section from which the hold processing on the motor drive is started (step S143). Based on the judgment, the motor drive device 7-3 releases the hold processing (step S144).

By the procedure mentioned above, the action of the recording power setting is completed.

As shown in FIG. 25, it may be structured so as to AD-convert the outputs of the photodetector 2-9 and the motor rotational information detector 7-1, achieve the arithmetic processing device 3-1 and the motor control device 7-2 with a control program and DA-convert the outputs thereof. A first AD-converter 8-1 is provided in the previous stage of the arithmetic processing device 3-1, and a first DA-converter 9-1 is provided in the latter stage. Further, a fourth AD-converter 8-4 is provided in the previous stage of the motor control device 7-2, and a fourth DA-converter 9-4 is provided in the latter stage. The same effect can also be achieved in this case.

In this embodiment, the powers outputted from the laser drive device 3-3 in the gap section are set as the bottom power and the peak power. However, the effect of the embodiment is not limited only to the bottom power and the peak power. The same effect can be obtained in any powers, when the larger powers than the reproduction power is outputted in the gap section.

The embodiment illustrates the state where the bottom power setting is carried out in the gap section of the recording sector, and the setting of power is completed in one time. However, setting of the bottom power and the peak power may be performed a plurality of times.

Fourth Embodiment

FIG. 26 is a block diagram showing a structural example of the optical disk apparatus according to a fourth embodiment of the present invention. In FIG. 26, it is assumed that a DVD-RAM disk is loaded as an example of the disk 1. A part of laser beams emitted from the semiconductor laser 2-1 is detected by the photodetector 2-9, and converted to an electric signal. The output signal of the photodetector 2-9 is inputted to an arithmetic processing device 3-1. The arithmetic processing device 3-1, while referring to the output signal of the photodetector 2-9, performs arithmetic processing so that the power of the emitted light of the semiconductor laser 2-1 becomes a prescribed value, and outputs the result of the arithmetic processing to a laser drive device 3-3. The laser drive device 3-3 drives the semiconductor laser 2-1 in accordance with the output signal of the arithmetic processing device 3-1 to control the laser power. A recording power setting signal Sp, a recording power setting end signal Se and a recording-reproducing switching signal Sc are exchanged between a drive controller 3-2 and the arithmetic processing device 3-1 to be used for switching the laser powers to either reproducing or recording state, and as the timing for storing the result of the arithmetic processing to an external memory device 3-4. After completing the setting of the recording power, the laser drive device 3-3 performs modulation action in accordance with the recording signal Sr outputted from the drive controller 3-2, and recording of information is carried out.

The laser beams emitted from the semiconductor laser 2-1 are shaped into parallel beams at the collimator lens 2-2, and the parallel beams enter the objective lens 2-5 after passing through the polarization beam splitter 2-3 and the wavelength plate 2-4. The laser beams entered to the objective lens 2-5 are condensed so as to form a beam spot on the disk 1. The reflected light of the beam spot condensed on the disk 1 passes through the objective lens 2-5 again and the wavelength plate 2-4. It is then separated from the optical path of the emitted light by the polarization beam splitter 2-3, and condensed on a prescribed light receiving face of the reproduction light detector 2-7 through the condenser lens 2-6.

The reflected light condensed to the reproducing light detector 2-7 is converted to an electric signal and inputted to a motor rotational information detector 7-1. The motor rotational information detector 7-1 detects the rotation speed of the motor 5 based on the output of the reproducing light detector 2-7 and outputs it to a motor control device 7-2. The motor control device 7-2 outputs a drive signal for controlling the error between the output of the motor rotational information detector 7-1 and the motor speed reference signal set in advance to be zero, to a motor drive device 7-3. In accordance with the output of the motor control device 7-2, the motor drive device 7-3 outputs the motor drive current to the motor 5. The motor 5 is driven by the motor drive current, thereby the disk 1 is rotated.

The output of the motor rotational information detector 7-1 is inputted to the drive controller 3-2. The drive controller 3-2 can detect the rotation speed of the motor 5 at all times based on the output of the motor rotational information detector 7-1.

As the recording power setting procedure and the actions of the arithmetic processing device 3-1 are the same as those described referring to FIG. 3 and FIG. 4 in the first embodiment, detailed explanations thereof are omitted here.

Now, the relation between the rotation speed of the motor 5 and the drive controller 3-2 will be described.

In order for the semiconductor laser 2-1 to output the recording power in the gap section, the drive controller 3-2 outputs the recording power setting signal Sp and the recording signal Sr to the arithmetic processing device 3-1 and the laser drive device 3-3. Whereas, when the peak power or the bias power becomes dominantly large in regard to the reproducing power, the focus error signal FE and the tracking error signal TE fluctuate due to fluctuation of the wavelength or the like, in the section of outputting the recording power within the gap section, so that the focus control and the tracking control become unstable. Further, when setting of the peak power or the bias power cannot be completed in one time and the settings are carried out continuously a plurality of times, the focus control and the tracking control become unstable in the sections of the sectors where the settings are repeated continuously.

And so, when the recording power in the gap section is larger than a prescribed value, the drive controller 3-2 limits the number of sectors for repeatedly carrying out the recording power setting in the gap section. For example, as shown in FIG. 27A, when the recording power outputted from the semiconductor laser 2-1 is 200 milliwatts (mW) or less (it is assumed to be 150 mW in FIG. 27A), the recording power is obtained by repeating the recording power setting three times. Meanwhile, when the recording power is larger than 200 mW, the number of sectors to repeat the recording power setting is set to be one as shown in FIG. 27B.

Furthermore, when the recording power in the gap section is larger than the prescribed value, the drive controller 3-2 does not set the recording power in the gap section of the sector right after the gap section where the recording power is set, or does not set the recording power in the gap sections of a plurality of sectors right thereafter. For example, as shown in FIG. 28A, when the recording power outputted from the semiconductor laser 2-1 is 200 milliwatts (mW) or less, the recording power is obtained by repeating the recording power setting. Meanwhile, when the recording power is larger than 200 mW, the recording power is not set in the gap sections of three sectors right after the gap section where the recording power is set, as shown in FIG. 28B.

Figure 29:
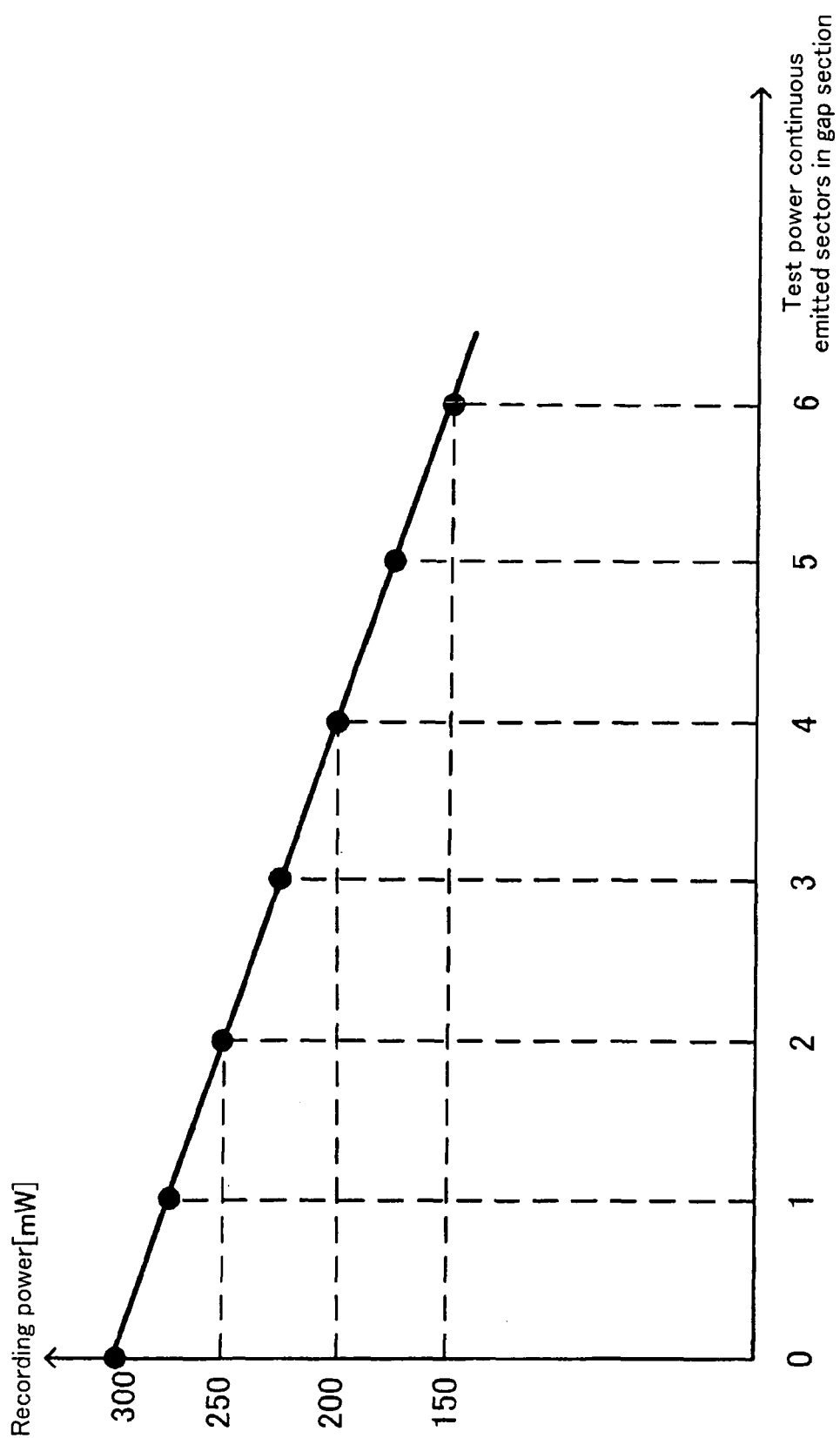
FIG. 29 is an illustration showing the relations of the sectors that can continuously emit the light in regard to the recording power outputted in the gap section according to the fourth embodiment of the present invention.

Further, the limited number of the sectors for continuously repeating the recording power setting as shown in FIG. 27B may be set as almost reciprocal to the recording power (test power) (see FIG. 29).

Figure 30:
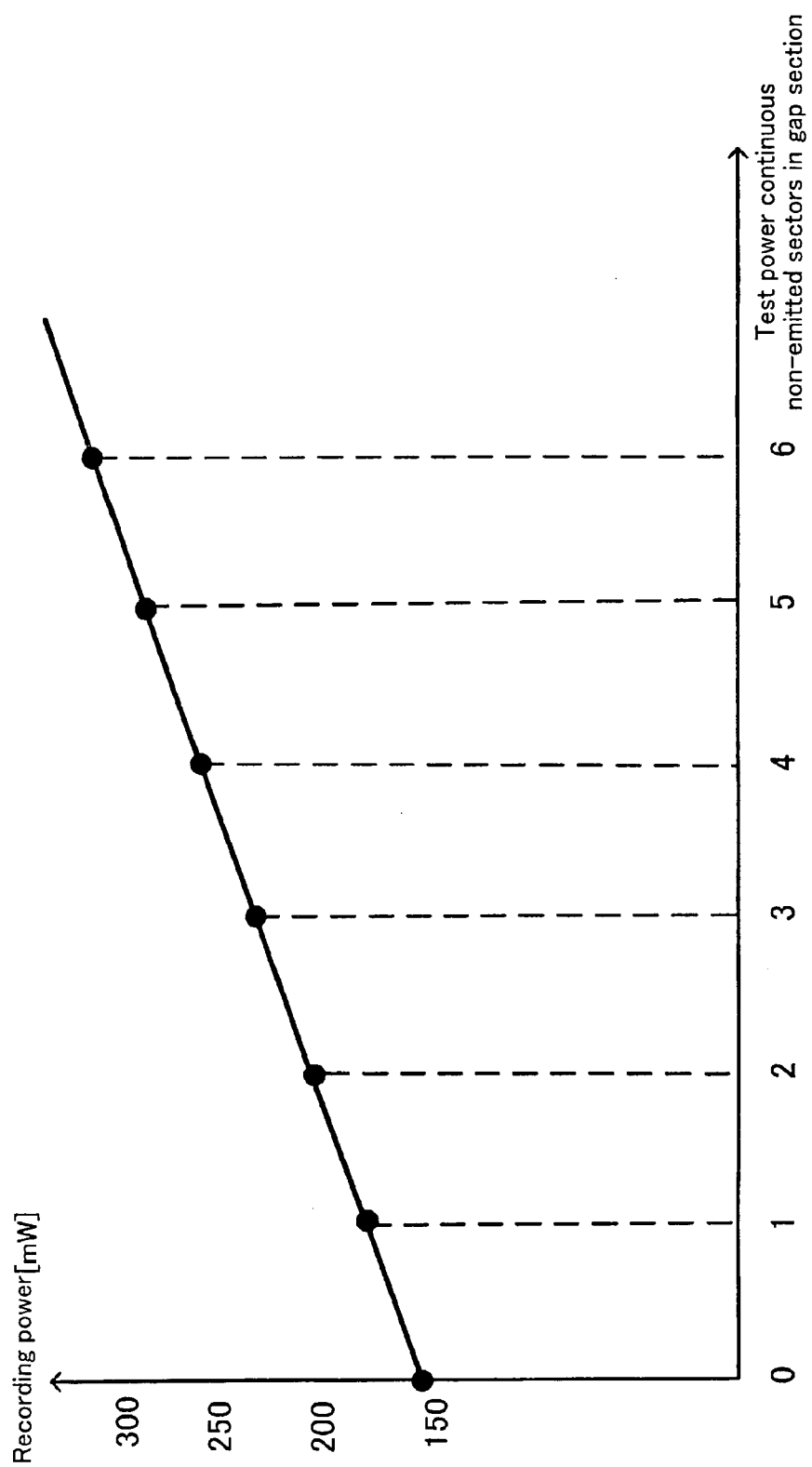
FIG. 30 is an illustration showing the relations of the sectors that cannot continuously emit the light in regard to the recording power outputted in the gap section according to the fourth embodiment of the present invention.

Furthermore, the number of the sectors where the recording power is not set as shown in FIG. 28B may be set as almost proportional to the recording power (test power) (see FIG. 30).

Figure 31:
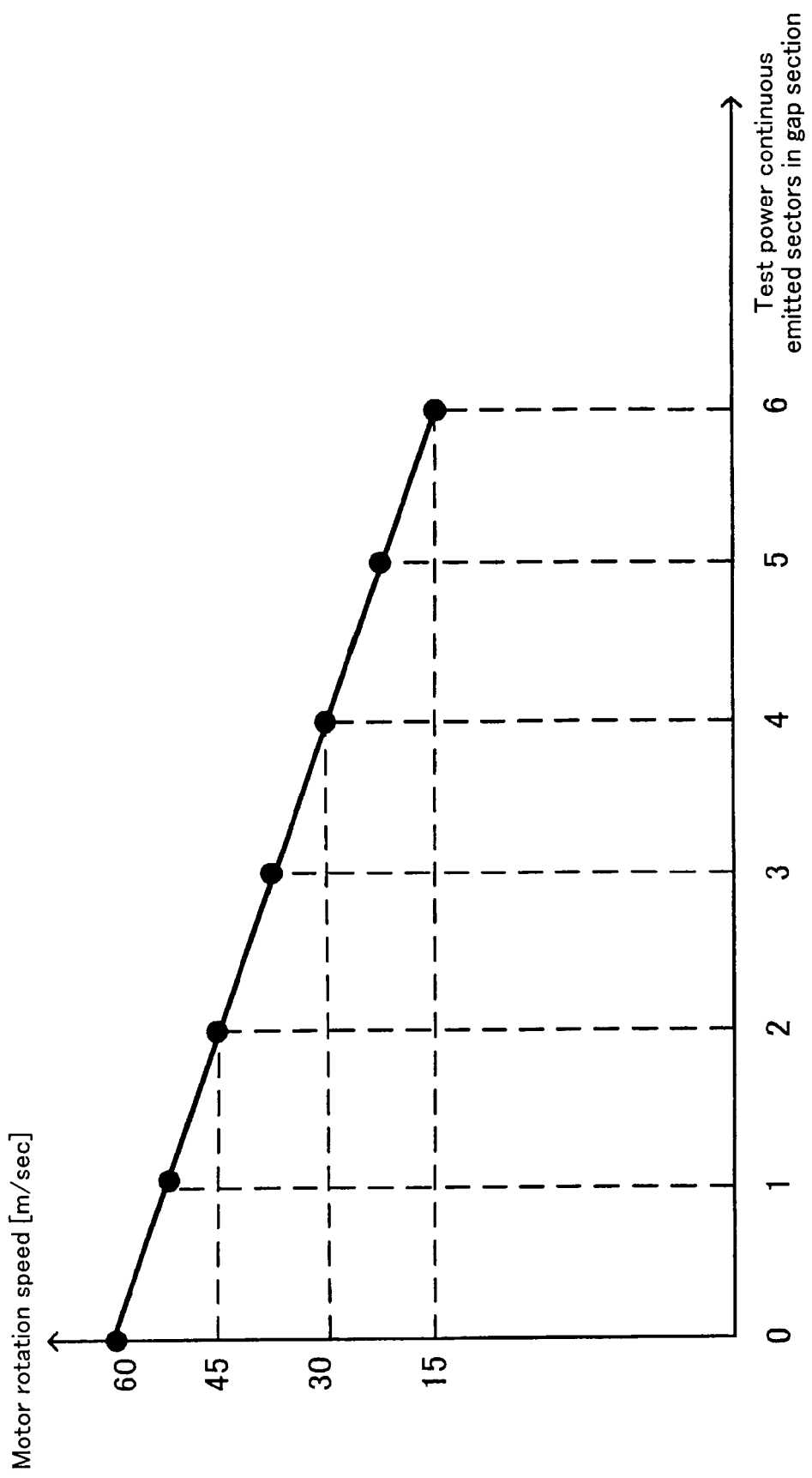
FIG. 31 is an illustration showing the relation of the sectors that can continuously emit the light in regard to the motor rotation speed in the fourth embodiment of the present invention.

Moreover, the limited number of the sectors for continuously repeating the recording power setting as shown in FIG. 27B may be set as almost reciprocal to the output of the motor rotational information detector 7-1 (see FIG. 31).

Figure 32:
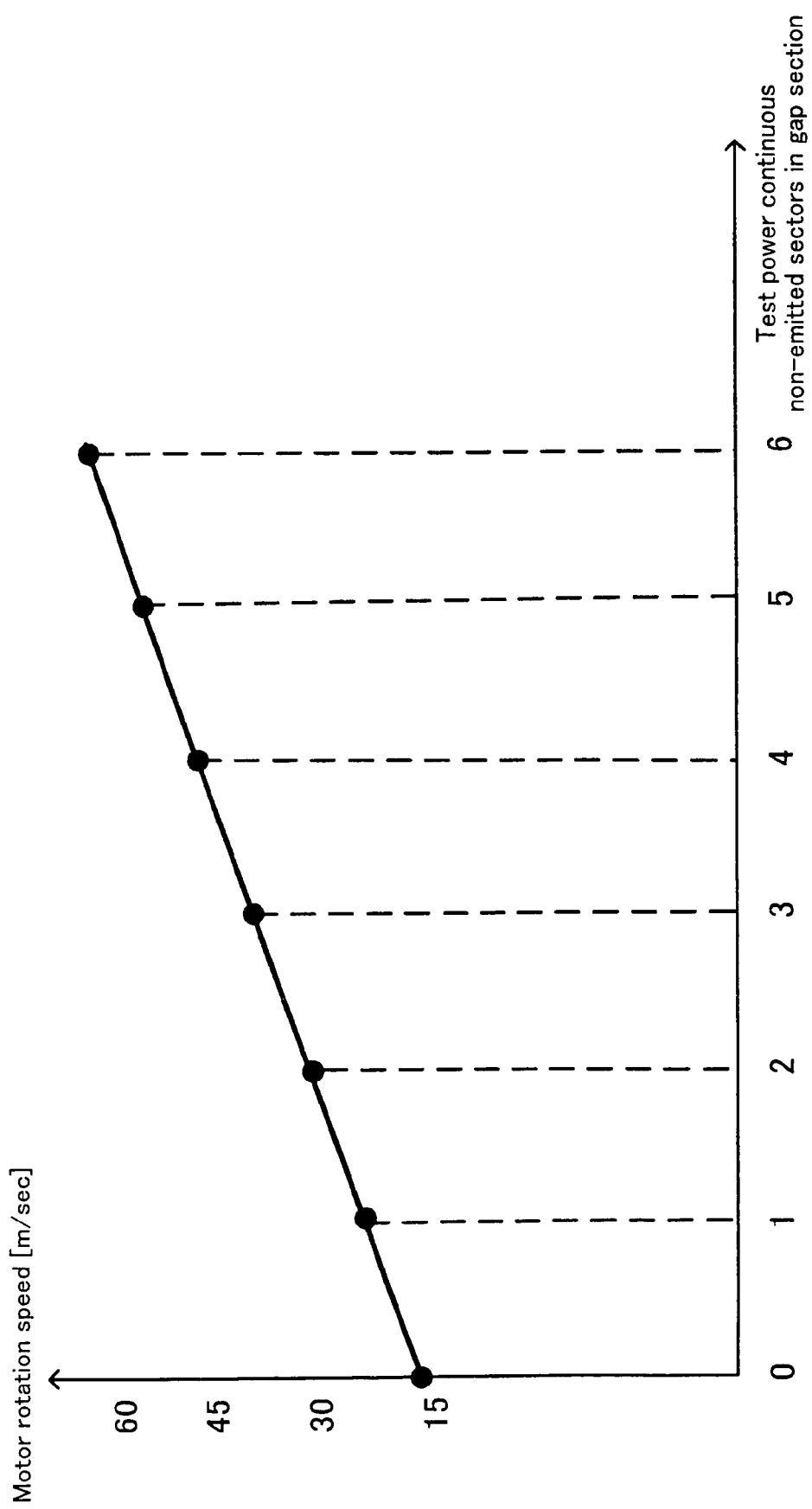
FIG. 32 is an illustration showing the relation of the sectors that cannot continuously emit the light in regard to the motor rotation speed in the fourth embodiment of the present invention.
Figure 33:
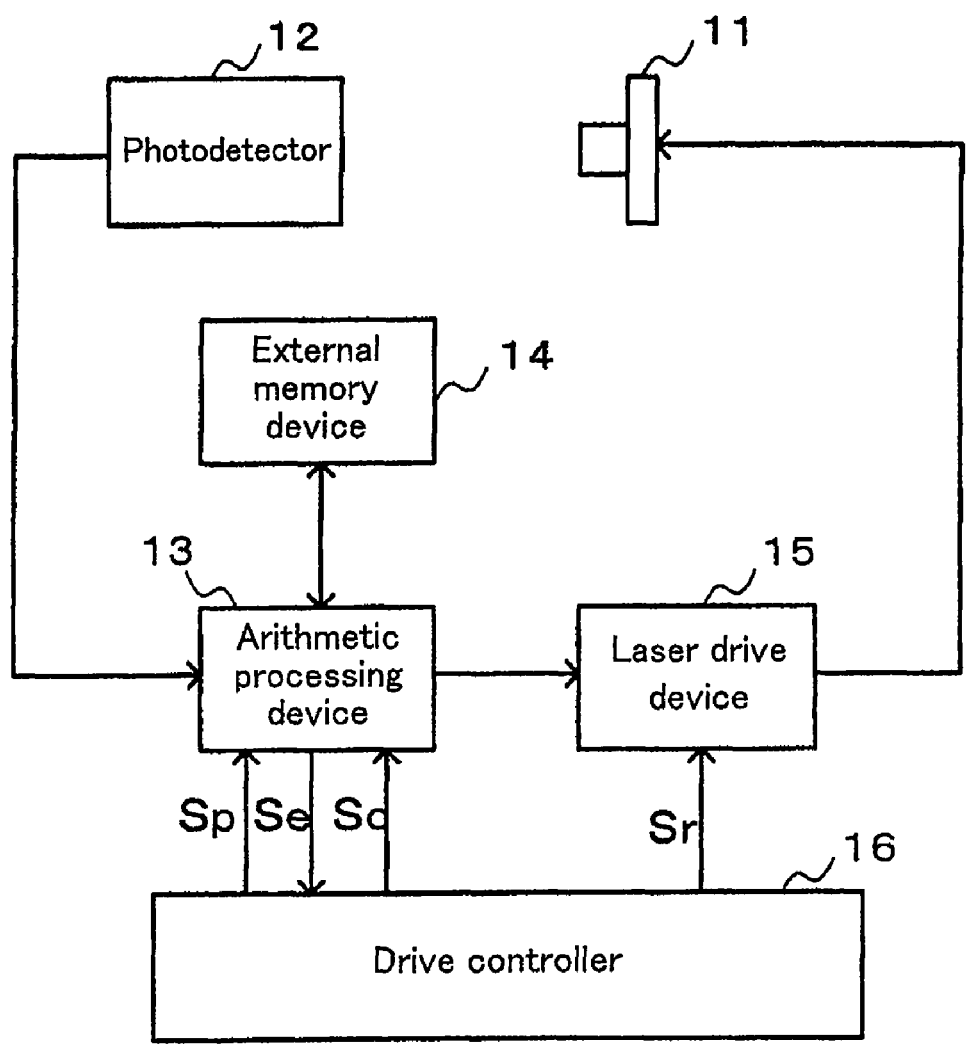
FIG. 33 is a block diagram showing the structure of a semiconductor laser power control circuit according to a related art.
Figure 34:
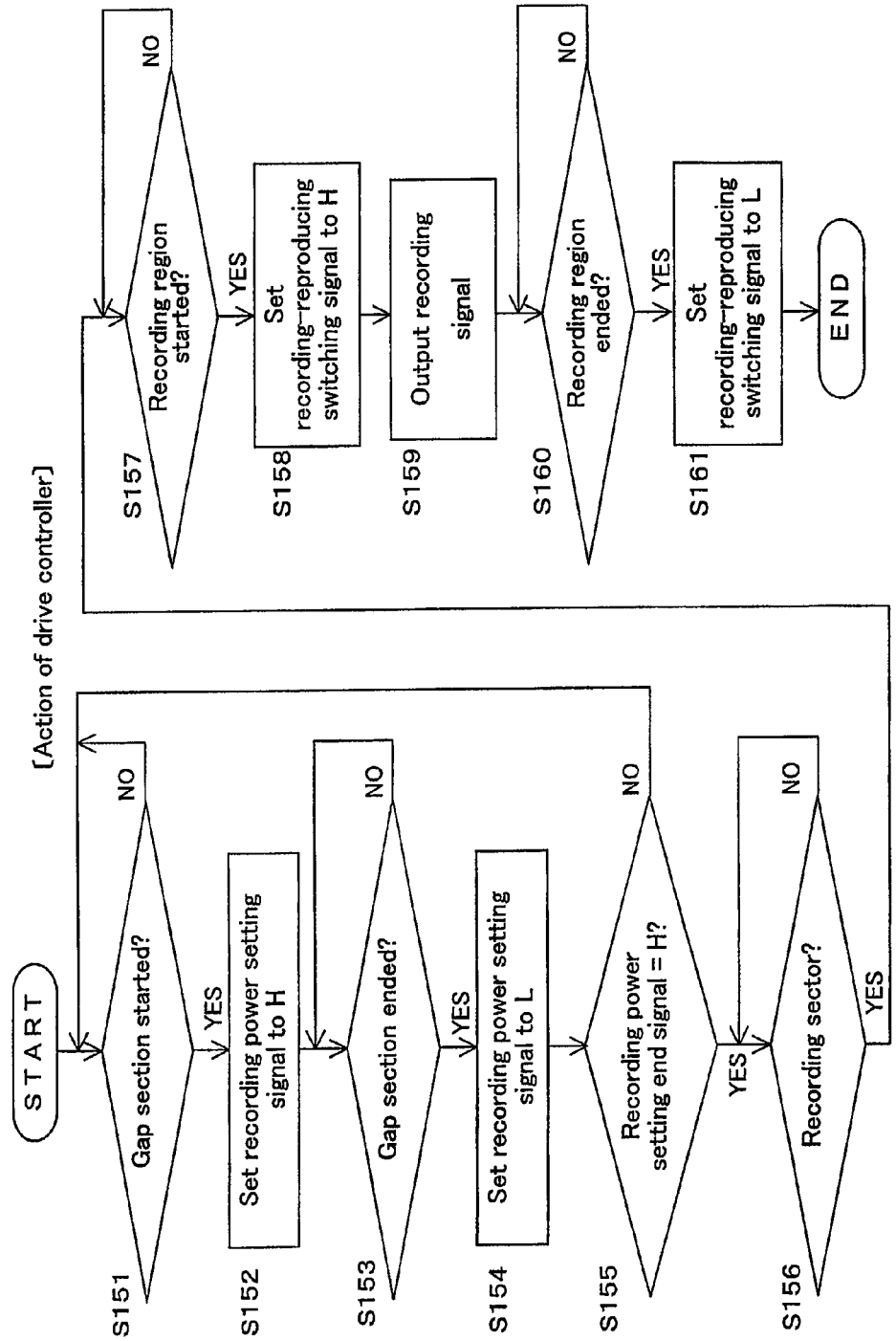
FIG. 34 is a flowchart showing the recording action procedure of a drive controller of the semiconductor laser power control circuit according to the related art.

Further, the number of the sectors where the recording power is not set as shown in FIG. 28B maybe set as almost proportional to the output of the motor rotational information detector 7-1 (see FIG. 32).

By doing as described above, influence due to the larger test power than the prescribed value can be reduced, and the focus control, tracking control and motor control can maintain its stability.

While the invention has been described and illustrated in detail, it is to be clearly understood that this is intended be way of illustration and example only and is not to be taken by way of limitation, the spirit and scope of this invention being limited only be the terms of the following claims.

What is claimed is:

1. An optical disk apparatus for recording information to an information recording medium that comprises a plurality of recording regions and gap sections not used for recording information before said recording regions along a recording track, said optical disk apparatus comprising:
    a laser;
    a laser drive device for outputting a test power such that an emitted light power becomes larger than a first prescribed value in a gap section where laser emission light passes before a specific recording region for recording data, among said gap sections existing between said recording regions on said information recording medium;
    an optical pickup including an objective lens for condensing light beams emitted from said laser on said information recording medium as a beam spot for detecting light reflected from said information recording medium;
    a focus error detector for detecting position shift between a recording face of said information recording medium and said beam spot as a focus error signal from output of said pickup;
    a focus control device for controlling said position shift between said beam spot and said recording face of said information recording medium based on output of said focus error detector; and a focus drive device for driving said objective lens in far and close directions to said information recording medium based on output of said focus control device, wherein in said gap section where said laser drive device outputs said test power, or in said gap section where said test power is outputted and a prescribed section right thereafter, said focus drive device keeps a focus drive output level right before said laser drive device outputs said test power and sets a recording power so that said emitted light power in said gap section becomes a second prescribed value.

2. An optical disk apparatus for recording information to an information recording medium that comprises a plurality of recording regions and gap sections not used for recording information before said recording regions along a recording track, said optical disk apparatus comprising:

a laser;

a laser drive device for outputting a test power so that an emitted light power becomes larger than a first prescribed value in a gap section where laser emission light passes before a specific recording region for recording data, among said gap sections existing between said recording regions on said information recording medium;

an optical pickup including an objective lens for condensing light beams emitted from said laser on said information recording medium as a beam spot for detecting light reflected from said information recording medium;

a focus error detector for detecting position shift between a recording face of said information recording medium and said beam spot as a focus error signal from output of said pickup;

a focus control device for controlling said position shift between said beam spot and said recording face of said information recording medium based on output of said focus error detector; and a focus drive device for driving said objective lens in far and close directions to said information recording medium based on output of said focus control device, wherein in said gap section where said laser drive device outputs said test power, or in said gap section where said test power is outputted and a prescribed section right thereafter, gain of said focus control device is decreased and a recording power is set so that said emitted light power in said gap section becomes a second prescribed value.

3. An optical disk apparatus for recording information to an information recording medium that comprises a plurality of recording regions and gap sections not used for recording information before said recording regions along a recording track, said optical disk apparatus comprising:

a laser;

a laser drive device for outputting a test power such that an emitted light power becomes larger than a first prescribed value in a gap section where laser emission light passes before a specific recording region for recording data, among said gap sections existing between said recording regions on said information recording medium;

an optical pickup including an objective lens for condensing light beams emitted from said laser on said information recording medium as a beam spot for detecting light reflected from said information recording medium;

a tracking error detector for detecting position shift between a track of said information recording medium and said beam spot as a tracking error signal from output of said pickup;

a tracking control device for controlling said position shift between said beam spot and said track of said information recording medium based on output of said tracking error detector; and a tracking drive device for driving said objective lens in directions across said information recording medium based on output of said tracking control device, wherein in said gap section where said laser drive device outputs said test power, or in said gap section where said test power is outputted and a prescribed section right thereafter, said tracking drive device keeps a tracking drive output level of right before said laser drive device outputs said test power and a recording power is set so that said emitted light power in said gap section becomes a second prescribed value.

4. An optical disk apparatus for recording information to an information recording medium that comprises a plurality of recording regions and gap sections not used for recording information before said recording regions along a recording track, said optical disk apparatus comprising:

a laser;

a laser drive device for outputting a test power so that an emitted light power becomes larger than a first prescribed value in a gap section where laser emission light passes before a specific recording region for recording data, among said gap sections existing between said recording regions on said information recording medium;

an optical pickup including an objective lens for condensing light beams emitted from said laser on said information recording medium as a beam spot for detecting light reflected from said information recording medium;

a tracking error detector for detecting position shift between a track of said information recording medium and said beam spot as a tracking error signal from output of said pickup;

a tracking control device for controlling said position shift between said beam spot and said track of said information recording medium based on output of said tracking error detector; and a tracking drive device for driving said objective lens in directions across said information recording medium based on output of said tracking control device, wherein in said gap section where said laser drive device outputs said test power, or in said gap section where said test power is outputted and a prescribed section right thereafter, gain of said tracking control device is decreased and a recording power is set so that said emitted light power in said gap section becomes a second prescribed value.

5. An optical disk apparatus for recording information to an information recording medium that comprises a plurality of recording regions and gap sections not used for recording information before said recording regions along a recording track, said optical disk apparatus comprising:

a laser;

a laser drive device for outputting a test power so that an emitted light power becomes larger than a first prescribed value in a gap section where laser emission light passes before a specific recording region for recording data, among said gap sections existing between said recording regions on said information recording medium;

an optical pickup including an objective lens for condensing light beams emitted from said laser on said information recording medium as a beam spot for detecting light reflected from said information recording medium;

a motor for rotating said information recording medium;

a motor rotational information detector for detecting rotational information of said motor from output of said pickup;

a motor control device for controlling a rotation speed of said information recording medium based on output of said motor rotational information detector; and a motor drive device for driving said motor based on output of said motor control device, wherein in said gap section where said laser drive device outputs said test power, or in said gap section where said test power is outputted and a prescribed section right thereafter, said motor drive device keeps a motor drive output level of right before said laser drive device outputs said test power and a recording power is set so that said emitted light power in said gap section becomes a second prescribed value.

6. An optical disk apparatus for recording information to an information recording medium that comprises a plurality of recording regions and gap sections not used for recording information before said recording regions along a recording track, said optical disk apparatus comprising:

a laser; and a laser drive device for outputting a test power so that an emitted light power becomes larger than a prescribed value in a gap section where laser emission light passes before a specific recording region for recording data, among said gap sections existing between said recording regions on said information recording medium, wherein when said test power becomes larger than said prescribed value, said laser drive device does not output said test power continuously for more than a prescribed number of gap sections.

7. The optical disk apparatus according to claim 6, wherein said prescribed number is a number almost reciprocal to a rotation speed of said information recording medium.

8. The optical disk apparatus according to claim 6, wherein said prescribed number is a number almost reciprocal to said test power outputted in said gap section.

9. An optical disk apparatus for recording information to an information recording medium that comprises a plurality of recording regions and gap sections not used for recording information before said recording regions along a recording track, said optical disk apparatus comprising:

a laser; and a laser drive device for outputting a test power so that an emitted light power becomes larger than a prescribed value in a gap section where laser emission light passes before a specific recording region for recording data, among said gap sections existing between said recording regions on said information recording medium, wherein when said test power becomes larger than said prescribed value, said laser drive device does not output said test power in a prescribed number of gap sections that are right after said gap section where said test power is outputted.

10. The optical disk apparatus according to claim 9, wherein said prescribed number is a number almost proportional to a rotation speed of said information recording medium.

11. The optical disk apparatus according to claim 9, wherein said prescribed number is a number almost proportional to said test power outputted in said gap section.

12. The optical disk apparatus according to any one of claims 1-9, wherein said prescribed value is larger than an emitted light power that is used for reading out data from said information recording medium.

* * * * *